US008738494B1

(12) United States Patent
Rosenberger

(10) Patent No.: US 8,738,494 B1
(45) Date of Patent: *May 27, 2014

(54) END USER GENERATED BILLING CYCLES

(71) Applicant: Ronald John Rosenberger, Newtown, PA (US)

(72) Inventor: Ronald John Rosenberger, Newtown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/956,520

(22) Filed: Aug. 1, 2013

Related U.S. Application Data

(63) Continuation of application No. 13/525,750, filed on Jun. 18, 2012, which is a continuation of application No. 11/612,467, filed on Dec. 18, 2006, now Pat. No. 8,332,293, and a continuation-in-part of application No. 11/487,680, filed on Jul. 17, 2006, now abandoned, which is a continuation-in-part of application No. 10/665,188, filed on Sep. 17, 2003, now abandoned, application No. 13/956,520, which is a continuation of application No. 13/779,646, filed on Feb. 27, 2013, now Pat. No. 8,682,790, which is a continuation-in-part of application No. 13/525,750.

(60) Provisional application No. 60/700,802, filed on Jul. 21, 2005, provisional application No. 60/752,119, filed on Dec. 20, 2005, provisional application No. 60/811,977, filed on Jun. 8, 2006.

(51) Int. Cl.
*G06Q 40/00* (2012.01)
*G07F 19/00* (2006.01)
*G06Q 30/00* (2012.01)

(52) U.S. Cl.
USPC .............................. 705/35; 705/34; 705/26.1

(58) Field of Classification Search
None
See application file for complete search history.

(56) References Cited

U.S. PATENT DOCUMENTS

| | | | | |
|---|---|---|---|---|
| 6,256,624 B1 | * | 7/2001 | Pollard et al. | 1/1 |
| 6,757,371 B2 | * | 6/2004 | Kim et al. | 379/114.22 |
| 7,213,750 B1 | * | 5/2007 | Barnes et al. | 235/381 |
| 2001/0009002 A1 | * | 7/2001 | Logan et al. | 705/34 |
| 2002/0178071 A1 | * | 11/2002 | Walker et al. | 705/26 |
| 2004/0044601 A1 | * | 3/2004 | Kim et al. | 705/34 |
| 2004/0049452 A1 | * | 3/2004 | Blagg | 705/39 |
| 2004/0081302 A1 | * | 4/2004 | Kim et al. | 379/114.22 |
| 2004/0249745 A1 | * | 12/2004 | Baaren | 705/39 |
| 2005/0080692 A1 | * | 4/2005 | Padam et al. | 705/30 |
| 2005/0267784 A1 | * | 12/2005 | Slen et al. | 705/4 |
| 2006/0036523 A1 | * | 2/2006 | Stover et al. | 705/35 |
| 2007/0005519 A1 | * | 1/2007 | Gupta | 705/412 |
| 2007/0216362 A1 | * | 9/2007 | Kwit | 320/132 |
| 2008/0249907 A1 | * | 10/2008 | Sadejyan | 705/35 |
| 2009/0307059 A1 | * | 12/2009 | Young et al. | 705/10 |
| 2010/0205089 A1 | * | 8/2010 | Srinivasan et al. | 705/38 |
| 2012/0010908 A1 | * | 1/2012 | Doelling et al. | 705/4 |
| 2012/0209761 A1 | * | 8/2012 | Vicente et al. | 705/38 |
| 2013/0018764 A1 | * | 1/2013 | Deng et al. | 705/34 |
| 2013/0030994 A1 | * | 1/2013 | Calman et al. | 705/40 |

* cited by examiner

*Primary Examiner* — Mussa A Shaawat

(57) ABSTRACT

The present invention provides a method for electronically splitting an original billing cycle into at least two billing cycles in an account by electronically changing the debiting timeframe of the original billing cycle and electronically switching on or starting at least one additional billing cycle, as well as a method for electronically replacing an original billing cycle with at least two additional billing cycles in an account by electronically switching off the original billing cycle and electronically switching on at least two additional billing cycles, wherein electronically switching on or starting one or more billing cycles is determined by an end user, and wherein electronic operations of the methods are performed by at least one computer.

47 Claims, No Drawings

END USER GENERATED BILLING CYCLES

CROSS REFERENCE TO RELATED APPLICATIONS/PRIORITY CLAIM

This Continuation Application claims the benefit of U.S. Patent Application Ser. Nos. 60/752,119, filed Dec. 20, 2005; 60/811,977, filed Jun. 8, 2006; Ser. No. 11/487,680, filed Jul. 17, 2006; Ser. No. 11/612,467, filed Dec. 18, 2006, now issued as U.S. Pat. No. 8,332,293; Ser. No. 13/525,750, filed Jun. 18, 2012; and Ser. No. 13/779,646, filed Feb. 27, 2013, each of which is entirely incorporated herein by reference.

FIELD OF THE INVENTION

The present invention provides multiple account, multiple parameter methods, systems, apparatus, transaction cards, and the like for use in managing account balances relating to managing the debiting of at least one point of sale transaction via access to at least two available financial accounts that can be debited by preset and/or adjustable parameters before, during or after at least one financial transaction relating the amount of the debit to the relative balances available in the two available financial accounts, including increasing cash or credit balances by adjusting manually or automatically one or more transaction debits between one or more accounts.

BACKGROUND OF THE INVENTION

Separate credit card accounts and debit card accounts are well known in the art. They include single account balance credit or debit cards that are unusable should the singular account balance or credit limit become depleted or limit is reached, such that these card, methods and systems have many drawbacks. Accordingly, the end user is often embarrassed and stressed when they do not find out that they have exceeded their credit limit until their card is declined in the middle of a purchase, such as rejection of a given point-of-sale transaction, and are further punished by high credit card over-the-limit fees or overdraft fees with debit cards. Thus there is a need to provide alternative solutions to these problems.

Additionally, in recent years, the growth rate of credit card usage has leveled off, while the growth rate of debit card usage has increased dramatically. Intrinsic to a standard debit card is the lack of default risk, whereby once a given transaction is authorized and paid using a debit card, there is no risk that the end user will default on paying the debit card issuer, because payment has already occurred. As a result of this lack of default risk, fee revenues such as interchange fees that card issuers earn on debit cards is less than what card issuers earn on credit card transactions. Given the scenario where credit card usage is leveling off, and debit card usage is rising, financial card issuers will continue having a tougher time sustaining the overall level of revenue growth that they have enjoyed in prior years when the growth rate of credit card usage was still strong.

SUMMARY OF THE INVENTION

The present invention provides methods, systems and transaction cards or identification systems, using transaction network comprising proprietary card network, EFT, ACH, or ATM, for end user management of a global financial account by manual or automatic prepaying, prepaying, paying or unpaying, debiting or crediting, or readjustment or presetting, using parameters relating to portions of paid or unpaid financial transactions or account balance amounts in multiple credit, cash or other existing, or end user created, financial accounts or sub-accounts in said global financial account that is optionally subject to financial account issuer transaction or readjustment fees from end users and merchants, including optional use for financial transactions as a credit transaction card requiring merchant credit card interchange or other fees, and optional end user fees, as additional revenue to the global account issuer.

Certain embodiments disclosed herein will help financial card issuers justify and earn higher credit-card level fee revenue from merchants for both automatically paid and manually paid transactions, or new forms of fee revenue from end users and merchants.

Certain embodiments disclosed herein will help financial card issuers justify and earn the more favorable credit-card level fee revenues due to the fact that inherent to said embodiments are methods that greatly enhance flexibility for the end user over traditional credit and debit cards. Especially when compared to a standard debit card, certain debit card equivalents (to be known as "faux debit cards") and "crebit" embodiments comprising such debit card equivalents offer unprecedented flexibility, where the enablement of the improved flexibility necessitates a commensurate creation of end user credit-default risk. Therefore, it is possible for certain "enhanced" debit card embodiments to comprise a level of end user credit-default risk that is identical to a standard credit card. For example, by allowing an end user to use a fully enabled embodiment of a faux debit card, the end user can engage in purchase transactions that are automatically and fully paid by the end user's available cash balance; however, at a later time, the end user can then "unpay" the paid transactions, resulting in a credit balance that needs to be repaid, which also results in the cash balance being restored to the pre-transaction level. Subsequently, the end user can withdraw all available cash, and then totally default on paying back the credit balance that required repayment.

There are numerous embodiments disclosed herein; however, in the crebit embodiments, an end user, via various payment parameters comprising the transaction processor, can predetermine, among other things, which transaction items will be automatically paid before or at the close of a given billing cycle, and which transaction items will be manually paid by the end user after the close of a given billing cycle, or even manually paid by the end user before the close of said billing cycle. That said, it is possible for the end user to configure a given crebit embodiment in myriad ways, so in a given embodiment, the payment parameters can be set to perform only automated payments involving a cash balance functions just like an ordinary debit card, then within moments, the payment parameters can be reset to pre-select which transactions will be paid automatically, and which transactions will be paid manually per the crebit functionality, then within moments again, the payment parameters can be reset to only allow manual payments using a credit balance, so that the crebit embodiment functions just like an ordinary credit card.

By enabling the flexibility and full creation of credit-default risk that is inherent in certain embodiments, financial card issuers can justify and earn the more favorable credit-card level fee revenue from merchants for both automatically paid and manually paid transactions, such as interchange fees. Reasons that justify the more favorable credit-card level fee revenue comprise:

1) All embodiments comprise the use of at least one available credit balance.

2) Funding of, or linkage to, an available cash balance is not mandatory, whereby a given embodiment can function purely as a credit card.
3) Certain embodiments enable transactions that are fully paid using an available cash balance to be subsequently and fully unpaid, where the resultant credit balance repayment has the full capability to be defaulted on.

The inherent flexibility also helps the end user immensely. With regard to cash management and budgeting, certain embodiments enable an end user to predetermine which transactions are automatically paid versus manually paid.

In certain embodiments an end user that subsequently regrets using an available cash balance to automatically pay for a given transaction item can manually, or even automatically "unpay" the item to "free up" the resultant cash for a much more pressing need, such as an emergency, or to automatically prevent a check from bouncing. Being able to unpay transactions can even prevent hardship for the end user should an anticipated cash payment to the end user from an outside source fail to materialize. It is reasonable that a given card issuer could optionally choose to charge the end user fees for any or all conveniences that the various methods enable.

Also, the created credit-default risk has an advantage for responsible end users. Being that certain faux debit card embodiments comprise credit-default risk, those embodiments justify themselves as valid credit reporting items. Those end users that don't jeopardize themselves by avoiding default using said faux debit card embodiments could have their credit usage related to the faux debit card embodiments reported in a positive light. Therefore, end users of the faux debit card embodiments comprising credit-default risk criteria can see their responsible faux debit card activity potentially maintaining or even improving their credit scores, such as a FICO score. This is a huge advantage over standard debit cards, because activity using a standard debit card has absolutely no bearing on, or advantage towards, maintaining or improving an end user's credit score.

Unusual payment capabilities comprise enabling an end user to user specify or "create at will" at least one new billing cycle, which is handy for the end user, and advantageous to the card issuer, because it saves the end user from having to use a competitor's card due to the fact that the competitor's billing cycle ends later. By enabling the end user to create a new billing cycle, the end user enjoys the capability to postpone the bill payment on a given new purchase for as long as possible, while the card issuer enjoys the end user's card use as a result.

Finally, an advantage to the end user is privacy, whereby nobody in a point-of-sale environment can tell whether the user is paying for a given transaction automatically before or at the close of the billing cycle, or manually after or prior to the close of a billing cycle. This advantage can be especially valued and appreciated by those that feel that others already know too much about them.

Even though merchants probably won't care for the fee structure that the card/account issuer charges, there are certain advantages for the merchant as well. The merchant might not have to deal with an item return, due to an end user's cash shortfall, if the end user instead has the option to unpay a given transaction item, and carry the transaction as an open item to be repaid later, all without involving the merchant whatsoever. Also, an end user that normally pays for certain items automatically using an available cash balance may stop spending if there is uncertainty regarding potential cash balance shortfalls, but may spend anyway if a potential remedy enabling the end user to unpay and repay later is available. An example is where an end user that normally uses an available cash balance to eat in restaurants might stay away from a restaurant given a possibly uncertain future cash position, but might patronize the restaurant if a remedy to unpay, and subsequently repay later, is available, just in case the remedy is needed. Overall, the resultant reduced item returns and the increased patronage by certain end users is viewed as being pluses for merchants.

The advantages disclosed are a significant and unexpected departure from the capabilities of standard credit cards and debit cards.

The present invention provides at least one method, transaction card or identification system, and global account and system for end user automatic or manual presetting or adjustment of partial or total amount account balance payoff, billing cycles, budget control and overdraft protection for at least one debit using at least two related financial accounts maximizing end user control and maximizing global account issuer fees including the designation of such an account to the merchant as a credit card account that designates the merchant interchange fee as a credit card interchange fee.

The method provides in one aspect an enhanced credit card account subject to merchant credit card interchange fees for credit card issuer that also provides for the an end user to specify or modify the payment source from one more accounts in the global financial account.

The preset or adjustable parameter(s) and access to at least two financial accounts for at least one point of sale transaction provide for solutions related the problem of accessing and managing balances in at least two financial accounts as well as partial, split or corresponding debit funds for at least one point of sale transaction. Such access and preset parameter(s) allow the financial account user to have automatic access, without the problems associated with the possibility of insufficient accounts or with having to figure out at the time of the point of sale, whether minimum balances or other aspects of the financial account remaining balances are being maintained after the debit is made for the point of sale transaction.

The present invention overcomes problems and shortcomings of the prior art by including associated multiple cash and credit accounts accessible by transaction card, smart card, signature, PIN, chip and PIN, an electronic signature, a fingerprint, a retinal scan, a DNA test, voice recognition, and face or feature recognition, or any other known form, for methods, systems and apparatus that are able have to preset or adjustable parameters for transferring debits between different accounts, in real time, before or after a transaction, to manage individual or multiple account balances, or to prearrange or adjust the parameters in one or multiple accounts or between accounts, before or after the transaction as to how the accounts are debited.

Accordingly, the present invention provides various utilities to the financial account holder, including, but not limited to, being able to access multiple accounts for debiting funds use for a point of sale transaction at a store or other product or service provider, such as internet, telephone, satellite, intranet, radio/contactless, wireless, and the like, and to before, during or after the transaction to have preset and/or adjustable parameters to provide a multiple or single account debit for one or more transactions that can be assigned to one or more accounts before, during or after the transaction and/or moved to at least one or more different billing cycles.

The present invention further provides the utility of being able to manage financial accounts through preset and/or adjustable parameters that can be used to provide, adjust and/or maintain various aspects of the at least two financial accounts, before, during and after various debit or other financial transactions using such financial accounts, such as, but not limited to, minimum balances, relative balances, debiting using ratios, ranges or relative aspects of the account balances, time related parameters, and other aspects that would be known to one skilled in the relevant arts, e.g., but not limited to finance, banking, business, and the like.

The present invention provides in one aspect a method, system or apparatus for providing an enhanced credit card account subject to merchant credit card interchange fees for a credit card issuer that also provides for the an end user to specify or modify the payment source for an end user to specify or modify the assignment of at least a portion of at least one debit for at least one financial transaction using at least one first financial account and at least one second financial account that can be accessed through at least one global financial account, the method comprising: (a) providing or providing a system component for the at least one global financial account comprising the at least one first financial account comprising at least one first available balance and the at least one second financial account comprising at least one second available balance, wherein the global financial account can be accessed by the end user for managing the assignment of the at least a portion of the at least one debit to at least one of the first or second financial accounts; and (b) automatic or manual readjusting or presetting, prepaying, paying or unpaying, or debiting or crediting or providing a system component for automatic or manual readjusting or presetting, prepaying, paying or unpaying, or debiting or crediting the assignment of the at least a portion of the at least one debit to at least one of the first or second financial accounts based on at least one parameter relating to the first financial account or the second financial account, or the parameter relating at least one of the first or second financial account balances, the automatic or manual readjusting or presetting, prepaying, paying or unpaying, or debiting or crediting executed before, during or after the financial transaction and under the control of the end user.

The present invention also provides a method, system or apparatus for providing at least one global financial account that: (i) is optionally subject to merchant credit card interchange or other fees and end user fees as additional revenue to the global account issuer; and (ii) provides for an end user to specify or modify at least a portion of at least one debit for at least one financial transaction using said at least one global financial account comprising at least one first financial account comprising at least one available balance and at least one second financial account comprising at least one available balance, said method comprising:
 (a) providing or providing a system component that provides said at least one global financial account comprising said at least one first financial account comprising at least one first available balance and said at least one second financial account comprising at least one first available cash balance, wherein said global financial account can be accessed by said at least one end user for automatic or manual readjusting or presetting, prepaying, paying or unpaying, or debiting or crediting, using at least one parameter relating to said at least a portion of said at least one debit for said at least one financial transaction to at least one of said first or second financial accounts, wherein said financial transaction is subject to an associated merchant credit card interchange fee or other fee; and
 (b) said at least one end user or providing a system component that provides said at least one end user automatic or manual readjusting or presetting, prepaying, paying or unpaying, or debiting or crediting said at least a portion of said at least one debit to at least one of said first or second financial accounts according to at least one parameter relating (i) said at least one portion to said first financial account and said second financial account, or (ii) at least one of said first or second financial account balances, said automatic or manual readjusting or presetting, prepaying, paying or unpaying, or debiting or crediting executed before, during or after said financial transaction and under the control of said at least one end user and subject to optional end user fees.

The present invention further provides a method, system or apparatus for providing at least one global financial account that: (i) is subject to merchant credit card interchange or other fees and optional end user fees as additional revenue to the global account issuer; and (ii) provides for an end user to specify or modify at least a portion of at least one debit for at least one financial transaction using said at least one global financial account comprising at least one first financial account comprising at least one available credit balance and at least one second financial account comprising at least one available cash balance, said method comprising:
 (a) providing or providing a system component that provides said at least one global financial account comprising said at least one first financial account comprising at least one first available credit balance and said at least one second financial account comprising at least one first available cash balance, wherein said global financial account can be accessed by said at least one end user for automatic or manual readjusting or presetting, prepaying, paying or unpaying, or debiting or crediting said at least a portion of said at least one debit for said at least one financial transaction to at least one of said first or second financial accounts, wherein said financial transaction is initially provided as a credit card transaction to said merchant and debited to said at least one available credit card balance and subject to an associated merchant credit card interchange fee or other fee; and
 (b) said at least one end user or providing a system component that provides said at least one end user automatic or manual readjusting or presetting, prepaying, paying or unpaying, or debiting or crediting said at least a portion of said at least one debit to at least one of said first or second financial accounts according to at least one parameter relating (i) said at least one portion to said at least one debit to said at least one first financial account, or (ii) at least one of said first or second financial account balances, said automatic or manual readjusting or presetting, prepaying, paying or unpaying, or debiting or crediting executed before, during or after said financial transaction and under the control of said at least one end user and subject to optional end user fees,
wherein said specifying or modifying optionally allows the end user to accomplish at least one of
 (i) increasing an available cash or credit balance by moving said at least a portion of said at least one debit to at least one other credit or cash balance in at least one corresponding financial account in said global financial account;
 (ii) replacing said at least one first portion of said at least one debit in at least one credit or cash account with an alternative at least one second portion of at least one debit from the same or different credit or cash financial account, wherein said first portion is optionally designated as unpaid, and said second portion is designated as paid;
 (iii) moving at least a portion of said at least one debit in at least one credit or cash account to an account with a different or later billing cycle or creating a new billing cycle;

(iv) holding said at least one debit for a period of time as a fraud check to confirm that said financial transaction was made by said at least one end user; or (v) providing a budget management system by preset or manual parameters to manage cash flow in said global financial account.

The method, system or apparatus can further comprise steps or system components, wherein said financial transaction is treated as a credit card debit by said merchant and incurs a merchant interchange fee.

The method, system or apparatus can further comprise steps or system components, wherein said automatic or manual readjusting or presetting, prepaying, paying or unpaying, or debiting or crediting increases the available cash balance in said at least one cash account balance or cash sub-account balance.

The method, system or apparatus can further comprise steps or system components, wherein said increase is provided by moving said at least one portion of at least one debit from a cash financial account to a credit financial account.

The method, system or apparatus can further comprise steps or system components, wherein said increasing of said available cash balance incurs an end user fee.

The method, system or apparatus can further comprise steps or system components, wherein said automatic or manual readjusting or presetting, prepaying, paying or unpaying, or debiting or crediting increases the available credit balance in said first financial account.

The method, system or apparatus can further comprise steps or system components, wherein said increasing of said credit balance is made by a preset or manual parameter that pays off at least a portion of at least one debit from said available credit balance from at least a second available cash balance from at least one of said first or second financial accounts.

The method, system or apparatus can further comprise steps or system components, wherein said increasing of said available credit balance incurs an end user fee.

The method, system or apparatus can further comprise steps or system components, wherein said parameter automatically pays off an outstanding credit balance with at least one of said cash account balance or cash sub-account balances.

The method, system or apparatus can further comprise steps or system components, wherein said payoff is from an available cash balance of at least one of said first, second or other financial accounts in said global financial account before the beginning of the next billing cycle to avoid paying carryover balance fees or interest.

The method, system or apparatus can further comprise steps or system components, wherein said payoff results in no credit risk to the end user, or improves the end user's credit score.

The method, system or apparatus can further comprise steps or system components, wherein the use of said automatic payoff parameter by said at least one end user incurs an end user fee.

The method, system or apparatus can further comprise steps or system components, where said payoff is from an available cash balance of at least one of said first, second or other financial accounts in said global financial account that is done before the beginning of a subsequent billing cycle to provide an increase in the available cash balance in the current billing cycle.

The method, system or apparatus can further comprise steps or system components, where said payoff is from an available cash balance of at least one of said first, second or other financial accounts in said global financial account that is done before the beginning of a subsequent billing cycle to avoid paying carryover balance fees or interest in said subsequent billing cycle.

The method, system or apparatus can further comprise steps or system components, wherein said payoff results in no credit risk to the end user, or improves the end user's credit score.

The method, system or apparatus can further comprise steps or system components, wherein said first and second financial accounts include a credit account related to a cash account.

The method, system or apparatus can further comprise steps or system components, wherein said first and second financial accounts include a first credit account related to a second credit account.

The method, system or apparatus can further comprise steps or system components, wherein said first and second financial accounts include a first cash account related to a second cash account.

The method, system or apparatus can further comprise steps or system components, wherein said first and second financial accounts include a cash account related to a credit account.

The method, system or apparatus can further comprise steps or system components, wherein said cash account acts as an overdraft account for said credit account.

The method, system or apparatus can further comprise steps or system components, wherein said second credit account acts as an overdraft account for said first credit account.

The method, system or apparatus can further comprise steps or system components, wherein said first cash account acts as an overdraft account for said second cash account.

The method, system or apparatus can further comprise steps or system components, wherein said credit account acts as an overdraft account for said cash account.

The method, system or apparatus can further comprise steps or system components, wherein said at least a portion of said at least one debit can be moved to a different account of said at least one first and second financial accounts that has a different timeframe or billing cycle.

The method, system or apparatus can further comprise steps or system components, wherein said different timeframe or billing cycle is a later timeframe or billing cycle.

The method, system or apparatus can further comprise steps or system components, wherein said at least a portion of said at least one debit is assigned to said at least one first financial account balance and later assigned to said at least one second financial account balance.

The method, system or apparatus can further comprise steps or system components, wherein said later assignment results in the initial or subsequence account balance to be 0 or a predetermined amount.

The method, system or apparatus can further comprise steps or system components, wherein said move to a different account is done manually or automatically as designated by the end user on a debit by debit, time period, account balance, or multiple debit basis.

The method, system or apparatus can further comprise steps or system components, wherein said move is based on a parameter involving at least one of a threshold amount, a remainder threshold, a ratio threshold, minimum available account balance, a range of available account balance, a maximum available account balance, a minimum debit amount, a range of debit amounts, or a maximum debit amount.

The method, system or apparatus can further comprise steps or system components, wherein said threshold amount provides that a minimum amount portion of said at least one debit is assigned to one financial account balance and at least a portion of the remainder of said debit amount is assigned to an additional financial account balance in said global financial account.

The method, system or apparatus can further comprise steps or system components, wherein said moved debit portions can be further moved to additional financial account balances in said global financial account.

The method, system or apparatus can further comprise steps or system components, wherein said parameter involves at least one of a threshold amount, a remainder threshold, a ratio threshold, a billing cycle, a time period, a minimum available account balance, a range of available account balance, a maximum available account balance, a minimum debit amount, a range of debit amounts, or a maximum debit amount.

The method, system or apparatus can further comprise steps or system components, wherein said debit is conducted using a transaction card, a smart card, a chip and PIN card, or a magnetic strip card associated with said global financial account.

The method, system or apparatus can further comprise steps or system components, wherein said debit is conducted using a personal identification system.

The method, system or apparatus can further comprise steps or system components, wherein said personal identification system is at least one selected from at least one of personal identification number (PIN), a signature, chip and PIN, an electronic signature, a fingerprint, a retinal scan, a DNA test, voice recognition, and face or feature recognition.

The method, system or apparatus can further comprise steps or system components, wherein said automatic or manual readjusting or presetting, prepaying, paying or unpaying, or debiting or crediting is manually or automatically by at least one parameter that can be further preset or modified by the end user.

The method, system or apparatus can further comprise steps or system components, wherein said parameter is selected from at least one of a threshold amount, a remainder threshold, a ratio threshold, a billing cycle, a time period, a minimum available account balance, a range of available account balance, a maximum available account balance, a minimum debit amount, a range of debit amounts, or a maximum debit amount.

The method, system or apparatus can further comprise steps or system components, wherein said specifying or modifying is at least one of:
  (a) moving said at least a portion of at least one debit from one or more account balances to one or more previously debited or additional account balances in said global financial account;
  (b) splitting said at least a portion of at least one debit between at least two account balances based on (i) partial or total amount of at least one financial transaction or at least one balance in one or more of said accounts; (ii) type of account; (iii) time period relating to said financial transaction or account activity, (iii) billing cycle; (iv) account limit; (v) type of account; (vi) a minimum, maximum or range of at least one transaction threshold, amount or portion; debit threshold, amount or portion; or account threshold, amount or portion; or
  (c) paying off at least a portion of at least one debit from at least one of said first, second or additional financial account in said global financial account, based on (i) partial or total amount of at least one financial transaction or at least one balance in one or more of said accounts; (ii) type of account; (iii) time period relating to said financial transaction or account activity, (iii) billing cycle; (iv) account limit; (v) type of account; (vi) a minimum, maximum or range of at least one transaction threshold, amount or portion; debit threshold, amount or portion; or account threshold, amount or portion; or (vii) chronological or amount ordering of debits in at least one of said financial accounts.

The method, system or apparatus can further comprise steps or system components, wherein said pay off is for an initially or subsequently debited financial account based on at least one financial transaction.

The method, system or apparatus can further comprise steps or system components, wherein said payoff results in no credit risk to the end user, or improves the end user's credit score.

The method, system or apparatus can further comprise steps or system components, wherein said at least one parameter enables at least one given available account balance to be disengaged from one of said first or second financial accounts.

The method, system or apparatus can further comprise steps or system components, wherein said at least one parameter enables minimum or maximum available balance parameters to be set in at least one of said first or second financial accounts.

The method, system or apparatus can further comprise steps or system components, wherein said at least one parameter can be modified by the end user in a real time basis.

The method, system or apparatus can further comprise steps or system components, wherein said at least one parameter can be modified by the end user before, after or during the time the transaction has occurred.

The method, system or apparatus can further comprise steps or system components, wherein said second financial account balance is increased by subsequently reassigning said at least a portion of said debit from said second account balance to said first account balance or a third account balance.

The method, system or apparatus can further comprise steps or system components, wherein said third account balance is paid off in the current or a later billing cycle.

The method, system or apparatus can further comprise steps or system components, wherein, prior to said later assignment of said portion from said first financial account balance to said second financial account balance, when said at least a portion of said at least one debit is assigned to said first financial account balance, the corresponding amount of said at least a portion of said debit is held in said second financial account balance to cover the corresponding amount in said first account balance until said portion is transferred to said second financial account balance.

The method, system or apparatus can further comprise steps or system components, wherein said portion that is reassigned to said second financial account balance can be reassigned to said first account balance or to a third account balance in order to increase said second account balance.

The method, system or apparatus can further comprise steps or system components, wherein said portion is assigned to said second financial account based on a minimum or maximum amount of said debit.

The method, system or apparatus can further comprise steps or system components, wherein said portion is assigned to said second financial account based on a minimum or maximum amount of said first or second financial account balance.

The method, system or apparatus can further comprise steps or system components, wherein the issuer of said global financial account can charge a fee or percentage of the amount of said debit to said at least one end user when said user transfers said portion from at least one of said first and second financial accounts to another financial account.

The method, system or apparatus can further comprise steps or system components, wherein the issuer of said global financial account can charge a fee or percentage of the amount of said debit to said at least one end user when said user transfers said portion from at least one of said first and second financial accounts to another financial account and a balance in at least one of said first and second financial accounts carries over to a subsequent billing cycle.

The method, system or apparatus can further comprise steps or system components, wherein the balance of said first financial account is automatically or manually paid off by at least one second financial account.

The method, system or apparatus can further comprise steps or system components, wherein said pay off is at the end of the current billing cycle.

The method, system or apparatus can further comprise steps or system components, wherein said pay off is at the end of a subsequent billing cycle.

The method, system or apparatus can further comprise steps or system components, wherein said pay off of each of said at least one debit is during the current billing cycle is paid in turn.

The method, system or apparatus can further comprise steps or system components, wherein said pay off of each of said at least one debit is during the current billing cycle is paid in simultaneously.

The method, system or apparatus can further comprise steps or system components, wherein said held amount is released to said second financial account or transferred to another financial account in said global financial account.

The method, system or apparatus can further comprise steps or system components, wherein said at least one end user can automatically or manually hold a debit in at least one of said financial accounts to determine whether the end user made the corresponding financial transaction or whether it was made by a third party not authorized to make the financial transaction.

The method, system or apparatus can further comprise steps or system components, wherein said at least one end user can specify said hold based on distance of held financial transaction debit from end user residence or place of business, being out of state, or out of country.

The method, system or apparatus can further comprise steps or system components, wherein said at least one end user can suspend or interrupt at least one of said parameters.

Such a method is also provided wherein the debit is conducted using a transaction card, e.g., wherein the transaction card is a magnetic stripe card, a smart card, or a personal identification system, e.g., a personal identification number (PIN), an electronic signature, a fingerprint, chip and PIN, a retinal scan, a DNA test, or face or feature recognition, or any other known methods, such as, but not limited to biometrics, to voice recognition, radio related protocols used in wands at a point-of-sale (Exxon/Mobile), EZ Pass, and similar technologies being adapted for cell phones.

The present also invention also provides a method for executing at least one debit for at least one point of sale financial transaction using at least one preset transaction parameter relating the debit amount to the relative account balances in at least two financial accounts, comprising: (a) maintaining the at least two financial accounts comprising at least two available account balances that can be debited remotely via a transaction processor according to at least one preset transaction parameter that relates the debit amount to the relative balances in at least two of the available account balances; (b) processing a request for authorization of the transaction amount against the at least two available account balances, in exchange for goods or services, wherein the transaction amount requested is authorized when at least one selected from (i) the total of the at least two available account balances is greater than or equal to the debit amount; (ii) at least one selected available account balance, as determined by the transaction processor, is greater than or equal to the assigned portion of the debit amount corresponding to the at least one selected available account balance; or (iii) at least one selected available account balance, as determined by the transaction processor, is able to compensate for a deficiency in at least one other selected available account balance that is less than the assigned portion of the debit amount corresponding to the at least one selected available account balance using Rescue or Reject criteria, where the assigned portion is determined by the transaction processor; and wherein the transaction amount is debited from or credited to the at least one available account balances by at least one selected from (i) according to the assigned portion determined by the transaction processor, (ii) according to at least one Best Fit criteria; (iii) according to the assigned portion; and (iv) according to Rescue or Reject criteria.

Such a method can optionally further comprise where the available account balances are accessed from at least one point-of-sale via at least one of an automated clearing house (ACH) network, an electronic funds transfer (EFT), a proprietary network other than an ACH network or EFT (such as Visa, MasterCard, etc.), or via the Internet.

Such a methods can optionally further comprise where the at least two available account balances comprise at least one of one or more of (i) available in-house cash balances or available in-house credit balances, (ii) available out-of-house cash balances or available out-of-house credit balances in addition to the available in-house cash balances or the available in-house credit balances, (iii) available out-of-house cash balances or available out-of-house credit balances.

Such a methods can optionally further comprise where at least one of the at least two available account balances comprise its own account number that enables access via a transaction card, credit card, debit card, ATM card, chip and PIN card, draft, and the like, where the account number is distinct from the account number(s) used to access the global account.

Such a methods can optionally further comprise where the available account balances allow a given end user of the account benefits and reward programs that are available to financial card accounts.

The present invention further provides a system for at least one debit for at least one point of sale financial transaction using at least one preset transaction parameter relating the debit amount to the relative account balances in at least two financial accounts, comprising: (a) a system component for maintaining the at least two financial accounts comprising at least two available account balances that can be debited remotely via a transaction processor according to at least one preset transaction parameter that relates the debit amount to the relative balances in at least two of the available account balances; (b) a system component for processing a request for authorization of the transaction amount against the at least two available account balances, in exchange for goods or services, wherein the transaction amount requested is authorized when at least one selected from (i) the total of the at least two available account balances is greater than or equal to the debit amount; (ii) at least one selected available account balance, as determined by the transaction processor, is greater than or equal to the assigned portion of the debit amount corresponding to the at least one selected available account balance; or (iii) at least one selected available account balance, as determined by the transaction processor, is able to compensate for a deficiency in at least one other selected available account balance that is less than the assigned portion of the debit amount corresponding to the at least one selected available account balance using Rescue or Reject criteria, where the assigned portion is determined by the transaction processor; and wherein the transaction amount is debited or credited from the at least one available account balances by at least one selected from (i) according to the assigned portion determined by the transaction processor (ii) according to at least one Best Fit criteria; (iii) according to the assigned portion; and (iv) according to Rescue or Reject criteria.

Such a system optionally further comprises including where the at least one two available account balances are accessed from a point-of-sale via at least one selected from an ACH network, an electronic funds transfer (EFT), any proprietary network other than an ACH network or EFT (such as Visa, MasterCard, etc.), or via the Internet.

Such a system optionally further comprises where the at least two available account balances comprises (i) one or more of available in-house cash balances or available in-house credit balances; (ii) one or more of available out-of-house cash balances or available out-of-house credit balances in addition to the available in-house cash balances or the available in-house credit balances, or (iii) one or more of available out-of-house cash balances or available out-of-house credit balances.

Such a system optionally further comprises where at least one of the available account balances comprising the at least two available account balances has its own account number that enables access via a transaction card, credit card, debit card, ATM card, chip and PIN card, draft, and the like, where the account number is distinct from the account number(s) used to access the global account. Such a system optionally further comprises where the at least one two available account balances allow a given end user account benefits and reward programs provided by financial card accounts.

The different electronic steps above require use of computer-related components, such as computerized systems, computerized networks, computer processors, computer interfaces, computer-readable mediums, computer-related or electronic apparatus, wired or wireless networks or systems, etc., all of which are well known in their associated arts.

The different electronic steps above require use of computer-related components, such as computerized systems, computerized networks, computer processors, computer interfaces, computer-readable mediums, computer-related or electronic apparatus, wired or wireless networks or systems, etc., all of which are well known in their associated arts.

The present invention is further described by the following description and examples, which do not limit the scope of the present invention, but are representative of the particular aspects of the invention.

DETAILED DESCRIPTION OF THE INVENTION

The present invention provides multiple account, multiple parameter methods, systems, apparatus, transaction cards, and the like for use in managing account balances relating to providing at least one point of sale transaction via access to at least two available financial accounts that can be debited by preset and/or adjustable parameters before, during or after at least one transaction relating the amount of the debit to the relative balances available in the two available financial accounts, including increasing cash or credit balances by adjusting manually or automatically one or more transaction debits between one or more accounts. The preset parameter(s) and access to at least two financial accounts for at least one point of sale transaction provide for solutions related the problem of accessing and managing debit funds for a point of sale transaction without having to go through the delay and difficulties of having specific accounts have insufficient funds for such debits, as well as for providing automatic, preset access instructions or adjustments for the at least two financial accounts. Such access and preset parameter(s) allow the financial account user to have control of and automatic access to such accounts and their relative balances (e.g., cash or credit or overdraft accounts), without the problems associated with the possibility of insufficient accounts or with having to figure out at the time of the point of sale, whether minimum balances or other aspects of the financial account remaining balances are being maintained after the debit is made for the point of sale transaction.

The term debit, as in to debit an available cash balance or to debit an available credit balance, includes debit, debits, debiting, debited, etc. as used throughout this invention, are used in the traditional accounting sense mainly as verbs, as defined in Webster's Revised Unabridged Dictionary,© 1996, 1998 MICRA, Inc.: deb-it \Debit\, v. t. [imp. & p. p. Debited; p. pr. & vb. n. Debiting.] 1. To charge with debt;—the opposite of, and correlative to, credit; as, to debit a purchaser for the goods sold. For example, to debit an available cash balance is to have cash or cash equivalents removed from the available cash balance to pay for a debt, which in many cases pertains to purchases that have been made. On the other hand, to debit an available credit balance for, say, a purchase, is to reduce the available credit balance by the purchase amount, where the reduction reflects a consumption of the available credit balance. Relating with the above Webster's debit definition: To charge with debt, this debiting (consumption) of the available credit balance acts to charge the end user with a debt that must be repaid at a later time. For instance, if an end user uses an available credit balance to make a $100 purchase, the available credit balance is debited for the $100 amount, resulting in basically a $100 debt that is owed. Ultimately, the end user will eventually pay off this $100 debt amount sometime in the future or concurrently using at least one accounts, e.g., but not limited to a cash account, a credit account, a line of equity account, a money market account, a line of credit account, an overdraft account, a savings account, and the like.

The term credit, in its varied forms, is used. For instance, in the event that a purchase is returned to a merchant by an end user, the merchant credits the balance(s) originally used for the purchase. When the merchant credits an end user's available cash balance, cash pertaining to the purchase amount is restored (returned) to the available cash balance. When the merchant credits an end user's available credit balance, the total consumption of the available credit balance is reduced by the amount of the returned purchase transaction as credited by the merchant. What this basically means is that the total amount of the debt that must be repaid at a later time due to total credit balance consumption by the end user is reduced by the amount of the returned purchase transaction. For example, if an end user has total credit balance usage of $500, and then makes a $100 return to a merchant, once the return gets credited by the merchant, the end user will have to repay the debt based only on the readjusted total available credit balance consumption of $400.

The present invention provides methods and uses of financial cards (or other identity based systems, herein after referred to as financial cards) to charge point of sale amounts from one to multiple accounts, as a global account, in a single transaction or connected set of transactions, such that the end user or the financial institution providing the financial card or other identity based system can preset single or multiple parameters for the point of sale transaction to access alternative accounts to provide funds to cover the point of sale transaction, where the account access is other than a demand account that merely covers the amount of insufficient funds in a single account.

The financial card in question can be a regular magnetic stripe card well known to the art. Some card issuers feature magnetic stripe cards with an on-board smart chip; however, in many cases, especially in the United States, the actual chip has seen little, if any use in purchase transactions, as there is a tendency to make use of the smart card's magnetic stripe instead. In any event, magnetic stripe cards with an on-board smart chip may also be employed, although such a card will be used basically for its magnetic stripe capability. It is foreseeable that the actual smart chip could ultimately be useful in facilitating certain transaction aspects, especially with regards to security issues; however, for the time being, any card comprising a standardized magnetic stripe can be used in conjunction with the global account.

Key to this embodiment is the financial card global account belonging to the end user. In terms of present, widely used technology, the global account can be oriented as being PIN-based (on-line using a PIN at the point-of-sale), or signature based (off-line requiring an end-user signature at the point-of-sale), a signature, chip and PIN, an electronic signature, a fingerprint, a retinal scan, a DNA test, voice recognition, and face or feature recognition, or any other known methods, such as, but not limited to biometrics, to voice recognition, contactless and/or radio related protocols used in wands at a point-of-sale (Exxon/Mobile), EZ Pass, and similar technologies being adapted for cell phones, or any combination thereof. As mentioned earlier, it is important to understand that the present invention is not intended to be limited to only PIN-based, a signature, chip and PIN, an electronic signature, a fingerprint, a retinal scan, a DNA test, voice recognition, face or feature recognition accounts, and contactless and/or radio related protocols, but may be adapted to use any other system component of security/verification and/or system routing other than PIN-based or signature based system components, comprising retinal scanning, fingerprints, and/or other unique cardholder physical system component, with or without employing a financial card, either using currently known networks, any future network, or the Internet. While banks considering the present invention would tend to favor PIN-based embodiments, and card issuers would tend to favor signature-based embodiments, such is merely an observation, and not a limitation. The global account comprises at least two available account balances. Available account balances fall under two general headings: an available cash balance, and an available credit balance.

With regard to the at least two available cash balances, is important that all of the at least two available cash balances earmarked for actual financial card purchase transactions are legally able to be used as a demand account according to 12 C.F.R. (Code of Federal Regulations) section 329.2 mentioned earlier, which is repeated as follows: No bank shall, directly or indirectly, by any device whatsoever, pay interest on any demand deposit. An example of an account that pays interest, and is precluded from being used for financial card purchase transactions according to 12 C.F.R. section 329.2, is a savings account. The plurality of available cash balances includes any type of available cash balance, such as a checking account balance; or cash equivalent balance that can be used for purchases, such as a money market fund, where one unit or share of a money market fund equals, say, one U.S. dollar. Furthermore, should federal regulations somehow change to where interest bearing accounts are permitted to be used as demand accounts, or methods emerge that legally enable interest bearing accounts to be manipulated and used in demand account situations, then such accounts would be deemed usable for purposes of this disclosure as available cash balances.

A very important distinction should be made at this time. Just because an interest-bearing savings account cannot be used for financial card purchase transactions does not necessarily mean that the financial card global account cannot comprise an interest-bearing savings account to good effect. The disclosed financial card global account can comprise at least one interest-bearing non-demand account to enable ATM (automated teller machine) withdrawals. ATM cash withdrawals on interest-bearing savings accounts have absolutely no implications with regard to 12 C.F.R. section 329.2; however, debit card transactions that debit interest-bearing savings accounts are prohibited under 12 C.F.R. section 329.2.

At this time, the term point-of-sale should be clarified. A kind of point-of-sale that is readily apparent is at a store, where the end user swipes his financial card in the presence of a merchant or service provider. The term point-of-sale, as it is used in this invention, is meant to encompass all manners and physical locations that are the origin for the debiting of the global account. Furthermore, the end user does not actually have to be present at the merchant location for the transaction to be considered, for purposes of this invention, as a point-of-sale transaction. For example, should an end user enter his financial card account number on the website for a given merchant, it is considered a point-of-sale transaction, even if the end user is making the purchase on a computer in the end user's house. Should an end user phone in a card account number from his home to a merchant; it is considered a point-of-sale transaction. Should a merchant or service provider automatically debit the global financial account, such as in the case of an automatic monthly payment to the merchant or service provider, it is still considered to be a point-of-sale transaction for purposes of this invention.

With regard to the plurality of available credit balances, available credit balances comprise three general categories: The first is the revolving credit balance that is used in credit cards, in which an end user pays interest on balances not paid in full after the close of the billing cycle. The second is the charge balance used in charge cards, in which an end user is expected to pay balances in full after the close of the billing cycle. The third is a line of credit, which some banks offer to some end users of checking accounts and/or debit cards. Unlike a revolving credit balance or even a charge balance, typical lines of credit tend to not allow interest-free grace periods for purchase transactions. Also, lines of credit tend not to offer the myriad of credit card type benefits, such as reward programs, purchase protection programs, limited fraud liability, etc. It is envisioned as desirable for embodiments of this invention that make use of at least one available credit balance to avail end users to benefits normally associated with credit card offerings; nonetheless, lines of credit should be considered as extremely usable for embodiments of the present invention that are PIN-based. Furthermore, there are real no obstacles other than costs that prevent an entity that offers a PIN-based embodiment to offer features and benefits to end users of a line of credit that in some or many ways resemble end-user features and benefits of typical of signature-based credit card embodiments. Finally, an available credit balance is meant to include any manner or embodiment of an available credit balance for purposes of this invention, and is not intended to be limited only to a revolving credit balance, charge balance, or line of credit.

The at least two available account balances may comprise any combination of available account balances belonging to an end user. For example, if the plurality comprises two available account balances, the two available account balances can comprise two available cash balances, two available credit balances, or one available cash balance, and one available credit balance. Likewise, if the plurality comprises three or more available account balances, the three or more available account balances can comprise any combination of available cash balances, and/or available credit balances, with the plurality possibly comprising at least one available balance that is specifically used for ATM cash withdrawals that may or may not pay interest.

The at least two available account balances is intended to function under the aegis of the global account; nonetheless, it may be desirable to be able to access a particular available account balance for whatever reason. Therefore, it is possible for at least one of the available account balances comprising the global account to have its own account number that enables access via a credit card, debit card, ATM card, draft, etc., that is distinct from the account number(s) used to access the global account.

A relatively simple and especially effective combination is where the at least two available account balances comprises two available account balances, where one available balance is an available cash balance, and the other is an available credit balance. The chart examples that will be provided later will focus mainly on a global account comprising one available cash balance and one available credit balance. As a side note, it is possible for an end user to open a global account with one available cash balance, and one available credit balance, and begin to use the account without having the cash account funded by just using the available credit balance. Then, as the end user becomes more comfortable with the workings of the account, or has the system component to fund the available cash balance, the end user can then fund the available cash balance and begin to take advantage of the global account's true flexibility.

A vital element to the disclosed global account belonging to an end user is the transaction processor. The transaction processor links together and controls the at least two available account balances. What is especially salient is that the transaction processor enables a given incoming transaction to be debited among the at least two available account balances in accordance with preset and/or adjustable. A note about the location of the available account balances is in order. While it is envisioned as being most efficient overall with regards to implementation and costs for the at least two account balances to be maintained at the same financial institution as the global account comprising the transaction processor, where all the available account balances are in-house, it is possible for at least one out-of-house available account balance to be linked to the transaction processor that is part of the global account comprising at least one in-house available account balance. Furthermore, it is disclosed that it is possible to have an embodiment of the transaction processor that works only with out-of-house available account balances, where the embodiment does not comprise any in-house available account balances whatsoever.

Cardholders who are provided with a multiple account may also be provided with authentication credentials for identity verification during subsequent processes. In an exemplary system, the enrolled cardholder is given an ID and password to be used upon subsequent access to the multiple account web site in order to gain access to screens that support multiple account processes. In an alternative embodiment, the cardholder may be prompted to select a password, or answer a secret question, where this information can be used during any or all of the mechanisms for providing information and requesting processes.

The cardholder communicates information to a multiple account processor through one or more of a variety of mechanisms such as submission of on-line form, mail of a paper form, telephone conversation with cardholder service representative, or telephone interaction with voice or touch-tone response unit. The cardholder may be required to provide authentication credentials before proceeding with this process. In an exemplary embodiment, if the cardholder accesses and logs-in to a web site, an ID and password may be required, or an ID and password may be provided for subsequent use at the site, for example, in creating associations. The information provided by the cardholder generally includes: the account number of the transaction account to be associated and a PIN, a signature, chip and PIN, an electronic signature, a fingerprint, a retinal scan, a DNA test, voice recognition, and face or feature recognition or other identification number, and may also include other information such as the name, expiration date, billing address, and other identifying information associated with the particular transaction account.

A discussion of the capabilities of the transaction processor will center on the varied parameters of the transaction processor. Understand that numerous examples will be presented using specific parameter values, where the values are highly variable, and where the specific values used in the actual examples are somewhat, if not absolutely, arbitrary and represent only a snapshot of a wider range. For example, a parameter value of 50% used in a given example could just as easily be 75%, 33.33%, or even 2%. Furthermore, a given ratio can be expressed and set using any mathematical expression or terminology, such as a percentage (50%), a fraction (½ or one-half), proportion (1 part available balance #1 to 2 parts available balance #2, or 1:2, or 1 to 2), an expression (use all cash balance, meaning 100% cash; or, use all credit balance meaning 100% credit), etc. With regard to threshold amounts, the threshold amounts presented in examples are arbitrary, meaning that, in reality, a threshold amount of $2 can be entered just as easily as a threshold amount of $25, $50, or $100.

Finally, it should be understood that the available account balances used in examples are readily interchangeable. For instance, a given example that illustrates 100% of a given transaction debiting an available cash balance can be easily revised so that the example shows 100% of a given transaction debiting an available credit balance.

RATIO USING TWO AVAILABLE ACCOUNT BALANCES—One such parameter of the transaction processor comprises having at least one ratio, where an end user can elect to have, for instance, 50% (one-half) of the transaction amount debiting an available cash balance, with the remaining 50% (one-half) debiting an available credit balance. While the examples presented have round U.S. dollar amounts, transactions in U.S. dollars certainly do occur in amounts where an odd dollar amount distributed amongst two or more available account balances would result in fractions of a cent. For example, an amount of $10.01 that is split in a 50/50 ratio amongst two accounts would ordinarily result in each account being debited $5 and one-half cent. Any desired workable solution to this situation may be employed, including where either of the two available account balances gets debited the extra cent, account balances alternate as to which account balance gets debited the extra cent, fractional cents are carried and readjusted at the end of the billing cycle, etc. The solution(s) to the fractional situation could be predetermined by the account provider, or could possibly even be selected by the end user. Also, when considering the examples that will be presented, remember that it is possible for embodiments comprising two available account balances to just as easily comprise two available cash balances (where headings could read Cash #1 and Cash #2), or two available credit balances (where headings could read Credit #1 and Credit #2), in place of the provided examples comprising one available cash balance and one available credit balance. A chart example, showing a month's worth of transactions, is as follows:

| Date | Description | Amount | Cash | Credit |
|---|---|---|---|---|
| 01-02 | Restaurant | 48.00 | 24.00 | 24.00 |
| 01-03 | Gasoline | 21.00 | 10.50 | 10.50 |
| 01-05 | Shoe Store | 36.00 | 18.00 | 18.00 |
| 01-06 | Supermarket | 63.00 | 31.50 | 31.50 |
| 01-14 | Gasoline | 15.00 | 7.50 | 7.50 |
| 01-18 | Appliance Store | 750.00 | 375.00 | 375.00 |
| 01-24 | Gasoline | 18.00 | 9.00 | 9.00 |
| 01-30 | Restaurant | 33.00 | 16.50 | 16.50 |
| | TOTAL | 984.00 | 492.00 | 492.00 |

The ratio using two available account balances can be set in any way, ranging anywhere from where 100% of a given transaction debits an available cash balance (all cash), to where 100% of the transaction debits an available credit balance (all credit), and any point between the two extremes.

Examples demonstrating 100% of a given available account balance, with varied circumstances, will now be presented.

RATIO USING TWO AVAILABLE ACCOUNT BALANCES—DEPLETION EXAMPLE—SPLIT TRANSACTIONS PERMITTED—This example shows where the end user uses a ratio of 100% of the available cash balance, but where, upon depletion of the %100 cash balance, the end user not only permits the available credit balance to take over, but also permits a given transaction to be split between the available cash and the available credit balance. In this example, the card not only shifts seamlessly from acting as a debit card to acting as a credit card, but also does so during the transaction dated 01-05.

| Date | Description | Amount | Cash | Credit |
|---|---|---|---|---|
| AVAILABLE CASH BALANCE OF THE DEBIT CARD CASH ACCOUNT - $100.00 | | | | |
| 01-02 | Restaurant | 48.00 | 48.00 | -0- |
| 01-03 | Gasoline | 21.00 | 21.00 | -0- |
| 01-05 | Shoe Store | 36.00 | 31.00 | 5.00 |
| AVAILABLE CASH DEPLETED - REMAINDER TAKEN FROM AVAILABLE CREDIT BALANCE | | | | |
| 01-06 | Supermarket | 63.00 | -0- | 63.00 |
| 01-14 | Gasoline | 15.00 | -0- | 15.00 |
| 01-18 | Appliance Store | 750.00 | -0- | 750.00 |
| 01-24 | Gasoline | 18.00 | -0- | 18.00 |
| 01-30 | Restaurant | 33.00 | -0- | 33.00 |
| | TOTAL | 984.00 | 100.00 | 884.00 |

RATIO USING TWO AVAILABLE ACCOUNT BALANCES—DEPLETION EXAMPLE—SPLIT TRANSACTIONS NOT PERMITTED—The following example shows where the end user uses a ratio of 100% of the available cash balance, but where, upon depletion of the $100 cash balance, the end user permits the available credit balance to take over. However, in this example, the end user does not permit a given transaction to be split between the available cash and the available credit balance, and desires that the available cash balance is debited only if the amount in the cash account is enough to pay for a given transaction in full. In this example, the card account shifts back and forth between using available cash and available credit depending on the size of the transaction, as seen in the transaction dated 01-14.

| Date | Description | Amount | Cash | Credit |
|---|---|---|---|---|
| AVAILABLE CASH BALANCE OF THE DEBIT CASH ACCOUNT PORTION - $100.00 | | | | |
| 01-02 | Restaurant | 48.00 | 48.00 | -0- |
| 01-03 | Gasoline | 21.00 | 21.00 | -0- |
| 01-05 | Shoe Store | 36.00 | -0- | 36.00 |
| AVAILABLE CASH ($31) IS LESS THAN TRANSACTION AMOUNT | | | | |
| 01-06 | Supermarket | 63.00 | -0- | 63.00 |
| 01-14 | Gasoline | 15.00 | 15.00 | -0- |
| 01-18 | Appliance Store | 750.00 | -0- | 750.00 |
| AVAILABLE CASH ($16) IS LESS THAN TRANSACTION AMOUNT | | | | |
| 01-24 | Gasoline | 18.00 | -0- | 18.00 |
| 01-30 | Restaurant | 33.00 | -0- | 33.00 |
| | TOTAL | 984.00 | 84.00 | 900.00 |

RATIO USING TWO AVAILABLE ACCOUNT BALANCES—DEPLETION EXAMPLE MAINTAINING A MINIMUM BALANCE—SPLIT TRANSACTIONS PERMITTED—This example shows where the end user uses a ratio of 100% of the available cash balance, but where, upon depletion of the cash balance, the end user permits the available credit balance to take over, where the end user permits a given transaction to be split between the available cash and the available credit balance. However, in this example, the card shifts from using the available cash balance to using the available credit balance while withholding $20 from being used for purchase transactions. Here, a minimum amount is specified to the transaction processor. The transaction processor enables minimums to be maintained on any available account balance as specified by the end user and/or the card entity. There could be one or more of reasons why maintaining a minimum available balance may be desirable. For instance, the card entity may want a minimum cash balance on hand for whatever internal reasons; the end user may want a minimum cash balance on hand that allows an emergency ATM withdrawal without having to pay a cash advance fee, which would happen if a cash withdrawal was to occur on an account having a zero available cash balance; or, if the account was set up where funds from the cash balance are used to pay the minimum payment due on an outstanding credit balance, the end user may want a minimum cash balance on hand to cover the minimum payment due. Minimum available cash balances are also useful in direct deposit situations. For example, an end user that has a direct deposit that credits an available cash balance for $5000 may wish to have $2000 withheld from being used for purchase transactions, where the $2000 amount that is withheld is earmarked and used for writing a check against the available cash balance to pay a mortgage payment. Furthermore, minimum balances could be useful for available credit balances, whereas an end user that has an available credit balance (or credit limit) of, say, $7000 does not really wish to use more than $3000 of the available credit balance during any one billing cycle. Here, the end user would specify that he wants to maintain a minimum available credit balance of $4000. Other ways of stating this is where the end user specifies that he does not want to use the final $4000 of his available credit balance, or that he wants to consume no more than $3000 of his $7000 available credit balance.

| Date | Description | Amount | Cash | Credit |
|---|---|---|---|---|
| AVAILABLE CASH BALANCE - $100.00 CASH BALANCE NOT PERMITTED TO GO BELOW $20.00 | | | | |
| 01-02 | Restaurant | 48.00 | 48.00 | -0- |
| 01-03 | Gasoline | 21.00 | 21.00 | 21.00 |
| 01-05 | Shoe Store | 36.00 | 11.00 | 25.00 |
| $20 MINIMUM THRESHOLD REACHED - REMAINDER TAKEN FROM AVAILABLE CREDIT BALANCE | | | | |
| 01-06 | Supermarket | 63.00 | -0- | 63.00 |
| 01-14 | Gasoline | 15.00 | -0- | 15.00 |
| 01-18 | Appliance Store | 750.00 | -0- | 750.00 |
| 01-24 | Gasoline | 18.00 | -0- | 18.00 |
| 01-30 | Restaurant | 33.00 | -0- | 33.00 |
| | TOTAL | 984.00 | 80.00 | 984.00 |

RATIO USING TWO AVAILABLE ACCOUNT BALANCES—DEPLETION EXAMPLE MAINTAINING A MINIMUM BALANCE—SPLIT TRANSACTIONS NOT PERMITTED—This example shows where the end user uses a ratio of 100% of the available cash balance, where upon depletion of the cash balance, the end user permits the available credit balance to take over; however, the end user does not allow transactions to be split between the available cash and the available credit balance in the event of a depleted account condition. This example also demonstrates $20 being withheld as a minimum cash balance amount that precludes the $20 from being used for purchase transactions. Being that split transactions are not permitted, the $11 cash balance is not used after the transaction dated 01-05 due to the fact that none of the month's remaining transactions are less than or equal to $11.

| Date | Description | Amount | Cash | Credit |
|---|---|---|---|---|
| AVAILABLE CASH BALANCE OF THE DEBIT CASH ACCOUNT PORTION - $100.00; CASH BALANCE NOT PERMITTED TO GO BELOW $20.00 | | | | |
| 01-02 | Restaurant | 48.00 | 48.00 | -0- |
| 01-03 | Gasoline | 21.00 | 21.00 | -0- |
| 01-05 | Shoe Store | 36.00 | -0- | 36.00 |
| 01-05 | $11 AVAILABLE CASH ($31 minus $20 minimum threshold) IS LESS THAN TRANSACTION AMOUNT | | | |
| 01-06 | Supermarket | 63.00 | -0- | 63.00 |
| 01-14 | Gasoline | 15.00 | -0- | 15.00 |
| 01-18 | Appliance Store | 750.00 | -0- | 750.00 |
| 01-24 | Gasoline | 18.00 | -0- | 18.00 |
| 01-30 | Restaurant | 33.00 | -0- | 33.00 |
| | TOTAL | 984.00 | 69.00 | 915.00 |

RATIO USING THREE AVAILABLE ACCOUNT BALANCES—More than two accounts can be employed in a given ratio, such as where 33.33% (one-third) of the transaction amount debits an available cash balance, 33.33% debits available credit balance #1, and 33.33% debits available credit balance #2, as will be seen in the following chart example for a month's transaction activity:

| | Description | Amount | Cash | Credit #1 | Credit #2 |
|---|---|---|---|---|---|
| 01-02 | Restaurant | 48.00 | 16.00 | 16.00 | 16.00 |
| 01-03 | Gasoline | 21.00 | 7.00 | 7.00 | 7.00 |
| 01-05 | Shoe Store | 36.00 | 12.00 | 12.00 | 12.00 |
| 01-06 | Supermarket | 63.00 | 21.00 | 21.00 | 21.00 |
| 01-14 | Gasoline | 15.00 | 5.00 | 5.00 | 5.00 |
| 01-18 | Appliance Store | 750.00 | 250.00 | 250.00 | 250.00 |
| 01-24 | Gasoline | 18.00 | 6.00 | 6.00 | 6.00 |
| 01-30 | Restaurant | 33.00 | 11.00 | 11.00 | 11.00 |
| | TOTAL | 984.00 | 328.00 | 328.00 | 328.00 |

A Singular Account Balance that May be Split into Two or More Available Account Balances, and May Optionally be Recombined Back to a Singular Account Balance A global account may also take the guise of an account that has only one singular account balance, such as a singular available credit balance with a singular billing cycle, where the transaction processor has the capability to split a singular account balance into two or more available balances, with (or even without) offsetting billing cycles. Such a global account may allow any or all capabilities disclosed in this and the above examples such as percentage/ratio functions, transaction amount/available balance thresholds, etc. In the case of a singular credit balance that can be split, credit limit amounts may be established for each of the available credit balances individually, or a total global credit limit amount may be established that encompasses all of the available credit balances. Conversely, thanks to the transaction processor, the account user or issuer can optionally have the capability to undo the split by recombining the plurality of available credit balances back into a singular balance, which is especially useful should, say, an end user decide that maintaining more than one available credit balance is unwieldy. An issuer's existing user accounts comprising an available credit balance (as in a standard credit card account) that do not have such capability may even be modified with the transaction processor described herein. Such account-splitting capabilities lend themselves not only to global accounts with one available account balance, but may be adapted to work with a global account comprising at least two available account balances, where one or more of the available account balances may be split and (optionally) recombined.

Here's an example illustrating where two available credit balances with staggered billing cycles are used in conjunction with an available cash balance as a sample of the myriad combinations that the transaction processor enables. The transaction processor is set up to where transactions up to $50.00 debit the available cash balance; transactions above $50.00 and up to $100.00 debit the available credit balance with the nearest billing cycle close ("Credit #1"); and transactions above $100.00 debit the available credit balance with the furthest billing cycle close ("Credit #2"). Such a setup assures that while relatively smaller purchases debit the available credit balance closer to the billing cycle close, relatively larger purchases will always debit the available balance that has a billing cycle close that is further out.

| Date | Description | Amount | Cash | Credit #1 | Credit #2 |
|---|---|---|---|---|---|
| 01-02 | Restaurant | 48.00 | 48.00 | -0- | -0- |
| 01-03 | Gasoline | 21.00 | 21.00 | -0- | -0- |
| 01-05 | Shoe Store | 36.00 | 36.00 | -0- | -0- |
| 01-06 | Supermarket | 63.00 | -0- | 63.00 | -0- |
| 01-14 | Gasoline | 15.00 | 15.00 | -0- | -0- |
| 01-18 | Appliance Store | 750.00 | -0- | -0- | 750.00 |
| 01-24 | Gasoline | 18.00 | 18.00 | -0- | -0- |
| 01-30 | Restaurant | 33.00 | 33.00 | -0- | -0- |
| | TOTAL | 984.00 | 171.00 | 63.00 | 750.00 |

Before the next discussion commences, what needs to be understood is that parameters such as ratio, threshold, minimum balance, etc. can be continually changed at will. For example, at the beginning of a new billing cycle, an end user can elect to have transactions debit 50% available cash and 50% available credit, while in the middle of the billing cycle the end user can introduce a new threshold parameter, while near the end of the billing cycle, the end user changes a ratio to debit account balances for transactions using 20% available cash and 80% available credit.

Singular Account Balance that May be Split into Two or More Available Account Balances, and May Optionally be Recombined Back to a Singular Account Balance A global account may also take the guise of an account that has only one singular account balance, such as a singular available credit balance with a singular billing cycle, where the transaction processor has the capability to split a singular account balance into two or more available balances, with (or even without) offsetting billing cycles. Such a global account may allow any or all capabilities disclosed in this and the above examples such as percentage/ratio functions, transaction amount/available balance thresholds, etc. In the case of a singular credit balance that can be split, credit limit amounts may be established for each of the available credit balances individually, or a total global credit limit amount may be established that encompasses all of the available credit balances. Conversely, thanks to the transaction processor, the account user or issuer can optionally have the capability to undo the split by recombining the plurality of available credit balances back into a singular balance, which is especially useful should, say, an end user decide that maintaining more than one available credit balance is unwieldy. An issuer's existing user accounts comprising an available credit balance (as in a standard credit card account) that do not have such capability may even be modified with the transaction processor described herein. Such account-splitting capabilities lend themselves not only to global accounts with one available account balance, but may be adapted to work with a global account comprising at least two available account balances, where one or more of the available account balances may be split and (optionally) recombined.

Here's an example illustrating where two available credit balances with staggered billing cycles are used in conjunction with an available cash balance as a sample of the myriad combinations that the transaction processor enables. The transaction processor is set up to where transactions up to $50.00 debit the available cash balance; transactions above $50.00 and up to $100.00 debit the available credit balance with the nearest billing cycle close ("Credit #1"); and transactions above $100.00 debit the available credit balance with the furthest billing cycle close ("Credit #2"). Such a setup assures that while relatively smaller purchases debit the available credit balance closer to the billing cycle close, relatively larger purchases will always debit the available balance that has a billing cycle close that is further out.

| Date | Description | Amount | Cash | Credit #1 | Credit #2 |
|---|---|---|---|---|---|
| 01-02 | Restaurant | 48.00 | 48.00 | -0- | -0- |
| 01-03 | Gasoline | 21.00 | 21.00 | -0- | -0- |
| 01-05 | Shoe Store | 36.00 | 36.00 | -0- | -0- |
| 01-06 | Supermarket | 63.00 | -0- | 63.00 | -0- |
| 01-14 | Gasoline | 15.00 | 15.00 | -0- | -0- |
| 01-18 | Appliance Store | 750.00 | -0- | -0- | 750.00 |
| 01-24 | Gasoline | 18.00 | 18.00 | -0- | -0- |
| 01-30 | Restaurant | 33.00 | 33.00 | -0- | -0- |
| | TOTAL | 984.00 | 171.00 | 63.00 | 750.00 |

Before the next discussion commences, what needs to be understood is that parameters such as ratio, threshold, minimum balance, etc. can be continually changed at will. For example, at the beginning of a new billing cycle, an end user can elect to have transactions debit 50% available cash and 50% available credit, while in the middle of the billing cycle the end user can introduce a new threshold parameter, while near the end of the billing cycle, the end user changes a ratio to debit account balances for transactions using 20% available cash and 80% available credit.

Splitting a Billing Cycle

Possible ways by which to achieve the desired end of splitting a billing cycle comprise:

Enabling the original, non-split billing cycle to be split, or converted, into two or more billing cycles by a) using a transaction processor instruction change that changes the debiting timeframe of the original billing cycle; and, b) switching on at least one additional billing cycle, where the transaction processor coordinates the debiting timeframe(s) of the at least one additional billing cycle with the timeframe change of the original billing cycle.

Enabling the original, non-split, billing cycle to be replaced by two or more billing cycles by a) switching off the original billing cycle; and, b) switching on at least two additional billing cycles, where the transaction processor coordinates the debiting timeframes among the at least two billing cycles.

The switching on and off of billing cycles may be realized in any manor. For example, a billing cycle may have a "toggle" that switches it on or off, similar to where the transaction processor enables an end user the capability to turn on or off a billing cycle at will. Other means of switching on and off billing cycles include using a billing cycle debiting instruction change, such as where the transaction processor can change a billing cycle debiting ratio or percentage parameter for a given available balance from 100% (debit the full transaction amount from a given billing cycle) to 0% (debit none of the transaction amount from a given billing cycle).

This first example illustrates transactions debiting only the original billing cycle, whereby the end user has not elected the option of splitting the original billing cycle into two billing cycles. If we visualize this in terms of a singular billing cycle that ends on 1/31, when the account issuer closes the cycle and sends out the billing statement, the end user then has to make some form of reconcilement to the account issuer such as payment, interest due, etc. This 1/31 end of billing cycle gives the end user very little "breathing room" on the purchase made immediately before the close of the billing cycle.

| Date | Description | Transaction Amount | Debit to Orig Billing Cycle | Debit to Split Billing Cycle |
|---|---|---|---|---|
| 01-02 | Restaurant | 48.00 | 48.00 | -0- |
| 01-03 | Gasoline | 21.00 | 21.00 | -0- |
| 01-05 | Shoe Store | 36.00 | 36.00 | -0- |
| 01-06 | Supermarket | 63.00 | 63.00 | -0- |
| 01-14 | Gasoline | 15.00 | 15.00 | -0- |
| 01-18 | Appliance Store | 750.00 | 750.00 | -0- |
| 01-24 | Gasoline | 18.00 | 18.00 | -0- |
| 01-30 | Restaurant | 33.00 | 33.00 | -0- |
| | TOTAL | 984.00 | 984.00 | -0- |

In the following example, the original singular billing cycle is split. Here, the original billing cycle is debited until 1/15. At that point, it basically becomes dormant with regard to debiting until the after end of the month (where it would become active again at the start of the next month). The split billing cycle originates (or begins anew) and is debited from 1/16 until the end of the month (1/31), then it becomes dormant with regard to debiting until after 2/15, when it restarts debiting. The account issuer can arrange for reconcilement (bill payment, interest accumulation, etc.) of the first billing cycle, which is now a half debiting cycle (1/1 to 1/15) to not be due until after 1/31, and reconcilement for the second half billing cycle (1/16 to 1/31) to not be due until after 2/15. This way, an end user can make a large purchase on the last day of the month, which, under the old system was the last day of the billing cycle, and have at least two weeks before reconcilement is due.

| Date | Description | Transaction Amount | Debit to Orig Billing Cycle | Debit to Split Billing Cycle |
|---|---|---|---|---|
| 01-02 | Restaurant | 48.00 | 48.00 | -0- |
| 01-03 | Gasoline | 21.00 | 21.00 | -0- |
| 01-05 | Shoe Store | 36.00 | 36.00 | -0- |
| 01-06 | Supermarket | 63.00 | 63.00 | -0- |
| 01-14 | Gasoline | 15.00 | 15.00 | -0- |
| 01-18 | Appliance Store | 750.00 | -0- | 750.00 |
| 01-24 | Gasoline | 18.00 | -0- | 18.00 |
| 01-30 | Restaurant | 33.00 | -0- | 33.00 |
| | TOTAL | 984.00 | 183.00 | 801.00 |

The following embodiment shows a variation, which achieves a similar result to the above, where the end user decides to use split billing cycles instead of the original full billing cycle balance. In this instance, the original full-cycle balance is rendered dormant by the transaction processor, with subsequent activity taking place between split billing cycle #1, and split billing cycle #2. As an aside, in reference to any of these examples, the question of credit limit comes into play. Any one billing cycle, regardless of whether it is the original billing cycle, or a split billing cycle, may have has its own available credit limit; or, any two or more billing cycles within a plurality of billing cycles may share a total credit limit.

| Date | Description | Transaction Amount | Debit to Orig Billing Cycle | Debit to Split Billing Cycle #1 | Debit to Split Billing Cycle #2 |
|---|---|---|---|---|---|
| 01-02 | Restaurant | 48.00 | -0- | 48.00 | -0- |
| 01-03 | Gasoline | 21.00 | -0- | 21.00 | -0- |
| 01-05 | Shoe Store | 36.00 | -0- | 36.00 | -0- |
| 01-06 | Supermarket | 63.00 | -0- | 63.00 | -0- |
| 01-14 | Gasoline | 15.00 | -0- | 15.00 | -0- |
| 01-18 | Appliance Store | 750.00 | -0- | -0- | 750.00 |
| 01-24 | Gasoline | 18.00 | -0- | -0- | 18.00 |
| 01-30 | Restaurant | 33.00 | -0- | -0- | 33.00 |
| | TOTAL | 984.00 | -0- | 183.00 | 801.00 |

Billing Cycles Created/Triggered by End User

Up until this point, enabling one split billing cycle cuts the standard billing cycle in half, where each of the two billing cycles are debited for half a billing cycle. It is certainly possible, and within the scope of this disclosure, for more than two billing cycles to be effected (where three billing cycles would each be debited for a third of a billing cycle, four billing cycles would each be debited for a quarter of a billing cycle, etc), although the end result could become unwieldy. What is also within the scope is where the end user could wish to initiate a splitting of a singular billing cycle, or an additional splitting of an already existing plurality of billing cycles, at a random point in the billing cycle that does not coincide with the half-point, third-point, quarter-point, etc., of the billing cycle. Say an end user wishes to place an especially large charge on his available credit balance, and wishes to maximize the amount of time before the bill becomes due. He can create the start of a new billing cycle, either by originating the new billing cycle "at-will" when desired (where the end user simply starts or otherwise specifies the start of a new billing cycle in real-time), or by using a date parameter to schedule the start time of the new billing cycle, either pre-dating or scheduling ahead of time (specifying on a Monday the start of a new billing cycle two days later on a Wednesday), or even post-dating after the fact (where the end user specifies on say, a Wednesday, that a new billing cycle was to start two days prior, on the previous Monday). While the ability to pre-date the start of a billing cycle has certain organizational advantages, being able post-date the start of a billing cycle is very useful whereby if the end user made a large purchase on a Monday, and decided two days later on a Wednesday that he wanted the Monday purchase on a new billing cycle, he would be able to create on Wednesday a new billing cycle that started two days earlier on the prior Monday. In any event, once the new cycle is originated, new purchase transaction debits on the current billing cycle can discontinue (where the prior billing cycle would be rendered dormant for new charges, but not for repayment) and new purchase transaction debits can take place on the newly originated cycle.

| Date | Description | Transaction Amount | Debit to Orig Billing Cycle | Debit to New Billing Cycle |
|---|---|---|---|---|
| 01-02 | Restaurant | 48.00 | 48.00 | -0- |
| 01-03 | Gasoline | 21.00 | 21.00 | -0- |
| 01-05 | Shoe Store | 36.00 | 36.00 | -0- |
| 01-06 | Supermarket | 63.00 | 63.00 | -0- |
| 01-14 | Gasoline | 15.00 | 15.00 | -0- |
| 01-18 | USER CREATES NEW BILLING CYCLE FOR APPLIANCE STORE PURCHASE | | | |
| 01-18 | Appliance Store | 750.00 | -0- | 750.00 |
| 01-19 | USER REVERTS BACK TO OLD BILLING CYCLE FOR REMAINDER OF MONTH | | | |
| 01-24 | Gasoline | 18.00 | 18.00 | -0- |
| 01-30 | Restaurant | 33.00 | 33.00 | -0- |
| | TOTAL | 984.00 | 234.00 | 750.00 |

In this example, the original billing cycle is in force. The end user, realizing that he has a large $750 purchase to make, wants to optimize the length of time that he has to pay for it, creates a new billing cycle "at-will" just prior to making the desired purchase. To him, this is absolutely superior to using another credit card account, because the other account's billing cycle could be closing sooner than desired, wherein with the present disclosure, the user is assured the maximum time on the "at-will" created billing cycle.

It is conceivable that an end user could want the option of reverting back to debiting his preexisting billing cycle. In the above example, on 01-19, the end user, via the transaction processor, reverts back to his old billing cycle, while the newly created billing cycle carrying the $750 appliance store debit is rendered dormant. Of course, the additional purchases subsequent to the 01-18 $750 appliance store purchase can very well remain on the same billing cycle as the 01-18 appliance purchase, should such be desired.

When considering the creation of a new billing cycle, any parameter(s), which also comprise those that have been mentioned earlier with regard to transaction processor debiting, may be used as a trigger. For example, in addition to the earlier mentioned date parameter where the user can schedule the start of the newly created cycle to coincide with a given date, on a pre-dated or post-dated basis, another parameter could be consumption of an available balance, so when, say, at least $1000 of the original balance is consumed, a new billing cycle begins for subsequent purchases. Even more interestingly, a given trigger could be a transaction threshold amount, so the end user in the above example, instead of creating a new billing cycle "at-will" on 01-18, could just as easily set an amount threshold where transactions above $500 will trigger the start of a new billing cycle, where, per the above example, the 01-18 $ 750 appliance store purchase would automatically trigger a new billing cycle. Limits on the number of billing cycles that may be created are purely optional, in that theoretically an account issuer could possibly even allow an end user to create an unlimited number of billing cycles, either created "at-will", or triggered by any such parameter.

The following is a somewhat exaggerated and complex example of the capabilities of billing cycles triggered/created by an end user, using a range of parameters for triggering or creating new credit balance billing cycles. The end user starts off with a zero balance on an original credit balance. Upon consuming at least $2000 of the original billing cycle balance (debiting an available balance for at least $2000 using a consumption of an available balance parameter), he wants a new billing cycle to begin.

Should a single transaction (using a transaction threshold parameter) be greater than or equal to $3000, he wants yet another new billing cycle to begin, but only for the large single transaction. On the $15^{th}$ day of the month, he wants yet another new billing cycle to begin (using a date parameter for a pre-dated billing cycle scheduling, although he can have a post-dated billing cycle scheduling should he so choose as well).

| Date | Description | Transaction Amount | Debit to $1^{st}$ Billing Cycle | Debit to $2^{nd}$ Billing Cycle | Debit to $3^{rd}$ Billing Cycle | Debit to $4^{th}$ Billing Cycle | Debit to $5^{th}$ Billing Cycle |
|---|---|---|---|---|---|---|---|
| 01-02 | Airfare | 800.00 | 800.00 | — | — | — | — |
| 01-03 | Hotel | 800.00 | 800.00 | — | — | — | — |
| 01-04 | Shopping | 500.00 | 500.00 | — | — | — | — |
| | AT LEAST $2000 HAS BEEN CONSUMED ON THIS BILLING CYCLE - NEW BILLING CYCLE WILL BEGIN | | | | | | |
| 01-09 | Supermarket | 100.00 | — | 100.00 | — | — | — |
| 01-10 | Gasoline | 50.00 | — | 50.00 | — | — | — |
| 01-11 | Jewelry Store | 3,000.00 | — | — | 3,000.00 | — | — |
| 01-11 | NEW BILLING CYCLE FOR LARGE SINGLE TRANSACTION | | | | | | |
| 01-12 | Appliance Store | 750.00 | — | 750.00 | — | — | — |
| 01-15 | NEW USER SCHEDULED BILLING CYCLE BEGINS | | | | | | |
| 01-16 | Gasoline | 45.00 | — | — | — | 45.00 | — |
| 01-16 | Restaurant | 60.00 | — | — | — | 60.00 | — |
| 01-17 | Supermarket | 120.00 | — | — | — | 120.00 | — |
| 01-18 | Mechanic | 350.00 | — | — | — | 350.00 | — |
| 01-20 | Mechanic | 750.00 | — | — | — | 750.00 | — |
| 01-21 | Gasoline | 50.00 | — | — | — | 50.00 | — |
| 01-23 | Mechanic | 475.00 | — | — | — | 475.00 | — |
| 01-26 | Supermarket | 100.00 | — | — | — | 100.00 | — |
| 01-28 | Car Dealer | 45,000.00 | — | — | — | — | 45,000.00 |
| 01-28 | NEW BILLING CYCLE FOR LARGE SINGLE TRANSACTION | | | | | | |
| | TOTAL | 52,950.00 | 2,100.00 | 900.00 | 3,000.00 | 1,950.00 | 45,000.00 |

The first billing cycle begins (debiting the $1^{st}$ billing cycle), and continues until 01-04, when at least $2000 of the cycle's available credit balance is consumed, and is replaced by a new, second billing cycle ($2^{nd}$ billing cycle). The second billing cycle continues, but is temporary interrupted by a $3000 jewelry store purchase, where the $3000 purchase receives its own billing cycle (3$^{rd}$ billing cycle), triggered by a $3000.00 transaction threshold parameter pertaining to the amount of the purchase. Meanwhile, the 01-12 $750.00 Appliance Store purchase reverts back to the second billing cycle. On the 15$^{th}$ of the month, the end user has scheduled a new billing cycle to begin (4$^{th}$ billing cycle) and continue, whereas on 01-28, the $3,000.00 transaction threshold parameter triggers yet another a new billing cycle (5$^{th}$ billing cycle) for a rather sizable $45,000.00 purchase (being a new car), which was probably purchased to put an end to the recent mechanic bills, at least for the time being. Of course, in place of a transaction threshold parameter, when an end user realizes that a large purchase is going to occur, or has recently occurred, it is within the scope of the transaction processor to allow the end user to set up a separate billing cycle for a purchase, or a group of purchases, before or after the purchases are made via pre-dated or post-dated billing cycle scheduling parameters. In fact, setting up a separate billing cycle for a purchase or group of purchases doesn't merely need to pertain to large transactions, but to any transactions desired by the end user. In the above example, there are five billing cycles illustrated, most likely more than what is practical. Nonetheless, it is within the capability of the transaction processor for a given transaction or group of transactions to be readjusted amongst any one, or more than one, of the available credit balances comprising the five billing cycles. Furthermore, should the end user find any of the five billing cycles be less than suitable for readjustment purposes, there exists the capability for the user to create one or more additional billing cycles, either by using a triggering parameter such as date or amount, or simply creating an additional billing cycle "at-will" in real-time.

The following is where the end user in the above example decided to readjust everything from the first four available credit balances/billing cycle over to the fifth available credit balance/billing cycle.

end users willing to pay for them. Per the above example, the global account provider could provide everything the end user wants to do in this example, in exchange for being able to charge accrued interest and/or related fees that could be considerably advantageous to the global account provider.

Recombining Split Billing Cycles

An end user, after splitting billing cycles, could desire to recombine everything back into a single billing cycle. Such recombination may be realized in any myriad of ways. One way is for the end user to either turn off, or eliminate entirely, one or more billing cycles until there is at least one billing cycle remaining; or, turning off or eliminating all billing cycles entirely, until the end user chooses to continue an existing billing cycle, or even chooses to newly create a billing cycle, where the new billing cycle is created based on any trigger, such as a user selected date, or a purchase transaction. This is especially easy if the balances that are to be turned off or eliminated are zeroed out (either have been unused for whatever reason, or have been paid off). As an option, it is possible to have the transaction processor eliminate an added or created billing cycle/account balance once it is paid off. This is potentially useful in terms of the user created billing cycles, wherein once the user created billing cycle is paid off, it is eliminated, and purchase transactions debit the default billing cycle or cycles.

Available account balances that have debits on them (such as those with purchase amounts outstanding) but have different billing cycles, may be recombined, although chances favor that the account issuer could want the recombined single balance to have the nearest closing billing cycle, rather than having purchases made using the nearest closing billing cycle be transferred to a further closing billing cycle.

Other possible ways of recombining all or some of the at least two billing cycles back to an original, non-split, billing cycle comprise:

| Date | Description | Transaction Amount | Debit to 1$^{st}$ Billing Cycle | Debit to 2$^{nd}$ Billing Cycle | Debit to 3$^{rd}$ Billing Cycle | Debit to 4$^{th}$ Billing Cycle | Debit to 5$^{th}$ Billing Cycle |
|---|---|---|---|---|---|---|---|
| 01-02 | Airfare | 800.00 | (800.00) | — | — | — | 800.00 |
| 01-03 | Hotel | 800.00 | (800.00) | — | — | — | 800.00 |
| 01-04 | Shopping | 500.00 | (500.00) | — | — | — | 500.00 |
| 01-09 | Supermarket | 100.00 | — | (100.00) | — | — | 100.00 |
| 01-10 | Gasoline | 50.00 | — | (50.00) | — | — | 50.00 |
| 01-11 | Jewelry Store | 3,000.00 | — | — | (3,000.00) | — | 3,000.00 |
| 01-12 | Appliance Store | 750.00 | — | (750.00) | — | — | 750.00 |
| 01-16 | Gasoline | 45.00 | — | — | — | (45.00) | 45.00 |
| 01-16 | Restaurant | 60.00 | — | — | — | (60.00) | 60.00 |
| 01-17 | Supermarket | 120.00 | — | — | — | (120.00) | 120.00 |
| 01-18 | Mechanic | 350.00 | — | — | — | (350.00) | 350.00 |
| 01-20 | Mechanic | 750.00 | — | — | — | (750.00) | 750.00 |
| 01-21 | Gasoline | 50.00 | — | — | — | (50.00) | 50.00 |
| 01-23 | Mechanic | 475.00 | — | — | — | (475.00) | 475.00 |
| 01-26 | Supermarket | 100.00 | — | — | — | (100.00) | 100.00 |
| 01-28 | Car Dealer | 45,000.00 | — | — | — | — | 45,000.00 |

NEW BILLING CYCLE FOR LARGE SINGLE TRANSACTION
TOTAL OF $7,950.00 READJUSTED TO FIFTH AVAILABLE CREDIT BALANCE/BILLING CYCLE

| | TOTAL | 52,950.00 | (2,100.00) | (900.00) | (3,000.00) | (1,950.00) | 52.950.00 |
|---|---|---|---|---|---|---|---|

On 01-29, a total of $7,950.00 is readjusted to the fifth available credit balance, which as a result totals $52,950.00. At first glance, it seems that such a readjustment could take great advantage of the global account provider. Such could be true, to the point where the global account provider could choose to limit the considerable capabilities provided by the transaction processor to the end user. On the other hand, the global account provider could offer vast capabilities to those By a) using an instruction change to the transaction processor that reverses, or otherwise modifies, the original changes to the debiting parameter(s) of the original, non-split billing cycle; and, b) switching off at least one of the at least one additional billing cycle.

By a) switching off at least one of the at least two billing cycles; and, b) switching on the original, non-split, billing cycle.

Differing Point-of-Sale Identifiers Triggering Differing Transaction Processor Account-Debiting Instructions The transaction processor can enable a plurality of differing point-of-sale identifiers to trigger, or otherwise access, differing transaction parameter account-debiting instructions on a given global account. A simple example of this is where a point-of-sale identifier that is a first magnetic transaction card with a given account number at a point-of-sale triggers one set of account debiting instructions, such as where all transactions using the first magnetic transaction card debit an available cash balance, on a given global account; whereas a second magnetic card with a different account number triggers a different set of account debiting instructions, such as where all transactions using the second magnetic card debit an available credit balance. In this embodiment, the first card behaves as a cash debit card, while the second card behaves as a standard credit card. Myriad possibilities allow for a third, fourth, fifth, etc. magnetic transaction card, where each of the magnetic transaction cards comprise their own set of account debiting instructions that may be preset by the issuer, and/or be preset and/or be fully revisable by the end user, where the end user resets the account debiting parameters for any or all of the magnetic transaction cards.

Point-of-sale identifiers are unlimited with regard to potential embodiments. From a plurality of account numbers as accessed by multiple magnetic cards, to a point-of-sale prompt accessed by a singular card where the end user enters a selection comprising perhaps a menu choice or one of a plurality of PIN numbers, to biometrics, etc., any type of identifier source that allows for differentiation can be adapted and used. Using biometrics as an example, a fingerprint from an index finger can trigger one set of account debiting instructions, while a fingerprint from a thumb can trigger another set. Left eye, right eye, similar capabilities. Furthermore, point-of-sale identifiers for a given global account do not have to be like kind, so it is possible for an end user to have access to one set of transaction processor parameters using a magnetic card, and a different set of transaction processor parameters using a thumbprint. Furthermore, being that the transaction processor parameters can be continually selected or modified by the end user, it is possible for two or more non-like kind identifiers to trigger or access identical transaction processor parameters.

Any one or more of the plurality of differing point-of-sale identifiers may be turned on or off, either with a toggle, or by setting debiting parameters to "off", or "zero", where the "rescue" function may optionally be disengaged.

The following example illustrates a template of varied transaction processor settings for a plurality of magnetic cards, where, in this case, each of the plurality of magnetic cards comprises a different identifier, such as a different account number, and where each account number identifier corresponds to its own set of transaction processor settings for a given global account.

CARD 1—#0000-0000-1234-1234
   CARD ACCESS STATUS: ON
   100% (ALL) OF TRANSACTION AMOUNTS DEBIT AVAILABLE CASH BALANCE #1
   STATUS OF RESCUE FUNCTION FOR TRANSACTIONS IN CASE OF OVERDRAFT CONDITION: ON
CARD 2—#0000-0000-2345-2345
   CARD ACCESS STATUS: ON
   100% (ALL) OF TRANSACTION AMOUNTS DEBIT AVAILABLE CREDIT BALANCE #1
   STATUS OF RESCUE FUNCTION FOR TRANSACTIONS IN CASE OF OVERDRAFT CONDITION: ON
CARD 3—#0000-0000-3456-3456
   CARD ACCESS STATUS: ON
   100% (ALL) OF TRANSACTION AMOUNTS UP TO $20 DEBIT AVAILABLE CASH BALANCE #1
   TRANSACTION AMOUNTS BETWEEN $20 AND $50 DEBIT 50% (HALF) OF TRANSACTION AMOUNT FROM AVAILABLE CASH BALANCE #1, AND 50% (HALF) OF TRANSACTION AMOUNT FROM AVAILABLE CREDIT BALANCE #1
   100% (ALL) OF TRANSACTION AMOUNTS ABOVE $50 DEBIT AVAILABLE CREDIT BALANCE #1
   STATUS OF RESCUE FUNCTION FOR TRANSACTIONS IN CASE OF OVERDRAFT CONDITION: ON
CARD 4—#0000-0000-4567-4567
   CARD ACCESS STATUS: ON
   100% (ALL) OF TRANSACTION AMOUNTS DEBIT AVAILABLE CASH BALANCE #2
   MAXIMUM USE OF AVAILABLE BALANCE IN ONE CALENDAR MONTH BY THIS CARD—$200.00
   STATUS OF RESCUE FUNCTION FOR TRANSACTIONS IN CASE OF OVERDRAFT CONDITION: OFF

Per the above example, Card 1 accesses transaction processor parameters set to act like a standard debit card; Card 2 accesses transaction processor parameters set to act like a standard credit card; Card 3 accesses transaction processor parameters set for two thresholds employing both an available cash balance and an available credit balance; and, Card 4 accesses transaction processor parameters set to act like a limited use debit card. In the above, Card 4 illustrates an interesting adaptation. Say that a family has the above global account, and the parents have a son that is going off to college. The parents want the son to have spending power, but they also want to have controls, so for Card 4, the parents set the (earlier disclosed) maximum allowable available account balance usage parameter to allow only a maximum $200.00 consumption of available cash balance #2 to be used in one calendar month. This example could be easily modified to illustrate use of an available credit balance in place of the available cash balance. Nonetheless, the maximum allowable available account balance usage parameter ensures that the son does not use more of the $200 available cash balance #2, and the turning off on the "RESCUE" function ensures that once the $200 limit is reached, that no other available balance(s) can rescue whatever additional transactions the son may consider. Should the son be in a situation requiring an amount increase, and he successfully pleads his case, the parents can alter the maximum allowable available account balance usage parameter to allow an increase; or, the parents can even revise the debiting parameters of Card 4 to debit an available credit balance instead of cash balance #2. Should the son demonstrate particular irresponsibility, the parents can reduce the maximum allowable available account balance usage parameter to a lower amount, or cut off the son entirely by switching the toggle (in this case, the "Card Access Status" parameter of Card 4) to "OFF", which disables Card 4 and basically renders it useless.

Per the above, and in general, funding or replenishing any of a plurality of available cash balances may be done in myriad ways. For instance, should the parents wish to add money to available cash balance #2, the funds may be deposited directly into available cash balance #2, or transferred from at least one other available cash balance(s) comprising and/or not comprising the global account, either manually or automatically, using any criteria for deposit amount and/or balance level restoration. An example of balance level restoration is where, say, should an account balance fall to a predetermined amount, a set amount is added, or an amount is added that restores the balance level to a desired amount; whereas, another example is where, at the beginning or end of a period, or at any interim period point(s), a set amount is added, or an amount is added that restores the balance level to a desired amount. Additionally, cash balances may be replenished using readjustment mechanisms mentioned earlier, or by taking cash advances against any available credit balances, lines of credit, and the like.

The capability of turning/toggling on and off any of a plurality of differing point-of-sale identifiers tied to the global account provides a quick remedy for limiting global account access in the event that one or more said identifiers is lost or stolen. In the above embodiment using a plurality of magnetic cards where the identifier is an account number, upon realization that a card comprising the plurality has been lost or stolen, the end user can access the global account, and switch the lost or stolen card's access status to "OFF", which disables the card, but still enables the remaining cards comprising said plurality to be used for accessing the global account by the end user, while the end user waits for a replacement of said lost or stolen card. Such is useful for a traveler whose wallet containing one of his global account cards is stolen. The traveler can access a spare or backup card that he keeps in his money belt, and/or luggage, and disable the stolen card by switching the stolen card's card access status to "OFF", while enabling the spare card by switching spare card's card access status to "ON", and perhaps revising any account debiting parameters pertaining to the spare card if necessary or desired. This is superior to keeping an activated credit card for an entirely different account in luggage, being that luggage does get lost and, if found by unauthorized individuals, the activated card can readily be fraudulently used. This feature offers an advantage over conventional credit card and debit card embodiments, where when the end user reports a stolen card, the attached account/available account balance is basically unusable until replacement cards are expedited to and activated by the end user.

Simple Vs. Advanced, Complex, Compounded, or Multi-Conditional Debiting Parameters In understanding transaction processor functionality in relation to how available account balances are affected, examples of account balance debiting contained herein are based mainly using "IF/THEN" statements. Many presented examples are simple in nature, such as: "IF the transaction amount is equal to or less than $20, THEN debit the available cash balance; whereas, IF the transaction amount is greater than $20, THEN debit the available credit balance."

Using any terminology that is contrary to "Simple", such as "Advanced", "Complex", "Compounded", or "Multi-Conditional", it is within the range and scope of this disclosure that account balance debiting parameters can become quite involved.

Such an instance comprises where a simple "IF" condition results in a complex "THEN" result, such as: "IF the transaction amount is equal to or less than 10% of the available cash balance, THEN debit the first $50 of the transaction amount from the available cash balance, and debit any remainder of the transaction amount above $50 from the available credit balance; whereas, IF the transaction amount is greater than 10% of the available cash balance, THEN debit the first $25 of the transaction amount from the available cash balance, and debit any remainder of the transaction amount above $25 from the available credit balance."

Another instance comprises where a complex "IF" condition results in a simple "THEN" result, such as: "IF the transaction amount is less than or equal to $100, AND the transaction is less than or equal to 10% of the available cash balance, AND the available cash balance is greater than the average monthly cash balance, THEN debit the transaction amount from the available cash balance; whereas, IF the transaction amount is greater than $100, OR IF the transaction is greater than 10% of the available cash balance, OR IF the available cash balance is less than the average monthly cash balance, THEN debit the transaction amount from the available credit balance.

Yet another instance comprises where a complex "IF" condition results in a complex "THEN" result, such as: "IF the transaction amount is less than or equal to $500, AND the transaction is less than or equal to 25% of the available cash balance, AND the available cash balance is greater than 50% the average monthly "high water" mark cash balance, THEN debit the first $250 of the transaction amount from the available cash balance, and debit any remainder of the transaction amount from the available credit balance with the nearest closing billing cycle; whereas, IF the transaction amount is greater than $500, OR IF the transaction is greater than 10% of the available cash balance, OR IF the available cash balance is less than the average monthly cash balance, THEN debit the first $100 of the transaction amount from the available cash balance, and debit any remainder of the transaction amount from the available credit balance with the furthest closing billing cycle.

Complexities and capabilities within the scope of this disclosure regarding transaction processor debiting parameters are limited only by what the provider of the transaction processor is willing to offer end users. It is foreseeable, given the myriad possibilities and permutations, that a given provider can offer end users capabilities that differ considerably from other providers' offered capabilities.

Miscellaneous Advantages

The present invention presents advantages regarding privacy for the end user in varied point-of-sale environments. Being that, in most cases, the transaction processor provides for the debiting of varied available account balances as desired by the end user well away from an actual given point-of-sale, a merchant cannot reliably ascertain whether the transaction at hand is debiting one or more available cash balances, and/or one or more available credit balances. Just as importantly, if not more so, other individuals standing in line with an end user at a given point-of-sale cannot determine whether the end user is using one or more available cash balances, and/or one or more available credit balances, which not only offers an extra measure of security, but safety as well. Such is illustrated by a purchaser that uses a PIN number debit card (which debits an available cash balance) to make a large purchase, whereby the purchaser basically "broadcasts" to surrounding others the possible existence of a large cash balance that can be potentially exploited, whereas the privacy advantages of the present invention thwarts any certainty that an end user has transacted a large purchase using an available cash balance, being that any assumptions by others of the nature of the available account balance(s) used by the end user are purely speculative. Other advantages are related to consolidation of expenditure activity. With the present invention, the end user can observe and control multiple available account balances simultaneously. Furthermore, the consolidation of expenditure activity allows for a singular spending "rewards" program related to the available credit balance(s) and available cash balance(s), where reward points for all of the varied activity by the end user accumulate under one umbrella.

A powerful feature of the transaction processor is where a given transaction that is already posted may be switched from one already debited balance to another available balance. This feature can be accomplished manually by the end user, preset by the end-user or automatically use preset and/or adjustable, between cash or credit accounts, e.g., where a ratio and/or threshold amount is specified between one or more cash debit and credit accounts, or where cash debit card users can use one or more credit accounts as an effective overdraft protection.

The following example shows a list of posted transactions where 50% of the transaction amount debited an available cash balance, while the remaining 50% debited an available credit balance.

| Date  | Description    | Amount | Cash   | Credit |
|-------|----------------|--------|--------|--------|
| 01-02 | Restaurant     | 48.00  | 24.00  | 24.00  |
| 01-03 | Gasoline       | 21.00  | 10.50  | 10.50  |
| 01-05 | Shoe Store     | 36.00  | 18.00  | 18.00  |
| 01-06 | Supermarket    | 63.00  | 31.50  | 31.50  |
| 01-14 | Gasoline       | 15.00  | 7.50   | 7.50   |
| 01-18 | Appliance Store| 750.00 | 375.00 | 375.00 |

When viewing the postings on 01-26, the end user determines that he would like to have more available cash in his global account, and in making the determination feels that he would like to revise the 01-18 Appliance Store purchase so that the entire $750 debits the available credit balance, which will return the $375 cash that was previously debited from his available cash balance.

To perform this operation, the end user clicks on the 01-18 Appliance Store transaction, highlights by clicking on the $375 cash in the cash debit column, and enters zero. The transaction processor checks the available credit balance, sees that the available credit balance can adequately handle an additional $375 debit, and automatically readjusts the debit on the available credit balance to read $750. In essence, the end user can enter an amount greater than zero, which would still leave some residual amount debiting the available cash balance for the 01-18 transaction, and would readjust the debit to the available credit balance accordingly. While in most cases it is desirable for the transaction processor to make the amount readjustments automatically in response to a revision entered by the end user, there could be embodiments where more than one adjustment amount could be entered manually, with the transaction processor then verifying that the total correctly adds up and then checking the available account balance(s) to see if the account balance(s) have the resources to allow the change before the readjustment is permitted. While such embodiments comprising manual entries can be used for global accounts comprising only two available account balances, such manual entry capabilities are especially useful for embodiments comprising three or more available account balances, where a readjustment to one account balance by the end user requires a non-obvious offset using at least one of the two or more remaining accounts. For example, if an end user wishes to make a readjustment that frees up $100 in one available account balance, and has a choice of using two other available account balances to offset the $100 amount, how that $100 is taken from the two remaining account balances is non-obvious, and thus requires the end user to actually specify the desired amount change(s) to either or both of the two remaining available account balances. The example mentioned earlier in the paragraph is as follows:

| Date  | Description     | Amount | Cash | Credit |
|-------|-----------------|--------|------|--------|
| 01-18 | Appliance Store | 750.00 | -0-  | 750.00 |

The end result is where the end user now has an extra available $375 cash balance thanks to the transfer. It is very important to keep in mind that the $375 is not a cash advance; rather, it is merely a restoration of a prior cash balance. There are no real implications here with regard to back interest. Assuming a grace period is in place, there is a chance that the extra $375 debit to the available credit balance will be paid off before interest is assessed. In the event that the grace period does not apply, then the card issuer can charge interest on the extra $375 from the date that the available credit balance is debited by the extra $375. Whether or not a feature fee, a per-use fee, or a percentage of the readjustment amount is charged for this end user readjustment feature is basically up to the card issuer/account provider.

Keep in mind that while a singular transaction was highlighted and readjusted in the above example, it is possible to perform such a function on more than one transaction, either one at a time, or simultaneously. Also, an important aspect of this disclosure is where transactions that are readjusted from debiting, say, an available cash balance to an available credit balance, thus increasing the amount of the available cash balance, can theoretically be readjusted or switched back and forth (from available credit back to available cash and vice-versa, or switched back and forth between any of the available balances in global account embodiments comprising more than two available balances) any number of times without limit, using full and/or partial amounts. However, in practice, a global account provider could ultimately seek to place limits on its end users with regards to the number or nature of such readjustments or switches.

In illustrating a residual, or partial, amount transfer mentioned earlier, if the end user prefers to free up only an additional $200 of the consumed cash balance instead of the full $375 cash amount used for the 01-18 transaction, the end user may do so. As a result, referring to the prior example, the 01-18 $750 appliance store purchase debits the available cash balance for a revised amount of $175, thus freeing up $200 cash from the original $375 debit to the available cash balance, and the debit to the available credit balance is increased by the $200 amount, so now the readjustment debits the available credit balance for $575 instead of the original $375 amount. Furthermore, if an end user subsequently chooses to free up all or part of the remaining $175 debit to the available cash balance, it is certainly within the scope of this disclosure to permit such additional readjustment.

| Date  | Description     | Amount | Cash   | Credit |
|-------|-----------------|--------|--------|--------|
| 01-18 | Appliance Store | 750.00 | 175.00 | 575.00 |

What happens if the opposite were to occur, where the end user wants to free up more of the available credit balance? On 01-26, the end user clicks on the 01-18 Appliance Store transaction, highlights by clicking on the $375 credit debit column, and enters zero. The transaction processor checks the available cash balance, sees that the available cash balance can adequately handle an additional $375 debit, and automatically readjusts the debit on the available cash balance to read $750, while at the same time is crediting the available credit balance by $375.

| Date | Description | Amount | Cash | Credit |
|------|-------------|--------|------|--------|
| 01-18 | Appliance Store | 750.00 | 750.00 | -0- |

In this situation, there could be implications here with regards to back interest. If a grace period applies, then no back interest should be due; however, if a grace period does not apply, then there are 8 days of back interest that could still be due. Being that the transaction posted back on 01-18, and the change was made on 01-26, the customer could be charged 8 days interim interest on the $375 that was borrowed from the available credit balance and paid to the appliance store merchant. In such a case it could be anyone's guess on how a card issuer/account provider would view such a situation, especially if the card issuer/account provider is earning revenue all along on a long-standing and sizable available cash balance belonging to the customer that was the source of the $375 used to credit the customer's available credit balance.

It is also possible with the transaction processor to highlight a grouping of posted transactions, and reset any of the global parameters such as ratio, amount threshold, remainder threshold, etc., and have all the posted transactions readjust.

For instance, instead of the transactions debiting the available cash and available credit balances 50%-50%, as the example below, the end user can highlight, say, the last four transactions . . . .

| Date | Description | Amount | Cash | Credit |
|------|-------------|--------|------|--------|
| 01-02 | Restaurant | 48.00 | 24.00 | 24.00 |
| 01-03 | Gasoline | 21.00 | 10.50 | 10.50 |
| 01-05 | Shoe Store | 36.00 | 18.00 | 18.00 |
| 01-06 | Supermarket | 63.00 | 31.50 | 31.50 |
| 01-14 | Gasoline | 15.00 | 7.50 | 7.50 |
| 01-18 | Appliance Store | 750.00 | 375.00 | 375.00 |

Then reset the global parameters so the highlighted transactions are readjusted to where the 50%-50% ratio is replaced with, say, a remainder threshold where transaction amounts up to $20 debit the available cash balance, and remainder amounts above $20 debit the available credit balance. The resulting account debiting of the posted transactions, assuming adequate available account balances, are as follows:

| Date | Description | Amount | Cash | Credit |
|------|-------------|--------|------|--------|
| 01-05 | Shoe Store | 36.00 | 20.00 | 16.00 |
| 01-06 | Supermarket | 63.00 | 20.00 | 43.00 |
| 01-14 | Gasoline | 15.00 | 15.00 | -0- |
| 01-18 | Appliance Store | 750.00 | 20.00 | 730.00 |

The net change to the two account balances is where the available cash balance is credited $357, while the available credit balance is debited $357. As mentioned earlier, the credited cash is a restoration of what was in the available cash balance, which is good for the card issuer/account provider, being that the card issuer/account provider makes money on both the cash parked in the account, and on the increased credit usage. Resetting the parameters globally may comprise any of the parameters, such as ratio, amount threshold, remainder threshold, etc.

Furthermore, it is possible with the transaction processor to specify a readjustment using a specific amount, so specific transactions will automatically readjust according to, say, a desired dollar amount. An automatic readjustment may use any method in order to effect the readjustment such as FIFO (first in, first out), LIFO (last in, first out), lowest value transaction first, highest transaction value first, partial amounts of several transactions, etc. In the following example, an end user paid a total of $933.00 debiting only the available cash balance as follows:

| Date | Description | Amount | Cash | Credit |
|------|-------------|--------|------|--------|
| 01-02 | Restaurant | 48.00 | 48.00 | -0- |
| 01-03 | Gasoline | 21.00 | 21.00 | -0- |
| 01-05 | Shoe Store | 36.00 | 36.00 | -0- |
| 01-06 | Supermarket | 63.00 | 63.00 | -0- |
| 01-14 | Gasoline | 15.00 | 15.00 | -0- |
| 01-18 | Appliance Store | 750.00 | 750.00 | -0- |
| | TOTAL | 933.00 | 933.00 | -0- |

Subsequently, the end user lets the transaction processor know that the end user wants $300.00 of the $933.00 back in cash, where the readjustment debits the available credit balance and credits the available cash balance. In this instance, the end user really doesn't care which transactions are affected by the readjustment; rather, the end user is solely interested in the net effect of having an additional $300.00 credit the available cash balance. As mentioned above, the transaction processor may select which transactions are affected by any method. To illustrate the following example, FIFO (first in, first out) will be used, so of the six transactions listed below, all of the first five and part of the sixth transaction will be readjusted, where the total readjustments yield the $300 credit to the available cash balance, and a total debit amount of $300 to the available credit balance.

| Date | Description | Amount | Cash | Credit |
|------|-------------|--------|------|--------|
| 01-02 | Restaurant | 48.00 | -0- | 48.00 |
| 01-03 | Gasoline | 21.00 | -0- | 21.00 |
| 01-05 | Shoe Store | 36.00 | -0- | 36.00 |
| 01-06 | Supermarket | 63.00 | -0- | 63.00 |
| 01-14 | Gasoline | 15.00 | -0- | 15.00 |
| 01-18 | Appliance Store | 750.00 | 633.00 | 117.00 |
| | TOTAL | 933.00 | 633.00 | 300.00 |

In this next embodiment, it is possible to make a readjustment that is not transaction specific, that is, where one or more specific transactions are readjusted, but rather where the readjustment is amount specific. In the example below, the end user made a total of $933.00 of purchases using the available cash balance. Here, the account issuer can enable the end user to credit the end user's available cash balance (restoring cash to the available cash balance while debiting the available credit balance) without having to involve any specific transactions whatsoever. In this instance, the transaction processor sees that $933.00 of purchases were made by debiting the available cash balance, and so allows the end user to readjust up to $933.00, resulting in a credit to the available cash balance, and a debit to the available credit balance. The up to $933.00 debit to the available credit balance could simply be acknowledged as a lump-sum amount, and not as a listing of readjusted transactions, although the issuer can display the lump-sum amount eligible for readjustment (and/or the amount that has already been readjusted), as well as maintaining the option of listing the specific transactions that were affected by the readjustment.

| Date  | Description     | Amount | Cash   | Credit |
|-------|-----------------|--------|--------|--------|
| 01-02 | Restaurant      | 48.00  | 48.00  | -0-    |
| 01-03 | Gasoline        | 21.00  | 21.00  | -0-    |
| 01-05 | Shoe Store      | 36.00  | 36.00  | -0-    |
| 01-06 | Supermarket     | 63.00  | 63.00  | -0-    |
| 01-14 | Gasoline        | 15.00  | 15.00  | -0-    |
| 01-18 | Appliance Store | 750.00 | 750.00 | -0-    |
|       | TOTAL           | 933.00 | 933.00 | -0-    |

Per the above, should the end user choose to make an amount specific readjustment of $400.00 of the $933.00 cash balance purchases, where the readjustment credits the available cash balance and debits the available credit balance for the $400.00 amount, and the end user has a $533.00 remainder that can still be readjusted, text may be modified as follows:
"END USER HAS $533.00° F. CASH BALANCE PURCHASES THAT ARE AVAILABLE FOR READJUSTMENT ONTO THE AVAILABLE CREDIT BALANCE"
"END USER HAS A $400.00 MISCELLANEOUS DEBIT TO THE AVAILABLE CREDIT BALANCE AS A RESULT OF READJUSTMENT"

It is especially important to be reminded that the readjustment that enables the end user to basically pull cash out of the end user's transaction activity is not the same as a "cash advance" against an available credit balance, because the cash that the end user pulls out is cash that originally belonged to the end user anyway. In the same way that an end user may theoretically make any number of transaction specific readjustments without limit (as mentioned earlier), the end user may make any number of amount specific readjustments back and forth between any of the available balances comprising the at least two available balances of the global account. It is conceivable that an end user could wish to actually withdraw more cash than the amount available via a readjustment. Pertaining to the above example, if an end user wished to have a cash withdrawal totaling $1000.00, and wished to readjust the entire $933.00 transaction activity to free up the cash that the end user used for the prior purchases, then the $1000.00 cash withdrawal could be realized by readjusting the $933.00 purchases, and then taking out the additional $67.00 in the form of a "cash advance" against the available credit balance. The desired cash withdrawal would still show a total debiting of the available credit balance(s) for $1000.00; however, only $67.00 of the $1,000.00 debit against the available credit balance(s) would be due to an actual "cash advance". As mentioned earlier, the transaction processor functions with any type of security/verification and/or system routing, such as PIN-based Automated Clearing House (ACH) environments or electronic funds transfer (EFT), wireless, internet, radio, telephonic, radio/contactless. In embodiments using ACH access, transaction specific readjustments, and/or an amount specific readjustments can comprise where said readjustments include crediting an available cash balance by debiting a line of credit, or debiting an available credit balance, where the issuer considers the readjustment that pulls cash out as a debit to the line of credit, or as a "cash advance" against the available credit balance, and charge the customer interest relating to the line of credit, or additional "cash advance" fees and higher interest rates relating to debiting the available credit balance. Note that it is possible for an account provider to allow use of the available credit balance in such embodiments in exchange for more traditional credit balance use terms (sans additional "cash advance" fees and higher interest rates), for whatever reason(s) or considerations.

Whether by using a transaction specific readjustment, and/or an amount specific readjustment, the ability to reclaim cash from purchase transactions already made (where the purchase transactions originally debited an available cash balance, and are readjusted to debit an available credit balance, thereby crediting or restoring funds back to an available cash balance) offers an unexpected result and potentially very lucrative benefit for issuers of the global account by greatly increasing the risk of default for the entire global account by the end user, which in turn enables the issuer to justify and charge higher fees, especially in relation to those fees earned that are associated with purchase transactions, such as interchange fees. Financial card account issuers charge relatively higher fees for transactions performed with their credit cards (which debit an available credit balance) than for transactions performed with their debit cards (which debit an available cash balance). This is due to the fact that credit card accounts carry the risk of the end user defaulting on payment to the card issuer for charges made by the end user. An example is where an end user charges $10,000 on his credit card account, and then skips town without paying any of the principal or interest due on the account, thereby leaving the card issuer "holding the bag". A typical debit card does not carry this risk due to the fact that the end user uses his own cash instead of an available credit balance, so the risks that debit card issuers tend to have is in having to make restitution to an end user that was the victim of debit card fraud or theft, which tends to be a much smaller risk in dollar terms (and thus carries a smaller risk premium) than credit card account default risk. Thanks to this readjustment concept of the present disclosure, an end user of a global account can make purchase transactions using $10,000 of an available cash balance in the global account, which is the end user's own money (and which, in a typical debit card account, carries no default risk to the card issuer); then, the end user can readjust the $10,000 in purchase transactions so the transactions debit an available credit balance in the global account for the $10,000 amount, resulting where the available cash balance that was originally used for the purchases is (re)credited for the $10,000 amount; then, the end user can withdraw the (re)credited $10,000 amount from the global account, and then default on the $10,000 debit to the available credit balance, where the debit to the available credit balance was created by the readjustment. It is in this way that an end user that uses only his own available cash balance for a given purchase transaction can still present a default risk for the entire transaction amount to the provider of the global account. While the potential for higher fee revenue affects the merchants in a negative way, there are also unexpected results that benefit merchants as well. First, if an end user has a tendency to favor available cash balances for purchases, the end user is likely to be less watchful of cash balance levels, and is therefore likely to spend more with a given merchant, if the end user has a readjustment mechanism or "safety valve" readily in place that enables transactions to be readjusted from an available cash balance to an available credit balance, being that the readjustment mechanism provides a remedy to potential available cash balance shortfalls. Second, an end user that has a tendency to favor available cash balances for purchases, but has an unexpected cash balance shortfall, now has the option of using the readjustment mechanism, rather than returning the purchased item to the merchant, resulting in fewer returned items for the merchant, and less running around for the end user.

As mentioned earlier, it is possible for at least one of the available account balances comprising the global account to have its own account number that enables access via credit card, debit card, ATM card, draft, etc. that is distinct from the account numbers used to access the global account. Regardless of how the varied accounts are accessed, transaction specific readjustments and/or amount specific readjustments may be performed among the varied available account balances.

Furthermore, and very importantly, the ability to perform transaction specific readjustments, and/or an amount specific readjustments in order to reclaim cash from purchase transactions already made, with or without the capability to make any number of readjustments back and forth between any of the available balances, is disclosed as being highly and especially advantageous as an additional enhancement to old and well known embodiments of accounts that use a singular available balance, such as debit card accounts, ATM card accounts, checking accounts, and the like that comprise a singular available cash balance; and, credit card accounts, lines of credit, and the like that comprise a singular available credit balance.

As discussed earlier, if the user has made a number of purchases debiting the available cash balance, and does not have enough cash balance on hand to cover a demand draft (personal check that debits the cash balance), or an ATM cash withdrawal for that matter, an available credit balance that is a part of the global account can issue a cash advance to cover the cash balance deficit (using "Rescue or Reject" or "Best Fit" criteria to access an available credit balance obtain a cash advance for cash withdrawals). Such cash advances carry fees that end users may not like, so a cash overdraft due to a personal check, a desired ATM withdrawal, and the like can be remedied using the transaction specific readjustment or amount specific readjustment mechanisms described above. Here, an appropriate setting on the transaction processor can detect an overdraft condition, and perform either a transaction specific readjustment or amount specific readjustment that converts debits to the cash balance into debits to the credit balance, thus producing cash in the amount necessary to cover the overdraft. While it is possible for a readjustment that addresses an overdraft condition to comprise a manual entry by the end user, a preferred embodiment is where the transaction processor, upon detection of the overdraft condition, performs the readjustment automatically.

Finally, a question here is whether the end user can make these readjustments after the billing cycle closes. It is certainly possible for the transaction processor to enable posted transactions to remain accessible for readjustment after the billing cycle closes, but it is not without difficulties. One consideration includes system capabilities. Another consideration involves where end users that carry a large credit balance due can become especially confused by the shear number of past transactions presented, which could tax customer services resources considerably. While there is certain value to being able to make readjustments to transactions up to the close of the billing cycle, the value of offering such accommodations after the close of the billing cycle certainly diminish, while the difficulties in offering such post-billing cycle readjustments certainly increase. Nonetheless, it is disclosed that an end user can make post-billing cycle readjustments, should the offering card entity/account provider choose to allow it.

Should a purchase return to a merchant be necessary, the transaction processor is able to record transactions by retaining merchant information combined with the amount of a given transaction, further combined with a record of how the accounts were debited at the time of the transaction, so an incoming credit for a return hits the varied account balances the same way the original transaction debited the balances. For example, if a credit is sent from merchant X for $21.50, the transaction processor scans the file for a record of the transaction totaling $21.50 from merchant X. Upon locating a match for the merchant and the amount, the credit is portioned among the account balances either 1) the same way it was originally debited from the account balances, or 2) if the posted transaction was readjusted by the end user, by using the readjusted parameters. Whichever method is used may either be selectable by the end user, or may be predetermined by the card issuer/account provider.

If all transactions for a given merchant are debited using the same account balance debiting parameters, with none of the parameters being changed, and none of the posted transactions being readjusted, then there is no problem determining the parameters to use for crediting the refund from the merchant. If there is more than one transaction from the same merchant for the same amount, and the parameters were changed, or the transactions were readjusted, then the determination on which transaction the refund is crediting can be made on a first in, first out (FIFO) or last in, first out (LIFO) basis. Again, the method used may be selectable by the end user, or predetermined by the card issuer/account provider. Date is not a reliable matching parameter, because, depending on the capabilities of the various merchant systems used, returning credits may or may not include the date of the original transaction. Certainly, date matching will help such matters immeasurably once it becomes universal. The situation for determining parameters to use for crediting a return become even more complicated on partial returns. If there is only one transaction for a given merchant, it may be assumed somewhat safely that even though the amount of the partial return credit does not match the original transaction amount, the partial return credit does indeed pertain to the singular transaction. Another way of determining the transaction a partial return pertains to, and thus which parameters will be used for crediting, is by having the transaction processor look at the amount. If there are three transactions with a given merchant, and the partial return credit is greater than two of the transactions, but less than the third, then it may be assumed that the partial return pertains to that third transaction. If the partial return appears that it could belong to more than one transaction, then a determination can be made using either a FIFO or LIFO basis as to which crediting parameters are to be used.

It is reasonable for returns to be processed using the same parameters that were used to perform the original transaction, especially since other methods could create opportunities for abuse. For example, if an end user were allowed to specify that all returns are to credit the available cash balance, there would be little preventing the end user from charging large amounts using the available credit balance, returning those items, having the returned funds credit his available cash balance, withdrawing cash from the available cash balance, and basically using his credit balance for a fee free cash advance. In such a situation, chances are good that the interest rate on the consumed credit balance is less than the interest rate on a cash advance, so the issuer would lose not once (on the cash advance fee) but twice (on the cash advance fee, and the lower interest rate charged on the consumed credit balance).

Controlling all of this capability is the interface. In most cases, it is desirable for the actual end user to be able to use the interface directly; however, it is possible for an embodiment to comprise where the end user uses the interface indirectly, such as where the end user calls up a customer service representative, and the customer service representative, acting as an intermediary, makes the actual changes to the global account or transaction processor using an interface on behalf of the end user.

Whatever the situation, the interface may comprise the usage of any communicative system component, format or technology, from any location. For example, the end user can access the interface via the Internet, by calling a customer service representative, by using use a menu driven phone system where the changing of parameters such as account debiting parameters is enabled by punching numbers on a phone (a tele-account system), via an intranet at the branch of the card-issuing bank, by fax, mail, etc.

It is foreseeable that such changes could be performed at a point-of-sale terminal; however, such an embodiment requires special equipment and programming, and could be difficult due to the expense and the level of cooperation needed to become widespread. Besides, having an end user toil with parameters at a point-of-sale terminal goes against the spirit of the present invention, which is basically to swipe and go, where having the transaction processor automatically perform specialized functions eliminates having to go through various rituals at a point-of-sale terminal An end user that wishes to make changes to the transaction processor regarding the debiting of the at least two available account balances and other parameters in a purchase environment can simply use a cell phone to either call up a customer service representative or access a tele-account system, or use a handheld personal assistant that enables wireless Internet access, and make the desired changes to the transaction processor in real-time before his purchases are tallied. Such capability saves time at the actual point-of-sale, is less taxing on the cashier, and is much more considerate of the other customers standing in line. The fact that the facilitating of capabilities with regard to account debiting and other parameters requires absolutely no special point-of-sale manipulations or equipment is viewed as advantageous.

As mentioned earlier, the second embodiment of the transaction processor comprises the use of a smart data card embodiment. Smart data card embodiments used in point-of-sale environments require special point-of-sale equipment to take full advantage of the varied capabilities. For this application, the type of smart data card needed is a microprocessor card, which contains a microprocessor semiconductor chip. The smart data card links together and controls at least two available account balances, and enables a given transaction to be debited from the at least two available account balances from a point-of-sale terminal according to parameters discussed in the global account embodiment, such as at least one ratio, at least one amount threshold, at least one remainder threshold, and where parameters in the smart data card enable at least one given available account balance to be disengaged, minimum available balance parameters to be set, and maximum allowable transaction amounts to be set.

The smart data card embodiment of the transaction processor can be used with any combination of accounts, regardless of whether they are in-house or out-of-house to the entity that issues the smart data card. In fact, it is entirely possible for the provider of the smart data card to be a third-party entity that is in no way responsible for any of the available account balances accessible via the smart data card. In such an embodiment, the smart data card is programmed to access the available account balances using the various account numbers of the available account balances. For example, the microprocessor on the smart data card can be programmed to analyze an incoming transaction amount at a point of sale, and using a 50%-50% ratio debit the available cash account balance or cash sub-account balance at institution #1 for half of the transaction amount while debiting an available credit balance at institution #2 for the remaining half of the transaction. Using a threshold example, the microprocessor on the smart data card can be programmed to automatically debit an available cash balance at institution #1 for transactions up to $50, and to debit an available credit balance at institution #2 for transactions above $50.

Also, the microprocessor on the smart data card can be programmed to debit available account balances according to Best Fit or Rescue or Reject criteria discussed earlier.

As is known in the art, a smart data card may be programmed, and parameters can be selected and/or modified using a smart data card interface. The smart data card interface may be part of, at the site of, or away from the site of the actual point-of-sale terminal.

In the typical PIN based debit card embodiment, when a transaction is performed, the money leaves the purchaser's cash account in real time, and goes to pay the merchant. Should a purchaser need money for an emergency, or to avoid a potential overdraft situation regarding a check drawn on the cash account, the only way that the money spent during the transaction can be retrieved and used for the emergency or overdraft is if the purchased transaction item is returned to the merchant, which is difficult in many situations, and impossible (or really gross) in others (such as if the item purchased was a meal in a restaurant).

As presented above, the end user accesses his account, and clicks on the selected transaction in order to, say, convert a debit from an available cash balance to a debit from an available credit balance, resulting where cash is placed back into the cash balance, and the purchase transaction that started all of this is debited from the available credit balance.

In another embodiment, certain conditions can trigger such a conversion automatically, and not just where the end user clicks on the transaction. One of goals with this disclosure is to offer a superior alternative to the popular PIN based debit cards.

In the crebit version of a debit card, an end user may have the transaction processor set so all transactions debit only an available cash balance, with there nonetheless being an available credit balance as part of the global account. Devout debit users normally would try to avoid using the available credit balance; nonetheless, the credit balance acts as a useful emergency backup. In this situation, the following can happen:

At any time during a billing cycle (credit balances have a billing cycle, whereas cash balances have more of an activity cycle that statements are based on), if the user has made a number of purchases debiting the available cash balance, and does not have enough cash balance on hand to cover an ATM cash withdrawal, or a demand draft (personal check that debits the cash balance), the credit balance can issue a cash advance to cover it as presented above (using the available credit balance to Rescue or Reject as a cash advance for cash withdrawals). Anyway, cash advances carry fees that end users may not like, so to attract end users, such a cash overdraft due to an ATM withdrawal or personal check can be prevented by looking at recent crebit purchase transactions using the available cash balance, and automatically converting debits to the cash balance into debits to the credit balance, thus producing cash in the necessary amount in order to cover the amount of the overdraft. As to which transactions comprising debits to the available cash balance are converted into debits to the available credit balance to regenerate cash, such may be determined using any desired method, such as LIFO (last in-first out), FIFO (first in-first out), etc.

Such capabilities may happen at any time before or after the close of the available credit balance billing cycle, with before the close of the billing cycle being less complicated to implement (mentioned in parent applications).

Such capability is very useful in addition to the procedures presented above, where all purchase transactions debit one available balance exclusively (generally the available credit balance), where debit card transactions have the available cash balance credit the available credit balance at any time prior to the close of the credit balance's billing cycle.

By enabling transactions that debit the available cash balance to convert, especially to convert automatically, to the available credit balance, thus regenerating cash for withdrawal/overdraft protection purposes, the risk of default by the end user using cash balances is increased to the level of a credit card transaction. This is extremely desirable in that issuers can justify charging higher interchange rates on merchants than they could with signature debit card transactions.

While the transaction processor is envisioned to provided the end user great flexibility with regard to how a given transaction is debited from different available account balances, the it is possible that the entity that offers and administers the disclosed financial card account, or that offers the smart data card embodiment described herein, could elect to give an end user numerous options and choices, or could choose to pare down the capabilities available to the end user considerably. Also, the entity could choose to have certain parameters pre-established, where such parameters either possess or lack the capability to be changed or otherwise modified by the end user. As a result, embodiments and features of this invention can vary a great deal in the real world, depending on which capabilities a given offering entity chooses to provide and/or allow.

Prior examples included where a transaction amount debited one or more available cash balances and/or one or more available credit balances depending on parameters per the transaction processor. Another means is where all transaction amounts debit an initial singular available account balance, where, depending on parameters per the transaction processor, either 1) a given transaction amount remains wholly as a debit to the initial singular available balance, 2) a given transaction amount remains as a partial debit to the initial singular available balance, whereby the balance of the partial debit is automatically moved from the initial singular available balance to at least one different available balance; or, 3) a given transaction amount, in its entirety, is automatically moved from the initial singular available balance to at least one different available balance.

While an initial purchase transaction debits an initial singular available balance, automatically moving, or transferring, a transaction amount from the initial singular available balance to at least one different available balance may be visualized as where the debit to the initial singular available balance is credited, and the at least one different available balance is debited, for the transaction amount that is being moved. Timeframe is another aspect that needs to be considered with regard to the automated movement, or transfer, of the transaction amount from the initial singular available balance to the at least one different available balance. While one may assume that, per the transaction processor making the transfer, that the desired transfer itself occurs immediately upon or after the debit to the initial singular available balance occurs, such may or may not necessarily be the case. The entity that offers the global account/transaction processor to the end user may choose any timeframe for when such transfers occur, such as immediately upon or after the debit to the initial singular available balance occurs; or, two minutes, two hours, two days, etc., after the debit to the initial singular available balance occurs. While such a cornerstone decision regarding timeframe is most likely best left to the entity that offers the global account/transaction processor to the end user, it is not impossible for the end user to have some, or much, say with regard to such timeframe parameters.

In the following example, all transactions debit an initial singular available credit balance. However, in this case, the transaction processor has a threshold parameter where the end user wants all transaction amounts up to $25 to debit his available cash balance, and all transaction amounts above $25 to debit the available credit balance. Therefore, while all amounts initially debit the available credit balance, for transaction amounts up to $25, the amount, within any specified timeframe, will be debited from the available cash balance, and credited to the available credit balance, resulting in a zero net balance to the initial credit balance for those transaction amounts of $25 and below. Due to concepts discussed earlier, such as Rescue and Reject and Best Fit, should there not be an adequate available cash balance to enable the transfer from the initial singular available credit balance debit to a debit to the available cash balance for those transaction amounts of $25 and below, the capability exists for those transaction amounts to remain as a debit to the initial singular available credit balance.

| Date | Description | Transaction Amount | Initial Credit Bal Debit | Amt Debited From Cash Bal | Net Effect Initial Credit |
|---|---|---|---|---|---|
| 01-02 | Restaurant | 48.00 | 48.00 | -0- | 48.00 |
| 01-03 | Gasoline | 21.00 | 21.00 | 21.00 | -0- |
| 01-05 | Shoe Store | 36.00 | 36.00 | -0- | 36.00 |
| 01-06 | Supermarket | 63.00 | 63.00 | -0- | 63.00 |
| 01-14 | Gasoline | 15.00 | 15.00 | 15.00 | -0- |
| 01-18 | Appliance Store | 750.00 | 750.00 | -0- | 750.00 |
| 01-24 | Gasoline | 18.00 | 18.00 | 18.00 | -0- |
| 01-30 | Restaurant | 33.00 | 33.00 | -0- | 33.00 |
| | TOTAL | 984.00 | 984.00 | 54.00 | 930.00 |

What is interesting is that by setting the transaction processor so that all transaction amounts which debit the initial singular available credit balance are automatically zeroed out (within any specified timeframe) by an available cash balance, the global account behaves similarly to a standard debit card account, but with the irony of employing an available credit balance.

In the example that follows, again, all transactions debit an initial singular available credit balance. However, in this case, the transaction processor has a threshold parameter where the end user desires that amounts up to and including the first $20 of all transaction amounts will debit his available cash balance, and that all remainder amounts above $20 will debit the available credit balance. Therefore, while all amounts initially debit the available credit balance, amounts up to and including the first $20 of each transaction, within any specified timeframe, will be debited from the available cash balance, and credited to the available credit balance, resulting in a zero net balance to the initial credit balance for those transaction amounts of $25 and below.

| Date | Description | Transaction Amount | Initial Credit Bal Debit | Amt Debited From Cash Bal | Net Effect Initial Credit |
|---|---|---|---|---|---|
| 01-02 | Restaurant | 48.00 | 48.00 | 20.00 | 28.00 |
| 01-03 | Gasoline | 21.00 | 21.00 | 20.00 | 1.00 |
| 01-05 | Shoe Store | 36.00 | 36.00 | 20.00 | 16.00 |
| 01-06 | Supermarket | 63.00 | 63.00 | 20.00 | 43.00 |
| 01-14 | Gasoline | 15.00 | 15.00 | 15.00 | -0- |
| 01-18 | Appliance Store | 750.00 | 750.00 | 20.00 | 730.00 |
| 01-24 | Gasoline | 18.00 | 18.00 | 18.00 | -0- |
| 01-30 | Restaurant | 33.00 | 33.00 | 20.00 | 13.00 |
| | TOTAL | 984.00 | 984.00 | 153.00 | 831.00 |

While it is perceived as preferable that having an initial singular available balance from which all transactions are debited be a credit balance as opposed to a cash balance, it is possible to have the initial singular available balance be a cash balance. In the following example, all transactions are debited from an initial singular available cash balance. In this case, the end user wants all transaction amounts above $50 to debit the available credit balance and credit the available cash balance, while transactions up to and including $50 remain as a debit to the available cash balance.

| Date | Description | Transaction Amount | Initial Cash Bal Debit | Amt Debited From Credit Bal | Net Effect Initial Cash |
|---|---|---|---|---|---|
| 01-02 | Restaurant | 48.00 | 48.00 | -0- | 48.00 |
| 01-03 | Gasoline | 21.00 | 21.00 | -0- | 21.00 |
| 01-05 | Shoe Store | 36.00 | 36.00 | -0- | 36.00 |
| 01-06 | Supermarket | 63.00 | 63.00 | 63.00 | -0- |
| 01-14 | Gasoline | 15.00 | 15.00 | -0- | 15.00 |
| 01-18 | Appliance Store | 750.00 | 750.00 | 750.00 | -0- |
| 01-24 | Gasoline | 18.00 | 18.00 | -0- | 18.00 |
| 01-30 | Restaurant | 33.00 | 33.00 | -0- | 33.00 |
| | TOTAL | 984.00 | 984.00 | 813.00 | 171.00 |

A subtle variation is where all transactions debit an initial singular available balance (whether credit or cash balance), but then a given transaction amount, in its entirety, is automatically transfer or moved from the initial singular available balance to at least one different available balance, where the net effect on the initial credit balance always zeroes out. As discussed earlier, in the case where the initial singular available balance is a credit balance, the given transaction amounts that the transaction processor assigns to debit the available cash balance(s) are used in order to credit (and zero out) the initial credit balance. The variation is illustrated with an example comprising at least one additional or sub available credit account balance. In this example, transaction amounts up to and including $25 have the available cash balance crediting the debit to the initial singular available credit balance that was created by the transaction, which results in a debit to the available cash balance; whereas transaction amounts above $25 have the sub available credit balance crediting the debit to the initial singular available credit balance created by the transaction, which results in a debit to the sub available credit balance. This gives rise to where one available credit balance (the initial singular available credit balance) is zeroed out (credited) by debiting a different available credit balance (the sub available credit account balance). As mentioned before, any desired timeframe for this transfer, or zeroing out is possible. It is this debit to the sub available credit account balance that the end user ultimately pays.

| Date | Description | Trans Amount | Ini Credit Bal Debit | Amt Debited Frm Cash Bal | Sub Credit Bal debit | Net Effect Ini Credit |
|---|---|---|---|---|---|---|
| 01-02 | Restaurant | 48.00 | 48.00 | -0- | 48.00 | -0- |
| 01-03 | Gasoline | 21.00 | 21.00 | 21.00 | -0- | -0- |
| 01-05 | Shoe Store | 36.00 | 36.00 | -0- | 36.00 | -0- |
| 01-06 | Supermarket | 63.00 | 63.00 | -0- | 63.00 | -0- |
| 01-14 | Gasoline | 15.00 | 15.00 | 15.00 | -0- | -0- |
| 01-18 | Appliance Store | 750.00 | 750.00 | -0- | 750.00 | -0- |
| 01-24 | Gasoline | 18.00 | 18.00 | 18.00 | -0- | -0- |
| 01-30 | Restaurant | 33.00 | 33.00 | -0- | 33.00 | -0- |
| | TOTAL | 984.00 | 984.00 | 54.00 | 930.00 | -0- |

The following example illustrates a more complex embodiment where a transaction amount, instead of debiting an initial singular available balance whereby a given transaction amount may or may not be transferred to at least one different available balance, debits instead an initial plurality of available balances, whereby any or all of the initial plurality of available balances may or may not be transferred to at least one different available balance. Here, transaction amounts above $25 debit the initial credit balance, while transaction amounts up to and including $25 debit the initial cash balance. Within any specified timeframe, the net effect on the initial credit and initial cash balances is where they are zeroed out by their respective sub credit and sub cash accounts. There can be any reason for desiring such levels of complexity. Being that available balances comprising the global account, whether available cash balances or available credit balances, may comprise any combination of in-house or out-of-house accounts, one possible reason for having relatively complex embodiments could be where the initial credit and cash balances are in-house balances, whereas one or more of the sub balances are out-of-house balances.

| Date | Description | Trans Amount | Ini Credit Bal Debit | Ini Cash Bal Debit | Sub Credit Bal Debit | Sub Cash Bal Debit | Net Effect Ini Accts |
|---|---|---|---|---|---|---|---|
| 01-02 | Restaurant | 48.00 | 48.00 | -0- | 48.00 | -0- | -0- |
| 01-03 | Gasoline | 21.00 | -0- | 21.00 | -0- | 21.00 | -0- |
| 01-05 | Shoe Store | 36.00 | 36.00 | -0- | 36.00 | -0- | -0- |
| 01-06 | Supermkt | 63.00 | 63.00 | -0- | 63.00 | -0- | -0- |
| 01-14 | Gasoline | 15.00 | -0- | 15.00 | -0- | 15.00 | -0- |
| 01-18 | Applnce Str | 750.00 | 750.00 | -0- | 750.00 | -0- | -0- |
| 01-24 | Gasoline | 18.00 | -0- | 18.00 | -0- | 18.00 | -0- |
| 01-30 | Restaurant | 33.00 | 33.00 | -0- | 33.00 | -0- | -0- |
|  | TOTAL | 984.00 | 930.00 | 54.00 | 930.00 | 54.00 | -0- |

Transaction Split Debiting or Transfer Debiting of Cash or Credit Accounts from at Least One First Cash or Credit Account to at Least One Second Cash or Credit Account Another type of method, system or apparatus of the present invention is where all transaction amounts debit an initial or first at least one available cash or credit account, and then such transaction amount debit is transferred in part or in total to at least one second cash or debit account, wherein (depending on parameters per the transaction processor set by the account holder or the end user), at least one of the following occurs:

a total transaction amount is split between (a) a first partial debit of the total transaction amount of a first available cash or credit balance in the at least one first account, and (b) a second partial debit of the total transaction amount of at least one second available cash or credit balance from at least one second account; and/or, a total transaction amount automatically is transferred in total from (a) a first debit of the total transaction amount of a first cash or credit balance in the at least one first account, to (b) a second debit of the total transaction amount of at least one second cash or credit balance from at least one second account.

While the at least one transaction debits a first available cash or credit balance in a first account, then moving, or transferring, a part or the total of the transaction amount from the first account to a debit of a second account.

The following is an overview of the various non-limiting debit card embodiments of the present invention:
  Standard Debit Card, where transactions are automatically and individually paid in-turn, with additional readjustment capability to create credit-default risk;
  Faux Debit Card, where transactions are automatically and individually paid in-turn, and where the embodiment comprises no inherent credit-default risk;
  Faux Debit Card, where transactions are automatically and individually paid in-turn, and where the embodiments comprise capabilities to create credit-default risk;
  Faux Debit Card, where plural transactions are automatically paid together at a given time interval, and where the embodiments comprise no inherent credit-default risk;
  Faux Debit Card, where plural transactions are automatically paid together at a given time interval, and where the embodiments comprise capabilities to create credit-default risk.
  Hybrid Faux Debit Card, where transactions are automatically and individually paid in-turn, are then automatically and individually readjusted (unpaid) in-turn, whereby the plural transactions are automatically paid together at a given time interval, and where the embodiments comprise no inherent credit-default risk; and,
  Hybrid Faux Debit Card, where transactions are automatically and individually paid in-turn, are then automatically and individually readjusted (unpaid) in-turn, whereby the plural transactions are automatically paid together at a given time interval, and where the embodiments comprise capabilities to create credit-default risk.

In one non limiting example, the debit of the total transaction amount from a first account as a credit account is transferred to a second account as a cash account, whereby the credit activity of the credit account is maintained to improve the account holder's credit rating, which is further enhanced by making sure that the credit account balance or credit sub-account balance is paid off within the current credit account period to that no additional interest is incurred.

In crebit credit balance-based embodiments, there are basically two distinct types of credit transactions:
  Credit transactions that are carried forward and will be manually paid later by the end user; and,
  Credit transactions that are automatically paid, or will be automatically paid.

With regard to bookkeeping, or organizing the automatically-paid and manually-paid credit transaction items, possibilities comprise the following:
  Manually-paid and automatically-paid items both remain together on the initial single credit balance;
  Manually-paid and automatically-paid items are moved from the initial single credit balance to at least one additional credit balance, but remain together;
  Manually-paid items remain on the initial single credit balance and automatically-paid items are moved off of the initial single credit balance to at least one additional credit balance, or vice-versa;
  Manually-paid and automatically-paid items are both moved from the initial single credit balance to separate credit balances, where a separate credit balance comprises at least one credit balance;
  Manually-paid and automatically-paid items are each moved to their own initial single credit balance after using payment parameters to determine manually-paid vs. automatically-paid items.

Furthermore, a given, single automatically-paid item may comprise one, or more than one, payment source, where the possibilities comprise the following:
  Where one or more than one credit transaction being automatically paid using one payment source stays on an initial single credit balance;
  Where one or more than one credit transaction being automatically paid using one payment source moves from an initial single credit balance to at least one other credit balance;
  Where one or more than one credit transaction being automatically paid using more than one payment source stays on an initial single credit balance, whereby the payment sources are in series with each other acting in an overdraft capacity, and/or are parallel with each other, whereby more than one source is being used simultaneously to automatically pay a transaction;
  Where one or more than one credit transaction being automatically paid using more than one payment source moves from an initial single credit balance to at least one other credit balance, whereby the payment sources are in series with each other acting in an overdraft capacity, and/or are parallel with each other, whereby more than one source is being used simultaneously to automatically pay a transaction.

While a given crebit embodiment may comprise a singular debit card/faux debit card embodiment, it is possible for a given crebit embodiment to comprise a plurality of debit card/faux debit card embodiments, whereby:

A given crebit embodiment comprises a plurality comprising more than one like-embodiment debit card/faux debit card, where, using any payment parameter that enables payment differentiation, such as an Amount Threshold, or using any payment condition that enables payment differentiation, such as an overdraft condition, certain transactions are paid using a first like-embodiment debit card, whereby other transactions are paid using at least a second like-embodiment debit card, where each like-embodiment debit card comprises at least one available credit balance whereby any of the at least one available credit balance may be shared or unshared among the plurality, and where each like-embodiment debit card comprises at least one payment source whereby any of the at least one payment source may be shared or unshared among the plurality.

A given crebit embodiment comprises a plurality comprising more than one different-embodiment debit card/faux debit card, where, using any payment parameter that enables payment differentiation, such as an Amount Threshold, or using any payment condition that enables payment differentiation, such as an overdraft condition, certain transactions are paid using a first different-embodiment debit card, such as a transactions paid in-turn debit card embodiment, whereby other transactions are paid using at least a second different-embodiment debit card, such as a transactions paid-together debit card embodiment, where each different-embodiment debit card comprises at least one available credit balance whereby any of the at least one available credit balance may be shared or unshared among the plurality, and where each different-embodiment debit card comprises at least one payment source whereby any of the at least one payment source may be shared or unshared among the plurality.

A given crebit embodiment comprises a plurality comprising at least three debit card/faux debit card embodiments comprising any combination of like-embodiment or different-embodiment debit card/faux debit card embodiments, where each debit card embodiment comprises at least one available credit balance whereby any of the at least one available credit balance may be shared or unshared among the plurality, and where each debit card embodiment comprises at least one payment source whereby any of the at least one payment source may be shared or unshared among the plurality.

Available credit balances that are shared or unshared present some versatile embodiment options, where myriad available credit balance permutations are possible. For example, a plurality of debit card/faux debit card payment source embodiments may share a single available credit balance, which may comprise the initial available credit balance, or a separate available credit balance. In a single debit card embodiment, the one debit card available credit balance may comprise the initial available credit balance, or its own separate available balance. In a two-debit card embodiment, one debit card available credit balance may comprise the initial available credit balance, while the remaining debit card embodiment comprises a separate available balance; or, each of the debit cards may comprise its own available credit balance, separate from the initial available balance, which results in a total of three available credit balances. More than two debit card crebit embodiments scale up the number of permutations accordingly. Furthermore, it is possible for a plurality of available credit balances to comprise more than one credit reporting item, especially in relation to embodiments prone to credit-default risk from more than one credit balance.

More than one like-kind debit card/faux debit card embodiment may be used in a single crebit embodiment, where, using any payment parameter that permits payment differentiation, such as amount threshold, certain transactions are paid using a first like-embodiment debit card, where other transactions are paid using at least a second like-embodiment debit card, where first and at least a second debit card/faux debit card comprise the same credit balance, or separate credit balances, and where each one comprises at least one payment source, where any of the at least one payment source may be shared or unshared. Also more than one different-kind debit card/faux debit card embodiment may be used in a single crebit embodiment, where, using any payment parameter that permits payment differentiation, such as amount threshold, certain transactions are paid using a paid in-turn debit card embodiment, where other transactions are paid using a paid together debit card embodiment. Where first and at least a second debit card/faux debit card comprise the same credit balance, or separate credit balances, where each one comprises at least one payment source, and where any of the at least one payment source may be shared or unshared.

Timeframe is another aspect of the invention that includes where the debit to the second account is made within an a selected, automated or pre-determined timeframe that is beneficial to either the end user or to the institution holding the first and/or second accounts. While one may assume that, per the transaction processor making the transfer, that the desired transfer itself occurs immediately upon or after the debit to the initial at least one available balance occurs, such may or may not necessarily be the case. The entity that offers the global account/transaction processor to the end user may choose any timeframe for when such transfers occur, such as immediately upon or after the debit to the initial at least one available balance occurs; or, 1-60 seconds, 1-60 minutes, 1-24 hours, 1-31 days, etc. (or any range or value therein), after the debit to the initial at least one available balance occurs. While such a cornerstone decision regarding timeframe is most likely best left to the entity that offers the global account/transaction processor to the end user, it is not impossible for the end user to have some, or much, say with regard to such timeframe parameters.

In the following example, all transactions debit an initial at least one available credit balance. However, in this case, the transaction processor has a threshold parameter where the end user wants all transaction amounts up to $25 to debit his available cash balance, and all transaction amounts above $25 to debit the available credit balance. Therefore, while all amounts initially debit the available credit balance, for transaction amounts up to $25, the amount, within any specified timeframe, will be debited from the available cash balance, and credited to the available credit balance, resulting in a zero net balance to the initial credit balance for those transaction amounts of $25 and below. Due to concepts discussed earlier, such as Rescue and Reject and Best Fit, should there not be an adequate available cash balance to enable the transfer from the initial at least one available credit balance debit to a debit to the available cash balance for those transaction amounts of $25 and below, the capability exists for those transaction amounts to remain as a debit to the initial at least one available credit balance.

| Date | Description | Transaction Amount | Initial Credit Bal Debit | Amt Debited From Cash Bal | Net Effect Initial Credit |
|---|---|---|---|---|---|
| 01-02 | Restaurant | 48.00 | 48.00 | -0- | 48.00 |
| 01-03 | Gasoline | 21.00 | 21.00 | 21.00 | -0- |
| 01-05 | Shoe Store | 36.00 | 36.00 | -0- | 36.00 |
| 01-06 | Supermarket | 63.00 | 63.00 | -0- | 63.00 |
| 01-14 | Gasoline | 15.00 | 15.00 | 15.00 | -0- |
| 01-18 | Appliance Store | 750.00 | 750.00 | -0- | 750.00 |
| 01-24 | Gasoline | 18.00 | 18.00 | 18.00 | -0- |
| 01-30 | Restaurant | 33.00 | 33.00 | -0- | 33.00 |
| | TOTAL | 984.00 | 984.00 | 54.00 | 930.00 |

What is interesting is that by setting the transaction processor so that all transaction amounts which debit the initial at least one available credit balance are automatically zeroed out (within any specified timeframe, e.g., 1-60 seconds, 1-60 minutes, 1-24 hours, 1-31 days, 1-52 weeks, 1-48 months, monthly, bimonthly, quarterly, semiannually, annually, etc., or any range or value therein) by an available cash balance, the global account behaves similarly to a standard debit card account, but with the additional benefit of employing an available credit balance.

In the example that follows, again, all transactions debit an initial at least one available credit balance. However, in this case, the transaction processor has a threshold parameter where the end user desires that amounts up to and including the first $20 of all transaction amounts will debit his available cash balance, and that all remainder amounts above $20 will debit the available credit balance. Therefore, while all amounts initially debit the available credit balance, amounts up to and including the first $20 of each transaction, within any specified timeframe, will be debited from the available cash balance, and credited to the available credit balance, resulting in a zero net balance to the initial credit balance for those transaction amounts of $25 and below.

| Date | Description | Transaction Amount | Initial Credit Bal Debit | Amt Debited From Cash Bal | Net Effect Initial Credit |
|---|---|---|---|---|---|
| 01-14 | Gasoline | 15.00 | 15.00 | 15.00 | -0- |
| 01-18 | Appliance Store | 750.00 | 750.00 | 20.00 | 730.00 |
| 01-24 | Gasoline | 18.00 | 18.00 | 18.00 | -0- |
| 01-30 | Restaurant | 33.00 | 33.00 | 20.00 | 13.00 |
| | TOTAL | 984.00 | 984.00 | 153.00 | 831.00 |

While it is perceived as preferable that having an initial singular available balance from which all transactions are debited be a credit balance as opposed to a cash balance, it is possible to have the initial singular available balance be a cash balance. In the following example, all transactions are debited from an initial singular available cash balance. In this case, the end user wants all transaction amounts above $50 to debit the available credit balance and credit the available cash balance, while transactions up to and including $50 remain as a debit to the available cash balance.

| Date | Description | Transaction Amount | Initial Cash Bal Debit | Amt Debited From Credit Bal | Net Effect Initial Cash |
|---|---|---|---|---|---|
| 01-02 | Restaurant | 48.00 | 48.00 | -0- | 48.00 |
| 01-03 | Gasoline | 21.00 | 21.00 | -0- | 21.00 |
| 01-05 | Shoe Store | 36.00 | 36.00 | -0- | 36.00 |
| 01-06 | Supermarket | 63.00 | 63.00 | 63.00 | -0- |
| 01-14 | Gasoline | 15.00 | 15.00 | -0- | 15.00 |
| 01-18 | Appliance Store | 750.00 | 750.00 | 750.00 | -0- |
| 01-24 | Gasoline | 18.00 | 18.00 | -0- | 18.00 |
| 01-30 | Restaurant | 33.00 | 33.00 | -0- | 33.00 |
| | TOTAL | 984.00 | 984.00 | 813.00 | 171.00 |

A subtle variation is where all transactions debit an initial singular available balance (whether credit or cash balance), but then a given transaction amount, in its entirety, is automatically transfer or moved from the initial singular available balance to at least one different available balance, where the net effect on the initial credit balance always zeroes out. As discussed earlier, in the case where the initial singular available balance is a credit balance, the given transaction amounts that the transaction processor assigns to debit the available cash balance(s) are used in order to credit (and zero out) the initial credit balance. The variation is illustrated with an example comprising at least one additional or sub available credit account balance. In this example, transaction amounts up to and including $25 have the available cash balance crediting the debit to the initial singular available credit balance that was created by the transaction, which results in a debit to the available cash balance; whereas transaction amounts above $25 have the sub available credit balance crediting the debit to the initial singular available credit balance created by the transaction, which results in a debit to the sub available credit balance. This gives rise to where one available credit balance (the initial singular available credit balance) is zeroed out (credited) by debiting a different available credit balance (the sub available credit account balance). As mentioned before, any desired timeframe for this transfer, or zeroing out is possible. It is this debit to the sub available credit account balance that the end user ultimately pays.

| Date | Description | Trans Amount | Ini Credit Bal Debit | Amt Debited Frm Cash Bal | Sub Credit Bal debit | Net Effect Ini Credit |
|---|---|---|---|---|---|---|
| 01-02 | Restaurant | 48.00 | 48.00 | -0- | 48.00 | -0- |
| 01-03 | Gasoline | 21.00 | 21.00 | 21.00 | -0- | -0- |
| 01-05 | Shoe Store | 36.00 | 36.00 | -0- | 36.00 | -0- |
| 01-06 | Supermarket | 63.00 | 63.00 | -0- | 63.00 | -0- |
| 01-14 | Gasoline | 15.00 | 15.00 | 15.00 | -0- | -0- |
| 01-18 | Appliance Store | 750.00 | 750.00 | -0- | 750.00 | -0- |
| 01-24 | Gasoline | 18.00 | 18.00 | 18.00 | -0- | -0- |
| 01-30 | Restaurant | 33.00 | 33.00 | -0- | 33.00 | -0- |
| | TOTAL | 984.00 | 984.00 | 54.00 | 930.00 | -0- |

The following example illustrates a more complex embodiment where a transaction amount, instead of debiting an initial singular available balance whereby a given transaction amount may or may not be transferred to at least one different available balance, debits instead an initial plurality of available balances, whereby any or all of the initial plurality of available balances may or may not be transferred to at least one different available balance. Here, transaction amounts above $25 debit the initial credit balance, while transaction amounts up to and including $25 debit the initial cash balance. Within any specified timeframe, the net effect on the initial credit and initial cash balances is where they are zeroed out by their respective sub credit and sub cash accounts. There can be any reason for desiring such levels of complexity. Being that available balances comprising the global account, whether available cash balances or available credit balances, may comprise any combination of in-house or out-of-house accounts, one possible reason for having relatively complex embodiments could be where the initial credit and cash balances are in-house balances, whereas one or more of the sub balances are out-of-house balances.

| Date | Description | Trans Amount | Ini Credit Bal Debit | Ini Cash Bal Debit | Sub Credit Bal Debit | Sub Cash Bal Debit | Net Effect Ini Acct Bal |
|---|---|---|---|---|---|---|---|
| 01-02 | Restaurant | 48.00 | 48.00 | -0- | 48.00 | -0- | -0- |
| 01-03 | Gasoline | 21.00 | -0- | 21.00 | -0- | 21.00 | -0- |
| 01-05 | Shoe Store | 36.00 | 36.00 | -0- | 36.00 | -0- | -0- |
| 01-06 | Supermkt | 63.00 | 63.00 | -0- | 63.00 | -0- | -0- |
| 01-14 | Gasoline | 15.00 | -0- | 15.00 | -0- | 15.00 | -0- |
| 01-18 | Applnce Str | 750.00 | 750.00 | -0- | 750.00 | -0- | -0- |
| 01-24 | Gasoline | 18.00 | -0- | 18.00 | -0- | 18.00 | -0- |
| 01-30 | Restaurant | 33.00 | 33.00 | -0- | 33.00 | -0- | -0- |
| | TOTAL | 984.00 | 930.00 | 54.00 | 930.00 | 54.00 | -0- |

Standard Debit Card
Transactions Automatically and Individually Paid In-Turn

A typical standard debit card comprises where each authorized transaction is automatically and individually paid in-turn using actual end-user funds, where a typical, standard debit card functions by debiting a cash balance for each transaction amount, as seen in the following example:

| Date | Description | Transaction Amount | Cash Balance Debit |
|---|---|---|---|
| 01-02 | Restaurant | 48.00 | 48.00 |
| 01-03 | Gasoline | 21.00 | 21.00 |
| 01-05 | Shoe Store | 36.00 | 36.00 |
| 01-06 | Supermarket | 63.00 | 63.00 |
| 01-14 | Gasoline | 15.00 | 15.00 |
| 01-18 | Appliance Store | 750.00 | 750.00 |
| 01-24 | Gasoline | 18.00 | 18.00 |
| 01-30 | Restaurant | 33.00 | 33.00 |
| | TOTAL | 984.00 | 984.00 |

Here, once a given transaction debits an available cash balance, the transaction is PAID.

Standard Debit Card
Transactions Automatically and Individually Paid In-Turn with Additional Readjustment Capability
To Create Credit-Default Risk As disclosed in the earlier readjustment section comprising transaction specific readjustments and amount specific readjustments, any transaction or transaction amount that debits an account balance can be automatically or manually readjusted, so when a transaction has been paid by debiting a cash balance (such as an automatic debit/payment with a standard debit card), by readjusting the transaction to an available credit balance, it becomes unpaid, all without ever involving the merchant, or most if not all transaction processing intermediaries. In fact, in a standard debit card embodiment, where all the transaction items have already been automatically paid for by the actual end user, by enabling the addition and usage of at least one available credit balance, the readjustment mechanism can un pay all or some of the transactions, whereby the transactions are moved over to the at least one available credit balance(s) for repayment at a future date. As disclosed in the earlier readjustment section, this enables the end user to free up cash for different purposes, such as an ATM or check withdrawal or to automatically (or even manually) address an overdraft condition to prevent an ATM withdrawal from rejecting, or a check from bouncing. In addition to new debit card embodiments, it is important to understand that any preexisting standard, separate or free-standing debit card account or embodiment can be subsequently modified and enhanced with the addition and enabling of at least one available credit balance that will enable such readjustments comprising transaction specific readjustments and amount specific readjustments. A transaction that was paid using an available cash balance, and then was subsequently readjusted, may be seen as being already paid/then unpaid-but will be repaid later, AKA paid/unpaid-will be repaid, which results in the crediting of at least one available cash balance (which may comprise the initial cash balance, and/or even at least one other available cash balance), and a debiting of at least one available credit balance that, like a credit card transaction, is repaid at a future time.

The following example shows a standard debit card embodiment modified and enhanced with the addition and enabling of at least one available credit balance that will enable readjustments to occur.

| Date | Description | Transaction Amount | Cash Bal Paid | Readjustment Amt Unpaid | Credit Balance To Be Repaid |
|---|---|---|---|---|---|
| 01-02 | Restaurant | 48.00 | 48.00 | -0- | -0- |
| 01-03 | Gasoline | 21.00 | 21.00 | -0- | -0- |
| 01-05 | Shoe Store | 36.00 | 36.00 | -0- | -0- |
| 01-06 | Supermarket | 63.00 | 63.00 | 63.00 | 63.00 |
| 01-14 | Gasoline | 15.00 | 15.00 | 15.00 | 78.00 |
| 01-18 | Appliance Store | 750.00 | 750.00 | 750.00 | 828.00 |
| | TRANSACTIONS FROM 01-06, 01-14, AND 01-18 ARE READJUSTED (UNPAID), THUS CREDITING CASH BALANCE(S) FOR $828.00 | | | | |
| 01-24 | Gasoline | 18.00 | 18.00 | -0- | -0- |
| 01-30 | Restaurant | 33.00 | 33.00 | -0- | -0- |
| | TOTAL | 984.00 | 984.00 | 828.00 | 828.00 |

The transactions of 01-06, 01-14, and 01-18 are readjusted, resulting in a readjusted amount of $828.00 that is credited to an available cash balance (which may comprise the initial cash balance used to originally pay for the transactions, and/or even at least one other available cash balance). As a result of the readjustment, an available credit balance is debited for the $828.00 amount that is expected by the account issuer to be repaid at a future date. In fact, it is possible to advertise to the end user that such a large cash balance is available for reuse via a readjustment comprising a transaction specific readjustment and/or an amount specific readjustment. Furthermore, it is possible to turn on and off a readjustment function that automatically readjusts (unpays) any transaction amounts by repaying (crediting) the cash balance, or another cash balance comprising the debit card, and debiting at least one available credit balance that is repaid later. This readjustment mechanism is useful for automatically un-paying transactions to cover an overdraft; however, it is also extremely useful for un-paying potentially suspicious transactions, such as out-of-state or foreign transactions when coupled with capabilities comprising special identifier information such as merchant identifier information, location of transaction origination, etc., which will be explained later.

It is questionable why any account issuer would allow a given already-paid, no-credit default risk transaction to become unpaid. After all, an end user could take all the transactions that were paid by debiting the available cash balance; unpay all of them with a readjustment that results in crediting the available cash balance thereby debiting an available credit balance; withdraw all of the cash in the available cash balance; and, fail to repay the available credit balance, thereby defaulting entirely, and leaving the account issuer/provider with a non-payment mess. While this modification/enhancement that creates credit default risk certainly renders the new embodiment of debit card unsatisfactory for the purpose of protecting account issuers/providers from end-user default, which is contrary to an intended purpose of a standard debit card, this foolhardy creation of credit default risk will surely be reflected in a fee/revenue enhancement to the account issuers/providers that is commensurate with the created risk. Ironically, the modification/enhancement to the trustworthy standard debit card that enables credit default could result in a black mark, or a negative reporting item, on a credit report, something that the standard debit card could/would never do.

near instantaneous crediting of the initial credit balance by at least one available cash balance could preclude the interim need to freeze a transaction amount comprising the at least one available cash balance. Per the example below, transactions first debit the initial available credit balance, then money, upon at least one specified time interval, is automatically transferred or debited from the available cash balance to credit, or zero out the transaction amount that debited the initial available credit balance (which is seen in the last column on the right of the example). The net effect has the transaction amount debiting the available cash balance, but by way of the initial available credit balance. This is very different than a standard debit card, being that an intended purpose of a standard debit card is to enable purchase transactions without ever employing an available credit balance. The following example is basically a no inherent credit-default risk embodiment of a faux debit card.

| Date | Description | Transaction Amount | Initial Credit Bal Debit | Amt Debited From Cash Bal | Net Effect Initial Credit |
|---|---|---|---|---|---|
| 01-02 | Restaurant | 48.00 | 48.00 | 48.00 | -0- |
| 01-03 | Gasoline | 21.00 | 21.00 | 21.00 | -0- |
| 01-05 | Shoe Store | 36.00 | 36.00 | 36.00 | -0- |
| 01-06 | Supermarket | 63.00 | 63.00 | 63.00 | -0- |
| 01-14 | Gasoline | 15.00 | 15.00 | 15.00 | -0- |
| 01-18 | Appliance Store | 750.00 | 750.00 | 750.00 | -0- |
| 01-24 | Gasoline | 18.00 | 18.00 | 18.00 | -0- |
| 01-30 | Restaurant | 33.00 | 33.00 | 33.00 | -0- |
| | TOTAL | 984.00 | 984.00 | 984.00 | -0- |

Faux Debit Card
Transactions Automatically and Individually Paid In-Turn No Inherent Credit-Default Risk Embodiment Unlike a real debit card that uses only an available cash balance, an embodiment of a faux debit card may be realized using a singular available credit balance and a singular available cash balance, although more than one available cash balance can also be employed. Here, all transactions debit the available credit balance first, whereby, at any time interval later (two seconds, two minutes, two hours, two weeks, etc., regardless of whether the time interval is chosen by the account issuer, or by the end user), the debit to the available credit balance for the amount of the transaction(s) is credited by a debit to the available cash balance, thereby zeroing out the available credit balance for the amount of the transaction(s). It is important to note per this embodiment that the transactions are individually paid in-turn, and are not all gathered/lumped together and paid at one time. An additional optional (but prudent) step is where, at the time a given transaction has been authorized, and/or at the time a given transaction debits the initial available credit balance, an amount portion of the available cash balance comprising the faux debit card is frozen for at least the amount of the transaction, so if the transfer that results in debiting the available cash balance and crediting the initial available credit balance is set to occur, say, two hours from the initial transaction being authorized and/or the transaction being debited from the initial available credit balance, then freezing the available cash balance for at least the amount of the transaction will assure that no interim debiting (say, within that two-hour window) of the available cash balance comprising the faux debit card will disrupt the initial credit balance from being properly credited by the available cash balance. Of course, instantaneous or The available cash balance(s) basically exists to serve the available credit balance. Per this particular embodiment, being that there are no additional balances besides the two, it is reasonable to assume, should the cash balance run out, that any subsequent transactions per this particular embodiment would reject due to a zero cash balance. Also kindly note that the crediting of the initial credit balance takes place at an interval relevant to the time of a given transaction, where a given transaction is paid relatively quickly, which differs from a typical credit card embodiment, where payment by or on behalf of the end user generally occurs sometime after the close of a billing cycle. It is important to note in this particular above example, with its basic unwillingness to post transactions on the credit balance capacity beyond the amount of the available cash balance, the net effect on the initial credit balance is zero.

Finally, it is extremely important to understand that any such variant of a no inherent credit-default risk faux debit card, such as the one above, where, due to any varied number of safeguards, credit default risk is neutralized or eliminated, basically results in preventing a black mark, or negative reporting item corresponding to the account from ever appearing on a credit report.

Faux Debit Card
Transactions Automatically and Individually Paid In-Turn with Capabilities to Create Credit-Default Risk Nonetheless, it is possible, in alternate embodiments of the faux debit card, for subsequent transaction amounts exceeding the available cash balances to not reject if there is either: 1) an initial available credit balance limit that exceeds the amount of the available cash balance, so when the cash balance runs out, the transactions remain on the initial credit balance for payment at a later time, such as after the close of the billing cycle; or, 2) a line of credit attached to the available cash balance; or, 3) a combination of the two.

Despite the considerable capability of the transaction processor, it should be made clear that a faux debit card, in and of itself, can be a stand-alone product offered to end users, or as a singular aspect of a much more comprehensive and versatile product that makes use of one, or numerous, available account balances in addition to the balances comprising the faux debit card. Also, while a faux debit card functions well comprising a single available credit balance and a singular available cash balance, it is disclosed, and should be understood that, technically, any number of available credit and/or cash balances may be employed, for whatever reason(s). Even over-the-top embodiments comprising, say, seven available credit balances, and fourteen available cash balances may be used, even if some of the fourteen available cash balances credit the available credit balance(s) at different times (one at two seconds, another at two minutes, another at two days, etc. after the transaction debits the available credit balance). Per earlier disclosure, it should be remembered that, as it's own freestanding faux debit card product, or as an aspect of a more comprehensive global account embodiment, the varied balances comprising the faux debit card, like a global account in general, could comprise any combination of in-house and out-of-house available balances.

Expanding on the previous example, in the following example, available credit balance #1 and the cash balance are linked to act as a faux debit card, where upon the realizing the depleted available cash balance after the 01-14 transaction, the subsequent transactions remain on available credit balance #1, and are carried as open items without a cash balance offset, to either be repaid, or defaulted on.

| Date | Description | Trans Amount | Credit Bal #1 Debit | Amt Debited Frm Cash Bal | Net Effect Credit #1 |
|---|---|---|---|---|---|
| 01-02 | Restaurant | 48.00 | 48.00 | 48.00 | -0- |
| 01-03 | Gasoline | 21.00 | 21.00 | 21.00 | -0- |
| 01-05 | Shoe Store | 36.00 | 36.00 | 36.00 | -0- |
| 01-06 | Supermarket | 63.00 | 63.00 | 63.00 | -0- |
| 01-14 | Gasoline | 15.00 | 15.00 | 15.00 | -0- |

| Date | Description | Trans Amount | Credit Bal #1 Debit | Amt Debited Frm Cash Bal | Net Effect Credit #1 |
|---|---|---|---|---|---|
| -continued | | | | | |
| AVAILABLE CASH BALANCE DEPLETED - SUBSEQUENT TRANSACTIONS WILL DEBIT AVAILABLE CREDIT BALANCE #1. | | | | | |
| 01-18 | Appliance Store | 750.00 | 750.00 | -0- | 750.00 |
| 01-24 | Gasoline | 18.00 | 18.00 | -0- | 18.00 |
| 01-30 | Restaurant | 33.00 | 33.00 | -0- | 33.00 |
| | TOTAL | 984.00 | 984.00 | 183.00 | 801.00 |

Per the above example, it should be understood that upon the depletion of the available cash balance, any new transactions could debit at least one other available credit balance besides available credit balance #1. Also, depletion of the available cash balance, whereby credit balance transactions can post without a cash balance offset, can be hastened by making withdrawals from the available cash balance(s) used to offset the credit balance.

As seen earlier as a modification/enhancement to a typical, standard debit card, readjustments can also be used to create credit-default risk in a faux debit card embodiment. The next example shows a transaction-specific readjustment of two transactions from the faux debit card comprising available credit balance #1 and an available cash balance; however, for the sake of illustrative example, the post-readjustment transaction will be moved over to available credit balance #2 for repayment (or default) at a later time. Kindly remember that readjustments comprising transaction specific readjustments and amount specific readjustments may be desired for purposes such as if the end user wants to unpay, or reclaim cash spent on a prior transaction by crediting an available cash balance with a debit to at least one available credit balance (that will be repaid) to use for other purposes (even if the cash is automatically reclaimed to prevent an overdraft condition, such as where an automatic transaction specific readjustment or amount specific readjustment can raise enough cash to prevent an incoming check from bouncing). Per this readjustment example, the already-paid 01-06 Supermarket bill, the 01-14 Gasoline bill, and the 01-18 Appliance Store bill are unpaid and moved from the faux debit card to available credit balance #2, where the readjustment basically results in available credit balance #1 and the available cash balance being credited back to their pre-transaction conditions (resulting in a higher available cash balance), with available credit balance #2 being debited for the transaction amounts, where credit balance #2 will be repaid at a future time.

| Date | Description | Trans Amount | Credit Bal #1 Debit | Cash Bal Debit/Pd | Readjust Amt Unpaid | Credit Bal #2 To Be Repaid |
|---|---|---|---|---|---|---|
| 01-02 | Restaurant | 48.00 | 48.00 | 48.00 | -0- | -0- |
| 01-03 | Gasoline | 21.00 | 21.00 | 21.00 | -0- | -0- |
| 01-05 | Shoe Store | 36.00 | 36.00 | 36.00 | -0- | -0- |
| 01-06 | Supermarket | 63.00 | 63.00 | 63.00 | 63.00 | 63.00 |
| 01-14 | Gasoline | 15.00 | 15.00 | 15.00 | 78.00 | 78.00 |
| 01-18 | Appliance Store | 750.00 | 750.00 | 750.00 | 828.00 | 828.00 |
| TRANSACTIONS FROM 01-06, 01-14, AND 01-18 ARE READJUSTED (UNPAID), THUS CREDITING CASH BALANCE FOR $828.00 | | | | | | |
| 01-24 | Gasoline | 18.00 | 18.00 | 18.00 | -0- | -0- |
| 01-30 | Restaurant | 33.00 | 33.00 | 33.00 | -0- | -0- |
| | TOTAL | 984.00 | 984.00 | 984.00 | 828.00 | 828.00 |

Please note that due to the paid/unpaid-will repay readjustment and the corresponding credit default risk that is created as a result, any subsequent default on the credit balance could result in a black mark, or a negative reporting item, on a credit report.

Also note that readjustment debited available credit balance #2, the readjustment could have just as easily debited available credit balance #1, to the total exclusion, or even non-existence, of any additional credit balances such as available credit balance #2, and/or even at least one other additional available credit balance other than credit balances #1 and #2. Also, while the same (initial) cash balance that was used to pay for the transactions was credited by the readjustment amounts, it is possible for such readjustment amounts to credit at least one cash balance comprising the initial cash balance, and/or at least one other available cash balance.

Furthermore, it is possible to interrupt (turn off, and then turn back on) the automated payment function that facilitates the crediting of the available credit balance(s) with the debiting of the available cash balance(s), resulting in open items, whereby the open items remain on the initial available credit balance and/or are transferred to at least one other available credit balance. An example of a toggle that permits such interruption is as follows:

_____X_____ (Box Checked)—by Checking the Box on the Left, You Request that we Automatically Pay Your Credit Items in Turn Using Your Available Cash Balance(s). By Un-Checking the Box, You Assume Responsibility for Paying Your Credit Items.

A given transactions paid in-turn faux debit card embodiment looking to create credit default risk may comprise any one, a few, or all of the following:

Depletion of any cash balance funds used as an offset to credit the available credit balance for transaction amounts, whereby the resulting open credit items are carried forward and defaulted on.

Withdrawal of any cash balance funds used as an offset to credit the available credit balance for transaction amounts, whereby the resulting open credit items are carried forward and defaulted on.

Readjustment of any of the transactions that were paid in-turn, whereby the resulting open credit items are carried forward and defaulted on.

Interim interruption of the automated payment function that facilitates the crediting of the available credit balance(s) with the debiting of the available cash balance(s), whereby the resulting open credit items are carried forward and defaulted on.

Faux Debit Card
Plural Transactions Automatically Paid Together at a Given Time Interval No Inherent Credit-Default Risk Embodiments Another embodiment of the faux debit card involves where a plurality of transactions are cumulatively and automatically paid together at a given time interval, such as at or after the close of a billing cycle, using actual end-user funds that are cumulatively frozen, earmarked or otherwise allocated in concert with the plurality of posted transactions. While the term plural is used, it is of course possible that if only one transaction is posted prior to the given time interval, then only that one transaction would be paid upon that given time interval.

Such an embodiment entails the freezing, or reserving of at least one available cash balance for the incoming transaction amounts that debit the initial available credit balance, then at the close, or sometime after the close of the billing cycle (even as late as the last minute of the payment due date that is well after the actual close of the billing cycle, after which the payment would be past-due), the frozen at least one available cash balance is debited, and the initial credit balance is credited. Using a relatively long timeframe, such as at or near the end of a billing cycle, may be seen in the following example of a faux debit card. Here, the incoming transactions debit an initial available credit balance, and are credited or paid all at once by the (frozen) available cash balance after the close of the billing cycle on 02-01. In the interim, the amounts of the transactions cumulatively debit the initial available credit balance and also cumulatively freeze or restrict the available cash balance for the cumulative amount totals of the transactions.

| Date | Description | Transaction Amount | Initial Credit Bal Debit | Cash Bal Amt Frozen | Net Effect Initial Credit |
|---|---|---|---|---|---|
| 01-02 | Restaurant | 48.00 | 48.00 | 48.00 | 48.00 |
| 01-03 | Gasoline | 21.00 | 69.00 | 69.00 | 69.00 |
| 01-05 | Shoe Store | 36.00 | 105.00 | 105.00 | 105.00 |
| 01-06 | Supermarket | 63.00 | 168.00 | 168.00 | 168.00 |
| 01-14 | Gasoline | 15.00 | 183.00 | 183.00 | 183.00 |
| 01-18 | Appliance Store | 750.00 | 933.00 | 933.00 | 933.00 |
| 01-24 | Gasoline | 18.00 | 951.00 | 951.00 | 951.00 |
| 01-30 | Restaurant | 33.00 | 984.00 | 984.00 | 984.00 |
| 02-01 | CUMULATIVE FROZEN CASH BALANCE IS AUTOMATICALLY DEBITED (ZEROED OUT) IN ORDER TO CREDIT INITIAL AVAILABLE CREDIT BALANCE- | | | | |
| | TOTAL | 984.00 | PAID | -0- | -0- |

By cumulatively freezing the available cash balance for the amounts of the transactions, under normal circumstances (with exceptions to be explained later), the frozen or reserved cash cannot be used by the end user for other purposes such as check clearance, ATM withdrawals, etc., thereby ensuring that there will be adequate funds in the available cash balance to cover the initial available credit balance comprising the transaction amounts. After the close of the billing cycle on (say, 12:01 AM on 02-01), the frozen cumulative available cash balance becomes zero, because the frozen cash amounts were moved over in order to credit the transaction amount debits to the initial credit balance, thus zeroing out the initial credit balance, and basically rendering it PAID. Being that the cash balance(s) are very carefully frozen or reserved in accordance with each transaction, and the automated payment of the credit balance(s) that takes place at least once during the billing cycle is guaranteed, the above example is a no inherent credit-default risk embodiment of a faux debit card. Be careful not to confuse the frozen cumulative available cash balance with the available cash balance. It is possible to zero-out the frozen available cash balance amount while still maintaining a large available cash balance, whereby the large available cash balance is a separate, unfrozen item entirely. Also, by freezing the available cash balance, the account issuer has interim use of the funds comprising the frozen cash balance. As a matter of fact, the frozen cash balance can either still be part of any of the end user's available cash balance(s), or the frozen cash balance can be held on an interim basis in any one or more account balance(s) belonging to the account issuer. These frozen available cash balances are is advantageous to the issuer, because the issuer can earn more on the frozen available cash balances than it pays for carrying costs on funds that the issuer uses to pay the merchants. Nonetheless, it is possible for the end user to earn no, some, or much interest income on these frozen reserves. Being that the above example is a no inherent credit-default risk embodiment of a faux debit card, credit default risk is neutralized or eliminated, thus basically preventing a black mark, or negative reporting item corresponding to the account from ever appearing on a credit report.

An interesting variant on the above is the next example comprising a no inherent credit-default risk embodiment of a faux debit card where the end user can elect to pay at least one, or even all of the transactions, or transaction amounts, posted to the initial available credit balance before the close of the billing cycle, prior to the automatic payment after the end of the billing cycle.

To review, disclosed are two distinct no inherent credit-default risk embodiments of a faux debit card where a plurality of transactions are cumulatively and automatically paid together at a time interval, such as at or after the close of a billing cycle, using frozen end-user funds:

The standard embodiment; and,

The standard embodiment that allows, prior to the automatic payment of the plurality of transactions, a manual prepayment of at least one transaction, or at least one transaction amount, using either the allocated frozen cash balance, or funds other than the allocated frozen cash balance.

Faux Debit Card
Plural Transactions Automatically Paid Together at a Given Time Interval with Capabilities to Create Credit-Default Risk An additional embodiment of the disclosed frozen cash balance faux debit card involves tactics for creating credit default risk that individually are formidable, and in any combination are virtually mind-numbing. A given frozen-balance faux debit card embodiment looking to create credit default risk may comprise any one, a few, or all of the following:

Withdrawal of any frozen or earmarked funds yet to be paid comprising the frozen cash balance(s) corresponding to the unpaid transactions, resulting in a shortfall in the frozen amount that is ultimately paid, where the resultant credit balance due is defaulted on. This can comprise an amount-specific funds withdrawal (withdraw $100); a transaction-specific funds withdrawal, where at least

| Date | Description | Transaction Amount | Initial Credit Bal Debit | Cash Bal Amt Frozen | Net Effect Initial Credit |
|---|---|---|---|---|---|
| 01-02 | Restaurant | 48.00 | 48.00 | 48.00 | 48.00 |
| 01-03 | Gasoline | 21.00 | 69.00 | 69.00 | 69.00 |
| 01-05 | Shoe Store | 36.00 | 105.00 | 105.00 | 105.00 |
| 01-06 | Supermarket | 63.00 | 168.00 | 168.00 | 168.00 |
| 01-14 | Gasoline | 15.00 | 183.00 | 183.00 | 183.00 |
| 01-18 | Appliance Store | 750.00 | 933.00 | 933.00 | 933.00 |
| 01-18 | END USER MANUALLY PREPAYS TRANSACTION | | | 183.00 | 183.00 |
| 01-24 | Gasoline | 18.00 | 201.00 | 201.00 | 201.00 |
| 01-30 | Restaurant | 33.00 | 234.00 | 234.00 | 234.00 |
| 02-01 | CUMULATIVE FROZEN CASH BALANCE IS AUTOMATICALLY DEBITED (ZEROED OUT) IN ORDER TO CREDIT INITIAL AVAILABLE CREDIT BALANCE— | | | | |
| | TOTAL | 234.00 | PAID | -0- | -0- |

On 01-19, the end user decided to manually prepay the 01-18 Appliance Store purchase prior to the automatic payment at or immediately after the close of the billing cycle. Such manual prepayment may be done any number of ways depending on the system used, but basically comprises highlighting or otherwise identifying at least one given transaction, and performing a payment step for the transaction(s). In the example, while the money is debited from the allocated frozen cash balance and credited to the 01-18 transaction, it is entirely possible for the end user to use any funds other than the allocated frozen cash balance to make the payment on the 01-18 transaction. Additionally, it is entirely possible to front-run the billing cycle close, randomly manually prepaying different transactions or transaction amounts throughout the billing cycle, so when the billing cycle does close, there are no outstanding transaction items to be automatically paid, as well as the probability that there is no remaining frozen balance to pay them with, unless outside funds were additionally used for the prepayment.

one specific unpaid transaction is highlighted, and the frozen/earmarked funds directly corresponding to the at least one specific unpaid transaction is withdrawn, whereby the at least one specific unpaid transaction is carried forward as an open item; or, where an amount is specified, and using FIFO, LIFO, etc. the frozen/earmarked funds directly corresponding to the at least one specific unpaid transaction is automatically identified and withdrawn, whereby the at least one specific unpaid transaction is carried forward as an open item (all of these amount/transaction selection methods are analogous to those described in the earlier section on readjustments, but differ from the readjustment methods due to the fact that the earlier disclosed readjustment deals with transactions that have already been paid, and not the abovementioned unpaid transactions that are earmarked to be paid later).

Interim interruption of the freezing or reserving of the cash balance(s) used to pay the initial credit balance debits cause by the incoming transactions, resulting in a shortfall in the frozen amount payable, where the resultant credit balance due is defaulted on. Such can be seen where the freezing is interrupted on the 10$^{th}$ day of a given month, and not resumed until the 15$^{th}$ day of the same month, whereby all transactions in the interim five days had no amount frozen or reserved, are carried as open items, and are defaulted on.

Readjustment of any the transactions that were paid prior to the close of the billing cycle, whereby the readjustment unpays the paid transactions or transaction amounts, the credited cash is withdrawn, and the unpaid transactions are carried forward as open items and defaulted on.

Disruption of the automated payment function that debits the frozen/reserved balance in order to credit the transaction amounts comprising the credit balance, where the payment of the credit balance is defaulted on. An example of a toggle that permits such interruption is as follows:

_____ (Box Un-Checked) by Checking the Box on the Left, You Request that we Automatically Debit Your Frozen Cash Balance to Automatically Pay the Credit Balance of Your Faux Debit Card at the End of the Billing Cycle. By Un-Checking the Box, You Assume Responsibility for Paying the Credit Balance.

Readjustment after the automated payment function has taken place, whereby the readjustment unpays the paid transactions or transaction amounts, the credited cash is withdrawn, and the unpaid transactions are carried forward as open items and defaulted upon.

Such default elements can be seen in the following faux debit card example comprising an initial available credit balance, and a cumulative frozen cash balance that ordinarily credits the initial available credit balance at the end, or close, of the billing cycle.

prepaid the 01-05 transaction prior to the close of the billing cycle, but on 01-17, readjusted the paid 01-05 transaction, thus rendering it unpaid, where the initial credit balance was debited a second time for the transaction amount (with the first debiting being the original transaction posting on 01-05), and the frozen cash balance was re-credited. On 01-13, the end user chose to disrupt the freezing of the available cash balance resulting in where the 01-14 purchase, not to mention the sizable 01-18 purchase, were posted to the initial credit balance without an offset in the frozen cash balance, so the frozen cash balance shortfall increased dramatically. On 01-19, the end user resumed the freezing of the available cash balance, thereby providing frozen cash balance offsets to the 01-24 and 01-30 transactions. Finally, on 01-31, prior to the close of the billing cycle, the end user disrupted the automated payment function, and withdrew the frozen cash balance of $150.00. Whether or not the end user ends up defaulting on the account balance payment is at this point anybody's guess. Kindly note that even if the end user had not disrupted the automated payment function, nor withdrew the frozen cash balance of $150.00, it would still be possible for the end user to reclaim the $150.00 payment by performing a readjustment after the automated payment function has taken place.

For some end users, seeing, or even being notified by the account issuer/provider, that there is a frozen balance that can be plundered, could prove too hard to resist. Nonetheless, any shortfall can be restored prior to the close of the billing cycle, or simply paid after the close of the billing cycle. Regardless, employing any one, some, or all of the mechanisms comprising 1) withdrawal of any frozen or earmarked funds, 2) interim interruption of the freezing or reserving of cash balance(s), 3) readjustment of any the transactions that were paid prior to the close of the billing cycle, 4) disruption of the

| Date | Description | Transaction Amount | Initial Credit Bal Debit | Cash Bal Amt Frozen | Net Effect Initial Credit |
|---|---|---|---|---|---|
| 01-02 | Restaurant | 48.00 | 48.00 | 48.00 | 48.00 |
| 01-03 | Gasoline | 21.00 | 69.00 | 69.00 | 69.00 |
| | FROZEN CASH BALANCE AMOUNTS FOR 01-02 AND 01-03 | | | | |
| | TRANSACTIONS FOR $69.00 WITHDRAWN | | | -0- | |
| 01-05 | Shoe Store | 36.00 | 105.00 | 36.00 | 105.00 |
| 01-06 | Supermarket | 63.00 | 168.00 | 99.00 | 168.00 |
| | TRANSACTION OF 01-05 FOR $36.00 PREPAID PRIOR TO THE CLOSE OF THE BILLING CYCLE | | | | |
| | | | 132.00 | 63.00 | 132.00 |
| 01-13 | FREEZING OF THE AVAILABLE CASH BALANCE DISRUPTED | | | | |
| 01-14 | Gasoline | 15.00 | 147.00 | 63.00 | 147.00 |
| | READJUSTMENT OF $36.00 TRANSACTION PREPAID ON 01-07 | | | | |
| | ORIG. POSTED ON 01-05 | | 183.00 | 99.00 | 183.00 |
| 01-18 | Appliance Store | 750.00 | 933.00 | 99.00 | 933.00 |
| 01-19 | FREEZING OF THE AVAILABLE CASH BALANCE RESUMED | | | | |
| 01-24 | Gasoline | 18.00 | 951.00 | 117.00 | 951.00 |
| 01-30 | Restaurant | 33.00 | 984.00 | 150.00 | 984.00 |
| | AUTOMATED PAYMENT FUNCTION DISRUPTED BY END USER | | | | |
| 01-31 | FROZEN CASH BALANCE AMOUNT OF $150.00 IS WITHDRAWN | | | | |
| | TOTAL | 984.00 | 984.00 | -0- | 984.00 |

This rather comprehensive example shows how the end user can severely manipulate the transaction activity. On 01-04, the frozen cash balance transaction amounts for the 02-03 transactions are withdrawn, so right off the bat there is a shortfall in the frozen cash balance. On 01-07, the end user automated payment function, or 5) readjustment after the automated payment function has taken place, assures that the potential for credit default is well entrenched, where imprudent individuals could certainly suffer a black mark, or a negative reporting item, on a credit report.

Hybrid Faux Debit Card
Transactions Automatically and Individually Paid in-Turn then Automatically and Individually Readjusted in-Turn with Plural Transactions Automatically Paid Together at a Given Time Interval
No Inherent Credit-Default Risk Embodiment
—or—
with Capabilities to Create Credit-Default Risk This highly unique hybrid comprises where individual transactions on the initial credit balance are automatically paid, then automatically unpaid (readjusted), then the plurality of transactions are cumulatively and automatically paid together at a given later time interval. The readjusted credit balance can be the initial credit balance, or a different balance entirely. Although the other presently disclosed debit card embodiments use a readjustment mechanism as one way of creating credit-default risk, this particular hybrid is the only version that has an unpaid readjustment function as a core aspect of its operation.

With regard to readjustments, any of the disclosed debit card embodiments, as well as any other embodiments that are able to use the readjustment paid/unpay-will repay later mechanism, it is prudent to at least have the option of turning on and off controls on any readjustment functions, especially the automated readjustment functions that permit the automatic covering of items like overdrafts. Such controls may comprise manually locking and unlocking at least one given transaction to prevent or allow automated readjustments on the transaction(s), or automated parameters, where perhaps transactions over or under a selected amount may or may not be readjusted, or where readjustments are not allowed on transactions with a given merchant, etc., with the possibility that such restrictions on a given transaction can be overridden by performing a manual readjustment that is directly performed, requested, or overseen by the end user.

Another matter concerns the credit limit comprising one or more credit balances. Being that myriad possibilities exist with regards to establishing, setting, or revising credit limit(s)

| Date | Description | Transaction Amount | Initial Credit Bal Debit | Cash Bal Amt Paid/Unpaid | Readjusted Cash Balance |
|---|---|---|---|---|---|
| 01-02 | Restaurant | 48.00 | 48.00 | 48.00 | 48.00 |
| 01-03 | Gasoline | 21.00 | 21.00 | 21.00 | 69.00 |
| 01-05 | Shoe Store | 36.00 | 36.00 | 36.00 | 105.00 |
| 01-06 | Supermarket | 63.00 | 63.00 | 63.00 | 168.00 |
| 01-14 | Gasoline | 15.00 | 15.00 | 15.00 | 183.00 |
| 01-18 | Appliance Str | 750.00 | 750.00 | 750.00 | 933.00 |
| 01-24 | Gasoline | 18.00 | 18.00 | 18.00 | 951.00 |
| 01-30 | Restaurant | 33.00 | 33.00 | 33.00 | 984.00 |
| 02-01 | CUMULATIVE FROZEN CASH BALANCE IS AUTOMATICALLY DEBITED (ZEROED OUT) IN ORDER TO CREDIT INITIAL AVAILABLE CREDIT BALANCE- | | | | |
| | TOTAL | 984.00 | -0- | -0- | -0- |

There are two distinct types of this hybrid version:

The no inherent credit-default risk embodiment where all cash balances are frozen, and the end user is able to manually prepay transactions prior to the automatic payment at or after the end of the billing cycle; and, Embodiments that comprise capabilities to create considerable credit-default risk, whereby all of the credit-default risks of both the individual transactions paid in-turn embodiments and the plural transactions all paid together embodiments can all be realized through tampering with varied balances, turning off varied automatic functions, non-payment of shortfalls or earmarked reserves, readjustments after the automatic end-of billing cycle payment with subsequent default, etc.

With regard to the modified real debit card embodiment, and the varied faux debit card embodiments, a matter worth considering concerns cash advances, cash withdrawals (via an ATM, etc.), or any other ways the end user pulls cash from the faux debit card embodiments. These may be realized using any method(s) that the account issuer deems. Such may comprise: a direct debit to the available cash balance; a debit to the initial credit balance, whereby any available cash balance subsequently restores (credits) the debit to the initial credit balance, or where the debit to the initial credit balance is carried as an open item to be repaid later; a freeze to the available cash balance, where the frozen available cash balance is subsequently debited later to credit either the full amount of the cash withdrawal, or a partial amount of the cash withdrawal. Any full or partial portion of a cash withdrawal may also carried as an open item to be repaid later, in a fashion that is either similar to, or actually comprises, a cash advance.

on one or more credit balances, this disclosure places no specific guidance or limitations, whereby the issuer is wide open to use any metric(s) for establishing, setting, or revising credit limit(s) that the issuer pleases, regardless of whether the credit limit(s) mirror or otherwise resemble the amount of the available unfrozen and/or frozen cash balance(s); whether credit limit(s) track, somewhat exceed, greatly exceed, etc. any available cash balance amounts; or, where credit limit(s) are totally or somewhat related, or totally or somewhat unrelated, to any available cash balance amounts or available cash balance parameters.

The following is a summary of the various non-limiting debit card embodiments of the present invention:

Standard Debit Card (prior art), where transactions are automatically and individually paid in-turn;

Standard Debit Card, where transactions are automatically and individually paid in-turn, with additional readjustment capability to create credit-default risk;

Faux Debit Card, where transactions are automatically and individually paid in-turn, and where the embodiment comprises no inherent credit-default risk;

Faux Debit Card, where transactions are automatically and individually paid in-turn, and where the embodiments comprise capabilities to create credit-default risk;

Faux Debit Card, where plural transactions are automatically paid together at a given time interval, and where the embodiments comprise no inherent credit-default risk;

Faux Debit Card, where plural transactions are automatically paid together at a given time interval, and where the embodiments comprise capabilities to create credit-default risk.

Hybrid Faux Debit Card, where transactions are automatically and individually paid in-turn, are then automatically and individually readjusted (unpaid) in-turn, whereby the plural transactions are automatically paid together at a given time interval, and where the embodiments comprise no inherent credit-default risk; and, Hybrid Faux Debit Card, where transactions are automatically and individually paid in-turn, are then automatically and individually readjusted (unpaid) in-turn, whereby the plural transactions are automatically paid together at a given time interval, and where the embodiments comprise capabilities to create credit-default risk.

In the upcoming disclosure, any of these numerous Debit Card/Faux Debit Card embodiments will be able to be incorporated interchangeably in additional examples where a Debit Card/Faux Debit Card is used to make transaction payments in embodiments comprising at least one credit balance, where certain embodiments can also comprise at least one available credit balance in addition to the at least one available credit balance comprising the faux debit card.

With all of the Discussion Regarding Readjustments, an Overview is in Order. As Stated Earlier, Readjustments Comprise Transaction Specific Readjustments and Amount Specific Readjustments.

Transaction Specific Readjustments Comprise where at Least One Specific Transaction is Readjusted, and May Comprise the Following:

Debiting (unpaying) at least one specific already-paid transaction thereby debiting a first credit balance for said transaction, and then crediting at least one cash balance for the amount of said transaction, whereby any debit amount pertaining to said transaction is subsequently repaid.

Debiting (unpaying) at least one specific already-paid transaction thereby debiting a first credit balance for said transaction, and then crediting at least one second credit balance for the amount said transaction, whereby any debit amount pertaining to said transaction is subsequently repaid.

Debiting (unpaying) at least one specific already-paid transaction thereby debiting a first credit balance for said transaction, and then crediting at least one cash balance and at least one second credit balance for the amount of said transaction, whereby any debit amount pertaining to said transaction is subsequently repaid.

Crediting (paying) at least one specific transaction thereby crediting a first credit balance for said transaction, and then debiting at least one cash balance for the amount of said transaction.

Crediting (paying) at least one specific transaction thereby crediting a first credit balance for said transaction, and then debiting at least one second credit balance for the amount of said transaction, whereby any debit amount to said second credit balance pertaining to said transaction is subsequently repaid.

Crediting (paying) at least one specific transaction thereby crediting a first credit balance for said transaction, and then debiting at least one cash balance and at least one second credit balance for the amount of said transaction, whereby any debit to said second credit balance pertaining to said transaction is subsequently repaid.

Amount Specific Readjustments Comprise where at Least One Transaction Amount is Readjusted, and May Comprise the Following:

Debiting (unpaying) at least one already-paid transaction amount thereby debiting a first credit balance for said transaction amount, and then crediting at least one cash balance for said transaction amount, whereby any debit amount pertaining to said transaction amount is subsequently repaid.

Debiting (unpaying) at least one already-paid transaction amount thereby debiting a first credit balance for said transaction amount, and then crediting at least one second credit balance for said transaction amount, whereby any debit amount pertaining to said transaction amount is subsequently repaid.

Debiting (unpaying) at least one already-paid transaction amount thereby debiting a first credit balance for said transaction amount, and then crediting at least one cash balance and at least one second credit balance for said transaction amount, whereby any debit amount pertaining to said transaction amount is subsequently repaid.

Crediting (paying) at least one transaction amount thereby crediting a first credit balance for said transaction amount, and then debiting at least one cash balance for said transaction amount.

Crediting (paying) at least one transaction amount thereby crediting a first credit balance for said transaction amount, and then debiting at least one second credit balance for said transaction amount, whereby any debit amount to said second credit balance pertaining to said transaction amount is subsequently repaid.

Crediting (paying) at least one specific transaction amount thereby crediting a first credit balance for said transaction amount, and then debiting at least one cash balance and at least one second credit balance for the amount of the transaction, whereby any debit amount to said second credit balance pertaining to said transaction amount is subsequently repaid.

Standard Credit Card

Transactions Automatically and Individually Post In-Turn

A typical, standard credit card functions by debiting a credit balance for each authorized transaction amount, as seen in the following example:

| Date | Description | Transaction Amount | Credit Balance Debit |
| --- | --- | --- | --- |
| 01-02 | Restaurant | 48.00 | 48.00 |
| 01-03 | Gasoline | 21.00 | 21.00 |
| 01-05 | Shoe Store | 36.00 | 36.00 |
| 01-06 | Supermarket | 63.00 | 63.00 |
| 01-14 | Gasoline | 15.00 | 15.00 |
| 01-18 | Appliance Store | 750.00 | 750.00 |
| 01-24 | Gasoline | 18.00 | 18.00 |
| 01-30 | Restaurant | 33.00 | 33.00 |
| | TOTAL | 984.00 | 984.00 |

In terms of a typical credit card balance, the debiting results in the posting of the transaction, not the actual payment by the end user. In a standard credit card embodiment, all authorized transactions automatically post to a single initial credit balance, where the actual, generally manual payment by the end user (comprising writing a check, manually making an electronic payment entry, etc.), of a typical credit card balance due does not generally occur until after the close of a billing cycle.

Credit Embodiments

This section comprises embodiments known as crebit embodiments comprising aspects of credit and debit cards, and provides a more in-depth discussion of the earlier section where all authorized transactions automatically post to a single initial credit balance, per a standard credit card embodiment. The earlier-mentioned transaction processor parameters to determine account debiting, or transaction posting for a given transaction (as in which account does this transaction get routed to in order to be subsequently posted?), gets thrown totally out the window, because by using a singular initial credit balance, there is absolutely no determination to be made as to which account a given transaction is posted to. This is due to the fact that the only balance that can be used for posting a given transaction is a singular initial credit balance. This is tantamount to being able to have the Ford Model T in any color you want, as long as it's black.

However, once a given transaction is actually posted, transaction processor parameters can be used to automatically determine which transactions comprising the single initial credit balance are automatically paid sooner, say, prior to or upon the close of the billing cycle, as was seen in the prior debit card embodiment section, and which ones are carried forward and manually paid later after the close of the billing cycle, in typical credit-card like fashion.

Using the transaction processor, certain already-posted credit balance items will be selectively and automatically paid either before, and/or at or after the close of a given billing cycle, while other already-posted waiting to be manually-paid items will be selectively or exclusively left alone to be manually paid later after the close of the billing cycle. It is important to note that, like a standard credit card available balance, the initial available credit balance is intended to function as a living, breathing, final posting balance for transactions. However, in certain system embodiments, it could be desirable to segregate, for the purpose of maintaining clarity and organization, the transaction postings comprising the automatically paid or automatically will-be paid credit items that comprise the initial available credit balance, from the transaction postings comprising the remaining waiting to be manually-paid credit items that also comprise the initial available credit balance, or vice-versa; therefore, it could be possible in certain cases for some balance shuffling away from the initial available credit balance to occur.

Earlier was an example of using a single initial credit balance for posting all of the transactions, whereby the posted transaction amounts debited the initial credit balance, where transaction amounts up to $25 were automatically paid by debiting a cash balance within two seconds, two minutes, two hours, two days, etc. of the posting. This transaction amount threshold parameter in the context of a single initial credit balance is actually and more accurately a payment parameter, for determining which credit balance items are paid automatically by at least one available cash balance, and which credit items are left as open items to be paid manually after the close of the billing cycle. Another example is as follows, but this time, transaction amounts up to $50 are paid, with the remaining unpaid items left as open items.

Per the above, all transactions were automatically paid by the cash balance except the 01-06 and 01-18 transactions, of which will be carried as open items to be paid after the close of the billing cycle. As with the faux debit card embodiments disclosed earlier, in the above crebit embodiment, the at least one available cash balance basically serves, or is subservient to the initial credit balance, to the point that its automatic cash balance debiting activity can be looked at as a subset of the overall activity comprising the initial credit balance. Also, it is important to recognize that the at least one available cash balance as an actual automatic payment source, or an automatic funding source for a subset of the overall activity comprising the initial credit balance.

Furthermore, it is disclosed that a single available cash balance comprising at least one available cash balance can debit at least one funding source. Also, it is disclosed that at least one cash balance payment source comprising the at least one available cash balance could debit any number of corresponding funding sources. As a result, under the direction of the transaction processor, a given cash balance funding source can automatically credit (pay) transactions up to $25 on the initial credit balance; transactions from $25 to $100 can be left as open items on the initial credit balance to be manually paid by the end user after the close of the billing cycle; a second cash balance comprising a second funding source can automatically credit (pay) transactions over $100 up to $500 on the initial credit balance; a third cash balance comprising a third funding source can automatically credit (pay) transactions over $500 up to $1000 on the initial credit balance; and finally, transactions above $1000 can be left as open items on the initial credit balance to be manually paid after the close of the billing cycle.

Also, thanks to the readjustment mechanism, any or all of the amounts that are automatically paid can be manually, or even automatically, unpaid. To top it all off, re-credited source funds (cash) resulting from the varied readjustments don't even have to return to the source(s) that provided them, but can be returned to any available cash balance(s)/funding source(s) the end user chooses. Finally, any waiting to be manually-paid transactions, which are ordinarily paid after the billing cycle closes, can be manually prepaid prior to the close of the billing cycle by using a readjustment comprising a transaction specific or amount specific readjustment.

There are numerous parameters that may be used in order to determine which transactions comprising the initial available credit balance are selectively and automatically paid and/or selectively and automatically excluded from being paid (and carried forward as open items to be manually paid by the end user after the close of the billing cycle).

| Date | Description | Transaction Amount | Initial Credit Bal Debit | Amt Debited From Cash Bal | Net Effect Initial Credit |
|---|---|---|---|---|---|
| 01-02 | Restaurant | 48.00 | 48.00 | 48.00 | -0- |
| 01-03 | Gasoline | 21.00 | 21.00 | 21.00 | -0- |
| 01-05 | Shoe Store | 36.00 | 36.00 | 36.00 | -0- |
| 01-06 | Supermarket | 63.00 | 63.00 | -0- | 63.00 |
| 01-14 | Gasoline | 15.00 | 15.00 | 15.00 | -0- |
| 01-18 | Appliance Store | 750.00 | 750.00 | -0- | 750.00 |
| 01-24 | Gasoline | 18.00 | 18.00 | 18.00 | -0- |
| 01-30 | Restaurant | 33.00 | 33.00 | 33.00 | -0- |
| | TOTAL | 984.00 | 984.00 | 171.00 | 813.00 |

Payment may be made from available cash balance(s) using parameters such as:

Amount threshold—
- Automatically pay the initial available credit balance using available cash balance #1 for all transactions up to $25.
- Automatically pay the initial available credit balance using available cash balance #2 for all transactions above $25 up to $50.
- Automatically leave as open items on the initial available credit balance (leave unpaid) all transactions above $50, which will be manually paid after the billing cycle closes.
- Automatically pay the initial available credit balance using non-initial available credit balance #1 for all transactions above $100, which will be manually paid after the billing cycle closes.

Remainder threshold—
- Automatically pay the initial available credit balance using available cash balance #1 for up to the first $20 of a given transaction; leave any remainder amounts above $20 for a given transaction as an open item on the initial available credit balance (leave unpaid) which is to be paid after the billing cycle closes.

Ratio—
- Automatically pay the initial available credit balance using available cash balance #1 for 50% (one-half) of a given transaction; leave the remaining 50% amount for a given transaction as an open item on the initial available credit balance (leave unpaid) which is to be paid after the billing cycle closes.

Special identifier information (merchant, location of transaction origination)—
- Automatically pay the initial available credit balance using available cash balance #1 for all transactions from Excellent Grocers up to $200; however, if a given Excellent Grocers exceeds $200, then automatically pay the initial available credit balance using non-initial available credit balance #1 for all transactions above $100, which will be manually paid after the billing cycle closes.
- Automatically pay the initial available credit balance using available cash balance #1 for all transactions up to $25; however, automatically leave as open items on the initial available credit balance (leave unpaid) all transactions originating from outside of a 20 mile radius from my home address/city/zip code/etc., which are to be paid after the billing cycle closes.
- Automatically pay the initial available credit balance using available cash balance #1 for all transactions up to $50; however, automatically leave as open items on the initial available credit balance (leave unpaid) all transactions originating from outside of the state where I live and outside a 30 mile radius from my home address, which are to be paid after the billing cycle closes; however, automatically pay the initial available credit balance using available cash balance #1 if the transaction is from Too Much Coffee Shops, regardless of location.

Account balance criteria—
- Automatically pay the initial available credit balance using available cash balance #1 for all transactions up to $25 only if the automatic payment permits the minimum available account balance of available cash balance #1 to remain above $100; otherwise leave the transaction as an open item on the initial available credit balance (leave unpaid) to be paid after the billing cycle closes.
- Automatically pay the initial available credit balance using available cash balance #1 for all transactions up to $50 only if the automatic payment permits the maximum consumption of available cash balance #1 to remain below $500 for the billing cycle; otherwise automatically pay the initial available credit balance using available cash balance #2 for all transactions up to $50 only if the automatic payment permits the maximum consumption of available cash balance #2 to remain below $250 for the billing cycle; otherwise, leave the transaction as an open item on the initial available credit balance (leave unpaid) to be paid after the billing cycle closes.
- Automatically pay the initial available credit balance using available cash balance #1 for all transactions once the maximum consumption of the initial available credit balance reaches $2000.

The above parameters are all used in terms of an initial available credit balance to automatically and selectively pay, the transactions posted to the initial available credit balance. What is highly ironic is that the above parameters can also be used in terms of an initial available cash balance to automatically and selectively unpay, or readjust the paid items posted to the initial available cash balance!

In the next example, these payment parameters will be put to work:

| Date | Description | Transaction Amount | Initial Credit Bal Debit | Amt Debited From Cash Bal | Net Effect Initial Credit |
|---|---|---|---|---|---|
| 01-02 | Restaurant | 48.00 | 48.00 | 48.00 | -0- |
| 01-03 | Gasoline | 21.00 | 21.00 | 10.00 | 11.00 |
| 01-05 | Shoe Store | 36.00 | 36.00 | 18.00 | 18.00 |
| 01-06 | Supermarket | 63.00 | 63.00 | 63.00 | -0- |
| 01-14 | Gasoline | 15.00 | 15.00 | -0- | 15.00 |
| 01-18 | Appliance Store | 750.00 | 750.00 | -0- | 750.00 |
| 01-24 | Gasoline | 18.00 | 18.00 | -0- | 18.00 |
| 01-30 | Restaurant | 33.00 | 33.00 | -0- | 33.00 |
| | TOTAL | 984.00 | 984.00 | 139.00 | 845.00 |

Prior to the 01-02 transaction the end user sets up an amount threshold parameter because the end user wants the available cash balance to automatically pay any initial credit balance transactions up to $50. As a result, the 01-02 Restaurant transaction for $48 is paid in full with a debit to (payment from) the available cash balance. Prior to the 01-03 Gasoline purchase, the end user resets the parameters for a remainder threshold, where the first $10 of a given transaction is automatically paid, with the remainder of $11 being carried as an open initial credit balance item. Prior to the Shoe Store bill on 01-05, the end user discontinues the remainder threshold parameter and sets up a ratio parameter (1:1, 50/50, etc.), so the available cash balance automatically pays half of the Shoe Store transaction ($18), leaving the other half of the $36 transaction as an open initial credit balance item. The end user has a special identifier information parameter on the Supermarket merchant where all initial credit balance transactions for that particular merchant up to $100, including the 01-06 $63 transaction, are automatically paid by the available cash balance. Using an account balance criteria parameter, the selected minimum balance parameter assures that the available cash balance will not automatically pay any initial credit balance transactions if the available cash balance drops below a certain level (say, $500). Therefore, as a result of the available cash balance falling below the specified level, all transactions from 01-14 through the end of the billing cycle remained as open unpaid initial credit balance transactions that will be either manually paid sometime after the close of the billing cycle, or defaulted.

At least one open item comprising the initial single available credit balance that are to be manually paid by the end user after the close of the billing cycle may be prepaid by using a readjustment comprising a transaction specific readjustment or an amount specific readjustment, where cash is moved from at least one available cash balance to pay for at least one transaction.

In the earlier "faux" debit card section, numerous embodiments were presented, with some embodiments prohibiting the creation of credit-default risk, and other embodiments fully enabling the creation of credit-default risk in numerous ways. In this "crebit" section, a simple available cash balance was used as a payment source to pay the initial credit balance, although it was disclosed, among other things, that "at least one" available cash balance can be used.

The next section will show that, in place of a simple available cash balance, more complex debit card embodiments can be used in its place, where, again, the debit card embodiments basically serve, or is subservient to the initial credit balance, to the point that the debit cards' automatic cash balance debiting activity can be considered as a "subset" of the overall activity comprising the initial credit balance.

Available payment sources for automatic payments may be may be relatively simple, such as a single available cash balance like a checking account balance, or much more complex, such as where a given payment source comprises a plurality of payment sources that are in series with each other acting in an overdraft capacity, and/or are parallel with each other with more than one payment source being used simultaneously to automatically pay a transaction.

Also, a very important reason to think in terms of an "available payment source" instead of automatically thinking in terms of an "available cash balance" is that an available source may even comprise an available credit balance, comprising a non-initial (sub) available balance where at least one non-initial (sub) available credit balance is used to pay the initial available credit balance whereby the non-initial at least one available credit balance is debited, thereby paying/crediting the initial available credit balance.

At least one non-initial (sub) available credit balance may comprise a payment source to pay/credit the initial available credit balance for at least one given transaction, whereby paying/crediting the initial available credit balance results in at least one transaction amount debit to the at least one non-initial available credit balance that has to be paid back. A given non-initial available credit balance that has to be paid back may comprise:

A non-initial (sub) available credit balance comprising transactions that are subsequently and automatically paid by at least one available payment source, where the payment source comprises at least one available cash balance and/or at least one available credit balance, and where the non-initial credit balance may optionally comprise a credit balance of a debit card/faux debit card embodiment; or, A non-initial (sub) available credit balance comprising transactions that are carried forward as open items, where the end user manually pays the non-initial credit balance after the close of a billing cycle.

Furthermore, a non-initial available credit balance can be used in the same ways that an available cash balance can with regards to automated payments, manually prepayments, and even readjustments, where the "un-paying" of the paid non-initial available credit balance can be performed, and where the readjustment or un-paying of even the un-paid non-initial available credit balance results in the transaction or transaction amount being readjusted back to the initial available credit balance, or readjusted to at least one different available credit balance.

Moving at least one given transaction off of the initial credit balance, and onto a non-initial (sub) credit balance can be achieved by:

Moving or shifting the transaction from the initial available credit balance onto at least one non-initial (sub) available credit balance; or, Crediting or "paying" the transaction comprising the initial credit balance, with at least one non-initial (sub) credit balance, either (most likely) automatically or (possibly) manually.

Once the transaction is on the at least one available (sub) credit balance, it may then be paid automatically, or carried as an open item to be paid "manually" by the end user after the close of a billing cycle by writing a check, "manually" making an electronic payment entry, etc.

A very important distinction needs to be made. The above operations are not to be considered "credit balance transfers" as known in the standard context. In the standard context, a credit balance transfer generally takes place between two separate credit card issuers, where card issuer #1 transfers the credit balance items to card issuer #2, whereby card issuer #2 pays back settlement funds comprising cash equivalents to card issuer #1 to settle the debt between the cardholder and card issuer #1. Contrary to a standard credit balance transfer, the above operations do not comprise the transfer of settlement funds comprising cash equivalents to "settle the debt", due to the fact that crediting the initial credit balance with an offsetting debit to a non-initial credit balance accomplishes the "payment" without requiring the use of outside funds.

Also, available payment sources for automatic payments that are shared or unshared among a plurality of debit card/ "faux debit card" embodiments comprising a "crebit" embodiment present a myriad of payment possibilities. For example, a plurality of debit card/"faux debit card" embodiments may share a single payment source, some of the plurality may share at least one single payment source while others comprising the plurality may each have separate payment sources, or each embodiment comprising the plurality may have at least one payment source of its own, whereas a single debit card embodiment may employ numerous payment sources due to a plurality of transaction payment parameters such as varied amount threshold payment parameters.

An example of a "crebit" credit balance-based embodiment using multiple payment sources is as follows, where payment source #1 comprises a "paid "in-turn"" "faux debit card" embodiment ("cash balance #1 debit") to automatically pay the initial credit balance for transactions up to $25; payment source #2 comprises a "transactions paid together" "faux debit card" embodiment ("cash balance #2 frozen") to automatically pay the initial credit balance for transactions from $25 to $50 at or after the close of the billing cycle; payment source #3 comprising an available non-initial credit balance, which will ("sub credit #1 debit") to automatically pay the initial credit balance for transactions above $50 to $100; and payment source #4 also comprising an available non-initial credit balance ("sub credit #2 debit") to automatically pay the initial credit balance for transactions above $100, where the non-initial credit balance items comprising the non-initial (sub) balances #1 and #2 will be carried as open items that will be paid manually after the close of the billing cycle.

tion specific readjustments (also potential credit-default risk creators), where the paid transactions are unpaid, may have the readjusted/unpaid transactions post back to their original available credit balance(s) (whichever one or more balances that was), and/or any other available credit balance(s), with the funds resulting from the "unpayment" crediting any desired at least one balance, regardless of whether the funds credit at least one available cash balance, and/or are used to pay at least one available credit balance. This last aspect is particularly interesting. Normally, when performing a readjustment (unpayment) on a given transaction, the proceeds from the unpayment credit an available cash balance. Here, instead of paying an available cash balance, another available credit balance is directly paid instead. Such an example would be to perform a readjustment by debiting the paid purchase transaction amount from available credit balance #1 to directly pay for a transaction debiting available credit balance #2, whereby the two available credit balances are from

| Date | Description | Ini Credit Bal Debit | Cash Bal #1 Dbit | Cash Bal #2 Frozen | Sub Crdt #1 Dbit | Sub Crdt #2 Dbit | Net Effect Ini Credit |
|---|---|---|---|---|---|---|---|
| 01-02 | Restaurant | 48.00 | -0- | 48.00 | -0- | -0- | -0- |
| 01-03 | Gasoline | 21.00 | 21.00 | -0- | -0- | -0- | -0- |
| 01-05 | Shoe Store | 36.00 | -0- | 84.00 | -0- | -0- | -0- |
| 01-06 | Supermarket | 63.00 | -0- | -0- | 63.00 | -0- | -0- |
| 01-14 | Gasoline | 15.00 | 15.00 | -0- | -0- | -0- | -0- |
| 01-18 | Appliance Str | 750.00 | -0- | -0- | -0- | 750.00 | -0- |
| 01-24 | Gasoline | 18.00 | 18.00 | -0- | -0- | -0- | -0- |
| 01-30 | Restaurant | 33.00 | -0- | 117.00 | -0- | -0- | -0- |
| | "TRANSACTIONS PAID TOGETHER" "FAUX DEBIT CARD" EMBODIMENT (CASH BALANCE #2) PAID FOR $117 | | | | | | |
| | TOTAL | 984.00 | 54.00/Paid | 117.00/Paid | 63.00 | 750.00 | -0- |

It is worth noting that in this "crebit" embodiment example, the four payment sources (cash balance #1, cash balance #2 frozen, sub credit balance #1 and sub credit balance #2) were set up in such a way that none of the transactions remained on the initial credit balance (initial credit balance remains zero), yet balance items on sub credit balance #1 and sub credit balance #2 will be carried as open items to be manually paid by the end user. It needs to be mentioned, and it can't be stressed enough, that the zeroing out of the initial available credit balance is not mandatory, nor is it even recommended; rather, it is merely illustrated. As was seen earlier, it is still possible to carry transactions on the initial available credit balance as open items to be manually after the close of the billing cycle (or even manually prepaid before), which could act as an enhancement to, or a substitution for at least one of the non-initial (sub) available credit balances. The four payment sources will now be discussed.

As mentioned earlier, cash balance #1 was a "paid "in-turn"" "faux debit card" embodiment that was paying an available credit balance for all of its allotted transactions. The available credit balance comprising the "faux debit card" that was paid could be the initial available credit balance, or could be at least one non-initial (sub) available credit balance provided by the methods disclosed earlier. Furthermore, the above "paid "in-turn"" embodiment could additionally comprise capabilities to enable the creation of credit-default risk, such as where at least one cash balance could be depleted without enabling rejection of the transaction, or where the automatic payment function is turned off, leaving open items to be paid on the relevant available credit balances as a result. Also, readjustments comprising amount specific or transactwo totally different payment sources, all without using an available cash balance as an intermediary.

Cash balance #2 (frozen) was a "transactions paid together" "faux debit card" embodiment where the cash balance for its allotted transactions were cumulatively frozen, then paid on 02-01 after the close of the billing cycle. The end user may prepay any such transactions, if desired, using a manual readjustment/prepayment prior to the close of the billing cycle, which would not in itself create credit-default risk. The available credit balance comprising the "faux debit card" that was paid could be the initial available credit balance, or could be at least one non-initial (sub) available credit balance provided by the methods disclosed earlier. The embodiment could additionally comprise capabilities to enable the creation of credit-default risk, such as allowing frozen funds to be withdrawn, turning off the automatic payment function, readjusting (unpaying) any prepaid transactions and defaulting, readjusting the automated payment after it has been made and defaulting, etc.

Sub credit balance #1 and sub credit balance #2 are each non-initial credit balances, and although they comprise separate payment sources (they will each be "manually" and separately paid by the end user after the close of the billing cycle), they can be discussed together. As disclosed earlier, transactions could have been posted onto the two non-initial (sub) credit balances either by moving the transaction from the initial available credit balance onto at least one non-initial (sub) available credit balance and/or by crediting or "paying" the initial credit balance transaction, either (most likely) automatically or (possibly) manually, with a debit to least one non-initial (sub) credit balance. As discussed earlier, any of the items comprising the non-initial available credit balance can be manually prepaid. Having the end user needing to "manually" and separately pay for each of the non-initial available credit balance transactions makes little sense unless one realizes that the end user could be using a different "manual" payment funds source and/or even a different "manual" payment method (check vs. electronic payment for example), to pay each of the resulting bills. Nonetheless, the possibility does exist for the two manual payments to be merged prior to being paid.

Some final notes regarding the "crebit" example are in order. Due to certain credit-default risk possibilities, at least four open credit balances could require manual payment after the close of the billing cycle ("at least four" assumes that the four payment sources use only one available credit balance each; meanwhile, more are possible, albeit unwieldy), although it is entirely possible for an embodiment comprising the same combination of payment sources to use the initial available credit balance for all of the debit card/"faux debit" card embodiment crediting, where the initial available credit balance is also used to carry open items thus substituting for one of the non-initial available credit balances, leaving only the other non-initial available credit balances for open items that need to be manually paid after the close of the billing cycle! Although the "paid "in-turn"" "faux debit card", and the "transactions paid together" "faux debit card" were used in the above "crebit" embodiment, where either or both embodiments can use the disclosed modifications to create credit-default risk, keep in mind that a "standard" debit card embodiment, and even the "hybrid faux debit card" where transactions are automatically "paid in turn" then automatically readjusted (unpaid), then transactions are automatically "paid together" at or after the close of the billing cycle, may also be incorporated.

The following "crebit" embodiment demonstrates a series payment. A series payment comprises where at least one transaction, or at least one transaction amount, that is posted to an initial available credit balance is automatically or manually credited (paid) by at least one non-initial available credit balance, whereby the at least one non-initial available credit balance is subsequently automatically or manually credited (paid) by at least one other payment source, whereby the payment source comprises at least one available cash balance, and/or a yet additional at least one non-initial available credit balance, where the yet additional at least one non-initial available credit balance is subsequently automatically or manually credited (paid) by at least one other payment source, and so on. In this example, the non-initial (sub) available credit balance automatically credits ("pays") the initial credit balance for all transactions under $100, resulting in debits to the non-initial (sub) available credit balance, whereby transactions over $100 remain on the initial available credit balance to be manually paid later. The debits to the non-initial (sub) available credit balance are then subsequently automatically paid by two "faux debit card" embodiments. This automatic payment is different than the prior "crebit" example, where debits to the non-initial (sub) available credit balance were manually paid by the end user after the close of the billing cycle (or manually prepaid prior to the close of the billing cycle), and not automatically paid as per the present example. The first "faux debit card" (comprising cash balance #1) is a "paid "in-turn"" embodiment that automatically pays the debits to the non-initial (sub) available credit balance for transactions up to $25. The second "faux debit card" (comprising cash balance #2) is a "transactions paid together" embodiment that cumulatively freezes and then automatically pays the debits to the non-initial (sub) available credit balance for transactions from $25 up to $100 after the close of the billing cycle.

| Date | Description | Ini Credit Bal Debit | Sub Crdt Bal Dbit | Cash Bal #1 Dbit | Cash Bal #2 Frozen | Net Effect Ini Credit |
|---|---|---|---|---|---|---|
| 01-02 | Restaurant | 48.00 | 48.00 | -0- | 48.00 | -0- |
| 01-03 | Gasoline | 21.00 | 21.00 | 21.00 | -0- | -0- |
| 01-05 | Shoe Store | 36.00 | 36.00 | -0- | 84.00 | -0- |
| 01-06 | Supermarket | 63.00 | 63.00 | -0- | 147.00 | -0- |
| 01-14 | Gasoline | 15.00 | 15.00 | 15.00 | -0- | -0- |
| 01-18 | Appliance Str | 750.00 | -0- | -0- | -0- | 750.00 |
| 01-24 | Gasoline | 18.00 | 18.00 | 18.00 | -0- | -0- |
| 01-30 | Restaurant | 33.00 | 33.00 | -0- | 180.00 | -0- |
| 02-01 | "TRANSACTIONS PAID TOGETHER" "FAUX DEBIT CARD" AUTOMATICALLY PAID NON-INITIAL CREDIT BAL FOR $180" | | | | | |
| | TOTAL | 984.00 | 234.00/Paid | 54.00 | 180.00 | 750.00 |

In this example, both "faux debit card" embodiments paid the non-initial (sub) available credit balance in full, but by different methods per their respective embodiments. The 01-18 charge for $750 that remained on the initial credit balance was carried forward as an open item to be manually paid by the end user after the close of the billing cycle. The non-initial (sub) available credit balance is the really distinctive aspect of this example, where the non-initial (sub) available credit balance is used to automatically pay the initial available credit balance, and then is subsequently automatically paid by the two "faux debit card" embodiments. What is important to understand is that in "faux debit card" embodiments that enable the creation of credit-default risk, paid items comprising the non-initial (sub) available credit balance can be unpaid by performing a readjustment where the newly unpaid transaction re-debits either the non-initial (sub) available credit balance, and/or the original initial credit balance, and/or at least one other available credit balance entirely. Likewise, in "faux debit card" embodiments comprising items to be automatically paid later, due to the varied mechanisms that can thwart the automatic subsequent payment, the resultant never-paid items can remain on the non-initial (sub) available credit balance, or can be readjusted to the original initial credit balance, and/or readjusted to at least one other available credit balance. Furthermore, if all of the items are readjusted back to, or remain unpaid on, the non-initial (sub) available credit balance, the open items comprising the non-initial (sub) available credit balance can be manually paid by the end user, or, readjusted yet again back to the original initial credit balance, and/or readjusted to at least one other available credit balance. Also, it should be understood that theoretically, through the use of an endless series of non-initial available credit balances as payment sources, the series payment process could go on in perpetuity.

Furthermore, it must be reinforced that in "crebit" embodiments, payment parameters are crucial. In the above example, if the second "faux debit card" "transactions paid together" embodiment (comprising cash balance #2) was reset so the amount threshold parameter debited the available cash balance for all transactions above $25 (without the $100 top limit), then the "crebit" embodiment would be basically reconfigured as a "dual-embodiment" "faux debit card"!

To reiterate an earlier theme, assuming that all readjusted/unpaid "faux debit card" activity remains on the non-initial (sub) available cash balance (to be manually paid by the end user after the close of the billing cycle), this manually paid activity can comprise a credit-reporting item. The credit-reporting item can be additional to the credit-reporting item comprising the original initial credit balance, resulting where the above "crebit" embodiment, as specified, can comprise two separate credit-reporting items.

In the more sophisticated "crebit" embodiments, it is possible to have a single credit-reporting item by "boiling down" the diverse activity of the "crebit" embodiment to a singular initial available credit balance, or a singular non-initial available credit balance whereby the original initial credit balance is zeroed-out. Also, it is possible where the diverse activity can result in embodiments comprising a few, or many distinct credit-reporting items. Although it is prudent to allow the decision as far as "crebit" configuration and number of eligible credit-reporting items to rest with the account issuer/provider, it is herein disclosed that the end user may have no, some, most, or total control, choice, or influence with regards to "crebit" configuration, and the selecting of the total number of eligible reporting items comprising a given "crebit" configuration.

While "crebit" embodiments comprising initial credit balances were discussed extensively, "crebit" embodiments comprising initial cash balances will now be discussed.

A "crebit" embodiment comprising an initial cash balance resembles a standard debit card, where all transactions are paid, with one very special distinction. Using transaction payment parameters disclosed earlier, the end user could selectively and automatically readjust, or selectively and automatically unpay, theoretically any or all of the paid transactions, whereby the transaction payment parameters become "transaction un-payment parameters".

Furthermore, the unpaid transactions are to be subsequently repaid, either manually by the end user, or even automatically. In terms of an automatic re-payment function, the transaction payment parameters become "transaction re-payment parameters".

In the following "crebit" initial available cash balance embodiment, all transactions debit the initial cash balance; however, all transactions above $25 are automatically readjusted, (unpaid) leaving transactions below $25 to remain paid on the initial cash balance. Of the readjusted transactions, transactions above $100 are left unpaid as a debit to available credit balance #1 to be (manually) repaid later; however, a non-initial available cash balance automatically repays transactions up to $100.

| Date | Description | Ini Cash Bal Debit | Readjstd Unpaid | Readjstd Repaid | Crdt Bal #1 Dbit | Net Effect Ini Cash |
|---|---|---|---|---|---|---|
| 01-02 | Restaurant | 48.00 | 48.00 | 48.00 | -0- | -0- |
| 01-03 | Gasoline | 21.00 | -0- | -0- | -0- | 21.00 |
| 01-05 | Shoe Store | 36.00 | 36.00 | 36.00 | -0- | -0- |
| 01-06 | Supermarket | 63.00 | 63.00 | 63.00 | -0- | -0- |
| 01-14 | Gasoline | 15.00 | -0- | -0- | -0- | 15.00 |
| 01-18 | Appliance Str | 750.00 | 750.00 | -0- | 750.00 | -0- |
| 01-24 | Gasoline | 18.00 | -0- | -0- | -0- | 18.00 |
| 01-30 | Restaurant | 33.00 | 33.00 | 33.00 | -0- | -0- |
| | TOTAL | 984.00 | 930.00 | 180.00 | 750.00 | 54.00 |

As seen in the example, transactions that are readjusted (unpaid) can be repaid using at least one payment source other than the original initial available cash balance, or can be left as open items on an available credit balance to be repaid later. Using other (un)-payment parameters, such as a ratio parameter, a portion of a given transaction can be unpaid, and left unpaid, or be repaid by another payment source, while the other portion remains paid on the initial available cash balance. By using a remainder threshold parameter, the first, say, $20 can remain paid on the initial available cash balance, while the remaining amount of the transaction over $20 can be unpaid and left unpaid, or be repaid by another payment source. Using a special identifier information parameter, transactions from outside the end user's region can be automatically readjusted to debit an available credit balance, which can be helpful for thwarting fraudulent transactions. Also, re-payment may resemble the methods comprising a "paid in turn" "faux debit card" method, or a "transactions paid together" "faux debit card" method, and may additionally comprise the disclosed mechanisms to create credit-default risk.

As is analogous to the earlier series payment comprising initial and non-initial available credit balances, by using initial and non-initial available cash balances instead, series unpayment can be realized. Series unpayment comprises where at least one transaction, or at least one transaction amount, that is posted to an initial available cash balance is automatically or manually debited (unpaid) by at least one non-initial available cash balance, whereby the at least one non-initial available cash balance is subsequently automatically or manually debited (unpaid) by at least one other source, whereby the source comprises at least one available credit balance, and/or a yet additional at least one non-initial available cash balance, where the yet additional at least one non-initial available cash balance is subsequently automatically or manually debited (unpaid) by at least one other source, and so on. Also, it should be understood that theoretically, through the use of an endless series of non-initial available cash balances as sources, the un-payment process could as well go on in perpetuity.

Ironically, an end user can set the (un)-payment parameters to automatically readjust all of the initial cash balance transactions, so every one of the transactions debit an available credit balance, thereby creating a "faux credit card". Furthermore, the end user can create a total credit-default nightmare by automatically or manually readjusting all of the initial cash balance transactions so they debit an available credit balance, withdrawing all funds from any possible payment sources, including the funds comprising the "unpayment", and totally default on paying back the amount due on the credit balance.

Crebit Fixed Payment Function Series Embodiments

Another way to look at various crebit embodiments is in terms of fixed payment functions that are in series with one another.

First is where an automatic payment function is followed in series by a manual payment function. This fixed embodiment comprises where an incoming transaction first hits an automatic payment function, and using payment parameters, such as an Amount Threshold payment parameter, and/or payment balance parameters to determine if the transaction is able to be automatically paid, or able to be automatically paid later, say, at or after the close of a billing cycle, then the transaction will be paid automatically, without ever seeing the manual function (except perhaps if the automatically paid transaction is subsequently unpaid by using a readjustment, where subsequent repayment of the transaction comprises use of the manual function; or, if the automatically paid later transaction is subsequently never to be automatically paid later by having corresponding frozen funds withdrawn, where subsequent initial payment of the transaction comprises use of the manual function). However, if the transaction cannot be paid automatically, then the manual function takes over. The manual function basically comprises where the transaction is left as an open item, or carried forward as an open item, that enables subsequent manual payment by the end user after the close of the billing cycle; however, the manual function can also optionally comprise the capability to allow the end user to manually prepay a transaction prior to the close of a billing cycle by performing a transaction specific and/or amount specific readjustment/prepayment. In this series embodiment, the automatic function always sees all of the transactions first, whereby the manual function subsequently sees only a portion of, or possibly even none, of the transactions.

Second is where a manual payment function is followed in series by an automatic payment function. This fixed embodiment comprises where an incoming transaction first hits a manual payment function, and uses payment parameters, such as an Amount Threshold payment parameter, and/or payment balance parameters to determine if the transaction is able to be automatically paid, or able to be automatically paid later, say, at or after the close of a billing cycle. If the transaction cannot be paid automatically, then the manual function keeps the transaction, without the automatic function ever seeing the transaction; however, if the transaction can be paid, then the transaction will continue on to the automatic payment function to be paid automatically. This embodiment comprises the manual function and automatic function capabilities of the prior fixed series embodiment. Nonetheless, there is a distinction where if the automatically paid transaction is subsequently unpaid by using a readjustment, subsequent repayment of the transaction comprises a return to the manual function; likewise, if the automatically paid later transaction is subsequently never to be automatically paid later by having corresponding frozen funds withdrawn, the subsequent initial payment of the transaction also comprises a return to the manual function. Contrary to the first series embodiment, in this series embodiment, the manual function always sees all of the transactions first, whereby the automatic function subsequently sees only a portion of, or possibly even none, of the transactions.

It is important to acknowledge even in crebit fixed payment function series embodiments that the automatic payment function may comprise any number of payment sources and/or any number of debit card/faux debit card embodiments, whereby any of the debit card/faux debit card embodiments may or may not comprise credit-default risk creation capabilities.

An absolutely crucial distinction needs to be made at this time. The intended purpose of the above fixed payment function series embodiment is not to use the second function to solve a critical overdraft problem of the first function. Rather, the transaction processor's payment parameters enables the user to automatically, selectively, and almost luxuriously determine whether the end user even wants a given transaction to be automatically paid, or whether the end user wants the transaction to remain as an open item to be paid later, which is very different than using a series embodiment to urgently conduct an emergency overdraft rescue mission.

Series and/or Parallel Transaction Movement

In the present disclosure, transaction movement may comprise two distinct methods:

Where the transaction movement comprises the simple movement or shifting of a given transaction/transaction amount between two like-kind balances (from a credit balance to another credit balance, or from a cash balance to another cash balance); or, Where the transaction movement comprises the actual crediting and/or debiting of a given transaction/transaction amount, which facilitates the movement of the transaction/transaction amount between either like-kind balances (from a credit balance to another credit balance), or non like-kind balances (from a credit balance to a cash balance, or vice versa).

A given embodiment may comprise either or both methods. Keeping this in mind, any of the disclosed embodiments, from the simple to the complex, may additionally comprise complex transaction movement routines that employ any number, or kind of extra balances (regardless of whether the balances are cash balances or credit balances, or in-house or out-of-house balances), in any order, whereby nearly infinite variations are possible. Furthermore, a given transaction/transaction amount can be moved in series from one balance to another, and/or parallel through more than one balance simultaneously. These complex routines can easily take place without the end-user ever knowing or suspecting. For example, in a crebit or faux debit card embodiment, a given incoming transaction/transaction amount can be moved in series and/or parallel through any number, kind and order of balances before residing on the disclosed "initial available credit balance" comprising the crebit or faux debit card embodiment. Also, in a given embodiment, a debit of any cash balances, regardless of whether they are frozen or not, can be moved in series and/or parallel through any number, type and order of balances, regardless of whether any of the balances are deemed "frozen" or not, before the debit ultimately credits another balance, such as an initial available credit balance. The same applies to out-of-house credit or cash balances comprising a given embodiment, where a given transaction/transaction amount moves through a complex routine of balances.

As an overview for a given embodiment, a given incoming transaction/transaction amount debit or credit can move in series and/or parallel through any number, kind and order of balances before ultimately residing on the desired balance, as can an offsetting credit or debit. Readjustments can work the same way, whereby a given readjustment can have its crediting and debiting functions move in series and/or parallel through any number, kind and order of balances prior to consummation, as can any repayment pertinent to a given readjustment. As a result, a complex transaction movement routine can comprise a few, a dozen, a hundred, etc., cash and/or credit balances, in any order, before a transaction/transaction amount debit or credit ultimately resides on the desired initial or ultimate balance. Similarly, a complex transaction movement routine can comprise a few, a dozen, a hundred, etc., cash and/or credit balances, in any order, in order to perform an offsetting balance credit or debit, readjustment, repayment, etc.

The present invention is described by way of the summary, description and examples presented herein, but is not limited to the specific description, but includes all alternative potential variations of the invention that can be made available to end-users as would be apparent to those skilled in the art.

What is claimed is:

1. A method for electronically splitting by a computer an original billing cycle into at least two billing cycles in an account by electronically changing by a computer the debiting timeframe of said original billing cycle and electronically switching on by a computer at least one additional billing cycle, said method comprising:
   a. electronically providing by a computer said account, wherein said account comprises at least one credit balance and said original billing cycle;
   b. electronically splitting by a computer said original billing cycle into said at least two billing cycles by electronically changing the debiting timeframe by a computer of said original billing cycle and electronically switching on by a computer at least one additional billing cycle, wherein only one of said at least two billing cycles is active for posting at a time, and wherein said at least two billing cycles comprises said original billing cycle and said at least one additional billing cycle; and
   c. electronically posting by a computer to said account one or a plurality of point of sale (POS) transactions;
   wherein electronic operations of said method are performed by at least one computer;
   wherein electronically switching on said at least one additional billing cycle, thereby electronically starting said at least one additional billing cycle, is determined by an end user; wherein a billing cycle of said at least two billing cycles comprises one or a plurality of POS transactions; and wherein said account comprises a total credit limit.

2. A method according to claim 1, wherein said end user electronically starts said at least one additional billing cycle at-will.

3. A method according to claim 1, wherein said end user electronically post-dates the electronic start of said at least one additional billing cycle.

4. A method according to claim 1, wherein said end user electronically starts said at least one additional billing cycle for one or a plurality of POS transactions already posted to said account.

5. A method according to claim 1, wherein the electronic start of said at least one additional billing cycle is electronically triggered by a parameter specified by said end user comprising at least one amount threshold parameter.

6. A method according to claim 1, wherein said at least one credit balance comprises a revolving credit balance.

7. A method according to claim 1, wherein said at least one credit balance comprises a charge credit balance.

8. A method according to claim 1, wherein said at least one additional billing cycle is active for electronically posting one or a plurality of POS transactions for said at least one additional billing cycle's entire billing cycle period.

9. A method according to claim 1, wherein said at least one additional billing cycle is active for electronically posting one or a plurality of POS transactions for only a portion of said at least one additional billing cycle's billing cycle period.

10. A method according to claim 1, further comprising wherein each billing cycle of said at least two billing cycles is electronically and automatically activated for posting one or a plurality of POS transactions for a predetermined time period portion of a standard billing cycle period.

11. A method according to claim 1, further comprising wherein an end user electronically recombines said at least two billing cycles back into at least one billing cycle, wherein said at least one billing cycle is at least one selected from the group consisting of: said original billing cycle, at least one of said at least two additional billing cycles, and at least one different billing cycle.

12. A method according to claim 1, further comprising wherein said at least one additional billing cycle is electronically eliminated once said at least one additional billing cycle is paid off.

13. A method according to claim 1, further comprising wherein an end user electronically reverts back from any additional billing cycle to a prior preexisting billing cycle for posting said POS transactions.

14. A method according to claim 1, further comprising wherein any billing cycle has its own credit limit.

15. A method according to claim 1, wherein said end user electronically pre-dates the electronic start of said at least one additional billing cycle.

16. A method according to claim 1, wherein the electronic start of said at least one additional billing cycle is electronically triggered by a parameter specified by said end user comprising at least one billing cycle balance consumption threshold parameter.

17. A method according to claim 1, wherein said at least one credit balance comprises a line of credit.

18. A method according to claim 1, further comprising wherein any billing cycle has its own credit balance.

19. A method according to claim 1, wherein said end user electronically starts said at least one additional billing cycle for one or a plurality of POS transactions already posted to said original billing cycle.

20. A method according to claim 1, wherein said end user electronically starts at least one different additional billing cycle for one or a plurality of POS transactions already posted to said at least one additional billing cycle.

21. A method according to claim 1, further comprising wherein an account issuer electronically recombines said at least two billing cycles back into at least one billing cycle, wherein said at least one billing cycle is at least one selected from the group consisting of: said original billing cycle, at least one of said at least two additional billing cycles, and at least one different billing cycle.

22. A method of claim 10, further comprising wherein the total of each said predetermined time period portion of said at least two billing cycles activated for posting equals 100 percent of said standard billing cycle period.

23. A method for electronically replacing by a computer an original billing cycle with at least two additional billing cycles in an account by electronically switching off by a computer said original billing cycle and electronically switching on by a computer said at least two additional billing cycles, said method comprising:
   a. electronically providing by a computer said account, wherein said account comprises at least one credit balance and said original billing cycle;
   b. electronically replacing by a computer said original billing cycle with at least two additional billing cycles by electronically switching off by a computer said original billing cycle and electronically switching on by a computer said at least two additional billing cycles, wherein said original billing cycle is electronically rendered dormant upon being electronically replaced, wherein only one of said at least two additional billing cycles is active for posting at a time, and wherein said at least two additional billing cycles does not comprise said original billing cycle; and c. electronically posting by a computer to said account one or a plurality of point of sale (POS) transactions;

wherein electronic operations of said method are performed by at least one computer;

wherein electronically switching on said at least two additional billing cycles is determined by an end user; wherein a billing cycle of said at least two additional billing cycles comprises one or a plurality of POS transactions; and wherein said account comprises a total credit limit.

24. A method according to claim 23, wherein said end user electronically switches on said at least two additional billing cycles at-will.

25. A method according to claim 23, wherein said end user electronically post-dates the electronic switching on of said at least two additional billing cycles.

26. A method according to claim 23, wherein said end user electronically switches on said at least two additional billing cycles for one or a plurality of POS transactions already posted to said account.

27. A method according to claim 23, wherein the electronic switching on of said at least two additional billing cycles is electronically triggered by a parameter specified by said end user comprising at least one amount threshold parameter.

28. A method according to claim 23, wherein said at least one credit balance comprises a revolving credit balance.

29. A method according to claim 23, wherein said at least one credit balance comprises a charge credit balance.

30. A method according to claim 23, wherein at least one of said at least two additional billing cycles is active for electronically posting one or a plurality of POS transactions for said at least one of said at least two additional billing cycles' entire billing cycle period.

31. A method according to claim 23, wherein at least one of said at least two additional billing cycles is active for electronically posting one or a plurality of POS transactions for only a portion of said at least one of said at least two additional billing cycles' billing cycle period.

32. A method according to claim 23, further comprising wherein each billing cycle of said at least two additional billing cycles is electronically and automatically activated for posting one or a plurality of POS transactions for a predetermined time period portion of a standard billing cycle period.

33. A method according to claim 23, further comprising wherein an end user electronically recombines said at least two additional billing cycles back into at least one billing cycle, wherein said at least one billing cycle is at least one selected from the group consisting of: said original billing cycle, at least one of said at least two additional billing cycles, and at least one different billing cycle.

34. A method according to claim 23, further comprising wherein at least one of said at least two additional billing cycles is electronically eliminated once said at least one of said at least two additional billing cycles is paid off.

35. A method according to claim 23, further comprising wherein an end user electronically reverts back from any additional billing cycle to a prior preexisting billing cycle for posting said POS transactions.

36. A method according to claim 23, further comprising wherein any billing cycle has its own credit limit.

37. A method according to claim 23, further comprising wherein one of said at least two additional billing cycles has the same payment due date as said original billing cycle.

38. A method according to claim 23, further comprising wherein said end user electronically starts a different one of said at least two additional billing cycles using at least one selected from the group consisting of: an at-will basis, a pre-dated basis, and a post-dated basis.

39. A method according to claim 23, wherein said end user electronically pre-dates the electronic switching on of said at least two additional billing cycles.

40. A method according to claim 23, wherein the electronic switching on of said at least two additional billing cycles is electronically triggered by a parameter specified by said end user comprising at least one billing cycle balance consumption threshold parameter.

41. A method according to claim 23, wherein said at least one credit balance comprises a line of credit.

42. A method of claim 32, further comprising wherein the total of each said predetermined time period portion of said at least two billing cycles activated for posting equals 100 percent of said standard billing cycle period.

43. A method according to claim 23, further comprising wherein any billing cycle has its own credit balance.

44. A method according to claim 23, wherein said end user electronically switches on said at least two additional billing cycles for one or a plurality of POS transactions already posted to said original billing cycle.

45. A method according to claim 23, further comprising wherein an account issuer electronically recombines said at least two additional billing cycles back into at least one billing cycle, wherein said at least one billing cycle is at least one selected from the group consisting of: said original billing cycle, at least one of said at least two additional billing cycles, and at least one different billing cycle.

46. A method according to claim 23, further comprising wherein said end user electronically starts a different one of said at least two additional billing cycles for one or plural POS transactions already posted to one of said at least two additional billing cycles.

47. A method according to claim 23, further comprising wherein the electronic start of a different one of said at least two additional billing cycles is electronically triggered by at least one parameter specified by said end user, wherein said at least one parameter is selected from the group consisting of: an amount threshold parameter and a billing cycle balance consumption threshold parameter.

* * * * *